US012761236B2

United States Patent
(12) United States Patent
Chun et al.

(10) Patent No.: US 12,761,236 B2
(45) Date of Patent: Oct. 13, 2026

(54) AUTOMATED LIQUID SAMPLING DEVICE AND AUTOMATED LIQUID SAMPLING SYSTEM COMPRISING SAME

(71) Applicant: KOREA INSTITUTE OF ENERGY RESEARCH, Daejeon (KR)

(72) Inventors: Dong Hyun Chun, Daejeon (KR); Min Hye Youn, Daejeon (KR); Geun Bae Rhim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 473 days.

(21) Appl. No.: 18/578,551

(22) PCT Filed: Aug. 6, 2021

(86) PCT No.: PCT/KR2021/010440

§ 371 (c)(1),
(2) Date: Jan. 11, 2024

(87) PCT Pub. No.: WO2022/270676

PCT Pub. Date: Dec. 29, 2022

(65) Prior Publication Data

US 2024/0201214 A1 Jun. 20, 2024

(30) Foreign Application Priority Data

Jun. 22, 2021 (KR) ........................ 10-2021-0080655

(51) Int. Cl.

| | |
|---|---|
| ***B01L 3/00*** | (2006.01) |
| ***B01D 15/08*** | (2006.01) |
| ***B01F 33/302*** | (2022.01) |
| ***B01F 33/3033*** | (2022.01) |
| ***B01J 8/00*** | (2006.01) |

(Continued)

(52) U.S. Cl.
CPC ............... *G01N 35/10* (2013.01); *G01N 1/10* (2013.01)

(58) Field of Classification Search
CPC ........ G01N 35/10; G01N 1/10; G01N 1/2035; G01N 33/00; B01J 8/04
See application file for complete search history.

(56) References Cited

FOREIGN PATENT DOCUMENTS

| | | | | |
|---|---|---|---|---|
| KR | 20070088900 A * | 8/2007 | ............ | B01J 20/281 |
| KR | 102087642 B1 * | 3/2020 | ......... | G01N 33/1846 |

* cited by examiner

*Primary Examiner* — Oyeleye Alexander Alabi
(74) *Attorney, Agent, or Firm* — Birch, Stewart, Kolasch & Birch, LLP

(57) ABSTRACT

An automated liquid sample device is disclosed. The automated liquid sampling device of the present invention comprises: a first pipe which is connected to a (1-2)th inlet-side flow channel of a first three-way valve and through which a gas is exhausted to the outside; a second three-way valve which forms a (2-1)th inlet, a (2-2)th inlet, and a (2-3)th inlet, has a (2-1th inlet-side flow channel connected to a (1-3)th inlet-side flow channel of the first three-way valve, and has a (2-2)th inlet-side flow channel connected to a second trap, a third three-way valve which forms a (3-1)th inlet, a (3-2)th inlet, and a (3-3)th inlet; a second pipe which connects a (3-1)th inlet-side flow channel to a (2-3)th inlet-side flow channel; a third pipe which connects a (3-2)th inlet-side flow channel to the (1-2)th inlet-side flow channel of the first three-way valve; a fourth pipe which connects a (3-3)th inlet-side flow channel to the first pipe; and a controller which controls the first valve, the first three-way valve, the second three-way valve, and the third three-way valve.

9 Claims, 28 Drawing Sheets

(51) Int. Cl.

| | |
|---|---|
| ***B01J 8/02*** | (2006.01) |
| ***B01J 20/285*** | (2006.01) |
| ***B01J 20/287*** | (2006.01) |
| ***B01J 20/32*** | (2006.01) |
| ***B01L 7/00*** | (2006.01) |
| ***B01L 9/00*** | (2006.01) |
| ***B65G 47/80*** | (2006.01) |
| ***B82Y 20/00*** | (2011.01) |
| ***B82Y 30/00*** | (2011.01) |
| ***B82Y 40/00*** | (2011.01) |
| ***C08L 5/08*** | (2006.01) |
| ***C12M 1/34*** | (2006.01) |
| ***C12M 3/06*** | (2006.01) |
| ***C12N 1/14*** | (2026.01) |
| ***C12N 1/20*** | (2026.01) |
| ***C12Q 1/02*** | (2006.01) |
| ***C12Q 1/6806*** | (2018.01) |
| ***C12Q 1/6844*** | (2018.01) |
| ***C12Q 1/6848*** | (2018.01) |
| ***C12Q 1/6851*** | (2018.01) |
| ***C12Q 1/686*** | (2018.01) |
| ***G01K 1/14*** | (2021.01) |
| ***G01N 1/10*** | (2006.01) |
| ***G01N 1/44*** | (2006.01) |
| ***G01N 15/10*** | (2024.01) |
| ***G01N 15/14*** | (2024.01) |
| ***G01N 15/1433*** | (2024.01) |
| ***G01N 21/01*** | (2006.01) |
| ***G01N 21/03*** | (2006.01) |
| ***G01N 21/05*** | (2006.01) |
| ***G01N 21/29*** | (2006.01) |
| ***G01N 21/33*** | (2006.01) |
| ***G01N 21/35*** | (2014.01) |
| ***G01N 21/59*** | (2006.01) |
| ***G01N 21/65*** | (2006.01) |
| ***G01N 21/75*** | (2006.01) |
| ***G01N 21/77*** | (2006.01) |
| ***G01N 27/07*** | (2006.01) |
| ***G01N 27/28*** | (2006.01) |
| ***G01N 27/416*** | (2006.01) |
| ***G01N 30/02*** | (2006.01) |
| ***G01N 30/60*** | (2006.01) |
| ***G01N 30/72*** | (2006.01) |
| ***G01N 31/10*** | (2006.01) |
| ***G01N 31/12*** | (2006.01) |
| ***G01N 33/543*** | (2006.01) |
| ***G01N 33/557*** | (2006.01) |
| ***G01N 33/564*** | (2006.01) |
| ***G01N 33/574*** | (2006.01) |
| ***G01N 33/575*** | (2026.01) |
| ***G01N 33/57515*** | (2026.01) |
| ***G01N 33/58*** | (2006.01) |
| ***G01N 33/68*** | (2006.01) |
| ***G01N 33/72*** | (2006.01) |
| ***G01N 35/00*** | (2006.01) |
| ***G01N 35/02*** | (2006.01) |
| ***G01N 35/10*** | (2006.01) |
| ***H05B 45/10*** | (2020.01) |
| ***H10W 90/00*** | (2026.01) |

AUTOMATED LIQUID SAMPLING DEVICE AND AUTOMATED LIQUID SAMPLING SYSTEM COMPRISING SAME

CROSS REFERENCE TO RELATED APPLICATIONS

This application is the National Phase of PCT International Application No. PCT/KR2021/010440, filed on Aug. 6, 2021, which claims priority under 35 U.S.C. 119(a) to Patent Application No. 10-2021-0080655, filed in the Republic of Korea on Jun. 22, 2021, all of which are hereby expressly incorporated by reference into the present application.

TECHNICAL FIELD

The present invention relates to an automated liquid sampling device and an automated liquid sampling system comprising same, and more specifically, to an automated liquid sampling device and an automated liquid sampling system including the automated liquid sampling device which are configured to automate sampling of a liquid product of products of a catalytic reactor.

BACKGROUND ART

Of several methods of increasing a chemical reaction rate, methods of using catalysts have been studied as critical methods, and catalysts are industrially used to increase the reaction rate of important reactions. A catalytic reactor means a system that can produce a reactant by using a catalyst which affects a reaction rate without being consumed in a reaction.

In a chemical process, a reactor is an essential element to achieve the purpose of a chemical process. The reactor has a function of maintaining optimal conditions for enabling each step of a reaction to proceed as quickly or as completely as possible.

In order to increase a reaction rate in reactors, catalysts that can increase a temperature of a reactant or can affect the reaction rate without affecting a reaction result are used. These catalysts increase the reaction rate, because a reaction using a catalyst proceeds through a reaction path different from that of a reaction without using a catalyst, and thereby the activation energy of the reaction using the catalyst is reduced.

Catalysts are classified into homogeneous catalysts and heterogeneous catalysts. The homogeneous catalysts are catalysts that are present in the same phase as reactants, and the heterogeneous catalysts are catalysts that are present in a phase different from that of reactants and are generally solid.

Homogeneous catalysis is a process of dissolving with at least one component of a reactant, and an example thereof is the manufacturing of n-isobutyl aldehyde. A heterogeneous catalytic process involves two or more phases, and generally a catalyst is a solid and a reactant is a liquid or a gas. In some cases, there may be a gas-liquid reaction, and an example thereof is the manufacturing of benzene through dehydrogenation of cyclohexane.

In this regard, Japanese Patent No. 6783292 (hereinafter referred to as 'Prior Literature') discloses a composite wire-shaped catalyst member and a hydrogen manufacturing catalytic reactor using the same.

The catalytic reactor in Prior Literature includes a storage tank that stores a processing target fluid, a vaporizer that vaporizes the processing target fluid, a catalytic reactor in which the processing target fluid reacts to a catalyst, and a cooler that extracts a liquid reactant from a reaction gas generated in the catalytic reactor.

The gas and the liquid reactant separated in the cooler are moved to a trap. The liquid reactant moved to the trap is discharged to a collector. A concentration of the reactant, a temperature and a pressure in a reaction system, or the like directly affects a chemical reaction rate. Hence, a temperature and a pressure inside a catalytic reactor need to be maintained constant.

However, in the catalytic reactor of Prior Literature, a pressure inside the trap is reduced in proportion to a volume of a liquid reactant collected in the collector. The trap is connected to the cooler and the catalytic reactor by a pipe. Hence, the catalytic reactor in Prior Literature has a problem in that a pressure inside the reactor is reduced when the liquid reactant is collected into the collector.

In addition, the catalytic reactor in Prior Literature is inconvenient in that an operator (manager) has to be present whenever the liquid reactant is collected to the collector. That is, whenever a certain volume of liquid reactant accumulates in the trap, the operator (manager) has to manually open an on-off valve installed between the cooler and the collector to collect the liquid reactant to the collector.

A period of time for the liquid reactant to accumulate to a fixed amount in the trap depends on a type of reactant, a temperature and a pressure of a catalytic reactor, a chemical reaction rate, or the like. Hence, it is actually difficult to set a time point (hereinafter referred to as the 'scheduled time point') at which the fixed amount of liquid reactant accumulates in the trap to a specific time zone. The scheduled time point may be midnight or during the weekend. It may be difficult to perform sampling of a liquid reactant at the scheduled time point due to a manager's planned (or sudden) personal circumstances.

To ensure reliability of experimental data in a laboratory in which catalytic reaction experiments are conducted, periodic collection of a fixed amount of a liquid reactant by a manager (researcher) is important. Hence, the applicants of the present invention started to study a method for enabling a liquid reactant produced up to a scheduled time point to be sampled even after the scheduled time point.

It is needless to say that, if an electromagnetic valve is installed between a cooler and a collector and opening and closing time points of the valve are automatically controlled, it may be possible to automatically collect a liquid reactant. However, as described above, the catalytic reactor in Prior Literature has a problem in that the pressure inside the reactor is reduced when the liquid reactant is collected to the collector. When the pressure inside the catalytic reactor changes, a chemical reaction rate of a reactant changes. The chemical reaction rate of the reactant is proportional to an amount of liquid reactant produced per unit time. Hence, the catalytic reactor in Prior Literature has a problem in that it is difficult to expect automatic collection of a fixed amount of liquid reactant even if the electromagnetic valve is installed between the cooler and the collector.

On the other hand, in laboratories in which catalytic reaction experiments are conducted, multiple catalytic reactors are often operated simultaneously to secure a large number of samples. In order to ensure reliability in catalytic reaction experiments, measurement of a component and a flow rate of a gaseous product is an important factor. Hence, a wet gas meter and gas chromatography equipment are required for each catalytic reactor. However, the wet gas meter and the gas chromatography equipment are expensive. This acts as a limiting factor in operating multiple catalytic reactors simultaneously.

SUMMARY OF INVENTION

Technical Problem

Objects of the present invention are to provide an automated liquid sampling device and an automated liquid sampling system including the same which are configured to maintain a pressure of a reactor constant even when a valve of a trap is opened to sample a liquid reactant.

In addition, other objects of the present invention are to provide an automated liquid sampling device and an automated liquid sampling system including the same which are configured to enable a fixed amount of a liquid reactant to be periodically collected even when a manager adjusts a sampling time point of the liquid reactant.

In addition, other objects of the present invention are to provide an automated liquid sampling device and an automated liquid sampling system including the same which are configured to enable components and flow rates of gaseous products generated in a plurality of catalytic reactors to be measured without additional wet gas meters and gas chromatography equipment.

Solution to Problem

According to the present invention, the above-described object is achieved by an automated liquid sampling device that automates sampling of a liquid product of products of a catalytic reactor, in which the catalytic reactor includes a first catalytic reactor. The first catalytic reactor includes: a first reaction unit that generates the product through a catalytic reaction; a first trap connected to the first reaction unit to collect the liquid product; a second trap that is selectively connected to the first trap by a first valve to selectively collect the liquid product; and a first three-way valve which forms a (1-1)th inlet, a (1-2)th inlet, and a (1-3)th inlet and connects a (1-1)th inlet-side flow channel to the first trap, a first pipe which is connected to a (1-2)th inlet-side flow channel and through which gas is exhausted to the outside; a second three-way valve which forms a (2-1)th inlet, a (2-2)th inlet, and a (2-3)th inlet, has a (2-1)th inlet-side flow channel connected to a (1-3)th inlet-side flow channel, and has a (2-2)th inlet-side flow channel connected to the second trap, a third three-way valve which forms a (3-1)th inlet, a (3-2)th inlet, and a (3-3)th inlet; a second pipe which connects a (3-1)th inlet-side flow channel to a (2-3)th inlet-side flow channel; a third pipe that connects a (3-2)th inlet-side flow channel to a (1-2)th inlet-side flow channel; a fourth pipe which connects a (3-1)th inlet side flow channel to the first pipe; and a controller which controls the first valve, the first three-way valve, the second three-way valve, and the third three-way valve. The controller opens the first valve, connects the (1-2)th inlet to the (1-3)th inlet, connects the (2-1)th inlet to the (2-2)th inlet, and connects the (3-2)th inlet to the (3-3)th inlet such that the liquid product is collected in the second trap.

The controller may be configured to close the first valve and connect the (1-1)th inlet to the (1-2)th inlet such that a pressure reduction in the first reaction unit is prevented when the liquid product is drained in the second trap.

The controller may be configured to connect the (2-1)th inlet to the (2-3)th inlet and connect the (3-1)th inlet to the (3-2)th inlet such that a pressure in the second trap is equal to a pressure in the first reaction unit before the first valve is re-opened.

A pressure controller may be installed at the first pipe or the (1-2)th inlet-side flow channel, and a flow controller may be installed at the third pipe.

A gas meter may be installed at the first pipe, and a gas analyzer may be installed at the fourth pipe.

The catalytic reactor may include a second catalytic reactor. The second catalytic reactor may include: a second reaction unit that generates the product through a catalytic reaction; a third trap connected to the second reaction unit to collect the liquid product; a fourth trap that is selectively connected to the third trap by a second valve to selectively collect the liquid product; and a fourth three-way valve that has a (4-1)th inlet, a (4-2)th inlet, and a (4-3)th inlet and has a (4-1)th inlet-side flow channel connected to the third trap. The first pipe may include: a fifth three-way valve which forms a (5-1)th inlet, a (5-2)th inlet, and a (5-3)th inlet and has a (5-1)th inlet-side flow channel connected to the (1-2)th inlet-side flow channel; a sixth three-way valve which forms a (6-1)th inlet, a (6-2)th inlet, and a (6-3)th inlet and has a (6-1)th inlet-side flow channel connected to a (4-2)th inlet-side flow channel; a first exhaust pipe connected to the (5-3)th inlet and the (6-3)th inlet; and a second exhaust pipe which is connected to the (5-2)th inlet and the (6-2)th inlet and to which the fourth pipe is connected. The third pipe may include: a third valve that has a 3A-th inlet and a 3B-th inlet, has the 3A-th inlet connected to the (1-2)th inlet-side flow channel, and has the 3B-th inlet connected to the (3-2)th inlet-side flow channel; and a fourth valve that has a 4A-th inlet and a 4B-th inlet, has the 4A-th inlet connected to the (4-2)th inlet-side flow channel, and ahs the 4B-th inlet connected to the (3-2)th inlet-side flow channel. A gas meter may be installed at the second exhaust pipe, and a gas analyzer may be installed at the fourth pipe. The automated liquid sampling device may include a seventh three-way valve which forms a (7-1)th inlet, a (7-2)th inlet, and a (7-3)th inlet, has a (7-1)th inlet-side flow channel connected to a (4-3)th inlet-side flow channel, has a (7-2)th inlet-side flow channel connected to the fourth trap, and has a (7-3)th inlet-side flow channel connected to the second pipe. In a case where a gas discharged from the second catalytic reactor flows in the second exhaust pipe and the third pipe, the controller may be configured to open the first valve, close the third valve, connect the (1-2)th inlet to the (1-3)th inlet, connect the (2-1)th inlet to the (2-2)th inlet, and connect the (5-1)th inlet to the (5-3)th inlet.

The catalytic reactor may include a second catalytic reactor. The second catalytic reactor may include: a second reaction unit that generates the product through a catalytic reaction; a third trap connected to the second reaction unit to collect the liquid product; a fourth trap that is selectively connected to the third trap by a second valve to selectively collect the liquid product; and a fourth three-way valve which forms a (4-1)th inlet, a (4-2)th inlet, and a (4-3)th inlet and has a (4-1)th inlet-side flow channel connected to the third trap. The first pipe may include: a fifth three-way valve which forms a (5-1)th inlet, a (5-2)th inlet, and a (5-3)th inlet and has a (5-1)th inlet-side flow channel connected to the (1-2)th inlet-side flow channel; a sixth three-way valve which forms a (6-1)th inlet, a (6-2)th inlet, and a (6-3)th inlet and has a (6-1)th inlet-side flow channel connected to a (4-2)th inlet-side flow channel; a first exhaust pipe connected to the (5-3)th inlet and the (6-3)th inlet; and a second exhaust pipe which is connected to the (5-2)th inlet and the (6-2)th inlet and to which the fourth pipe is connected. A gas meter may be installed at the second exhaust pipe, and a gas analyzer may be installed at each of the second pipe and the fourth pipe. The automated liquid sampling device may include: a seventh three-way valve which forms a (7-1)th inlet, a (7-2)th inlet, and a (7-3)th inlet, has a (7-1)th inlet-side flow channel connected to a (4-3)th inlet-side flow channel, has a (7-2th inlet-side flow channel connected to the fourth trap, and has a (7-3)th inlet-side flow channel connected to the second pipe; an eighth three-way valve which forms an (8-1)th inlet, an (8-2)th inlet, and an (8-3)th inlet, has the (8-1)th inlet connected to the second pipe, and has the (8-3)th inlet connected to the fourth pipe; and a fourth valve which forms a 4A-th inlet and a 4B-th inlet, has the 4A-th inlet connected to the (4-2th) inlet-side flow channel, and has the 4B-th inlet connected to a (8-2)th inlet-side flow channel. In a case where a gas discharged from the second catalytic reactor flows in the second exhaust pipe and the fourth pipe, the controller may be configured to enable the (1-1)th inlet to be connected to the (1-2)th inlet, the (2-2)th inlet to be connected to the (2-3)th inlet, and the (3-1)th inlet to be connected to the (3-2)th inlet such that a pressure in the second trap is equal to a pressure in the first reaction unit before the first valve is re-opened.

A flow controller may be configured to be installed at each of the second pipe and the third pipe.

According to the present invention, the above-described object is achieved by an automated liquid sampling system including: a catalytic reactor; and an automated liquid sampling device that automates sampling of a liquid product of products of the catalytic reactor. The catalytic reactor includes a first catalytic reactor, wherein the first catalytic reactor includes: a first reaction unit that generates the product through a catalytic reaction; a first trap connected to the first reaction unit to collect the liquid product; a second trap that is selectively connected to the first trap by a first valve to selectively collect the liquid product; and a first three-way valve which forms a (1-1)th inlet, a (1-2)th inlet, and a (1-3)th inlet and has a (1-1)th inlet-side flow channel connected to the first trap. The automated liquid sampling device may include: a first pipe which is connected to a (1-2)th inlet-side flow channel and through which gas is exhausted to the outside; a second three-way valve which forms a (2-1)th inlet, a (2-2)th inlet, and a (2-3)th inlet, has a (2-1)th inlet-side flow channel connected to a (1-3)th inlet-side flow channel, and has a (2-2)th inlet-side flow channel connected to the second trap; a third three-way valve which forms a (3-1)th inlet, a (3-2)th inlet, and a (3-3)th inlet; a second pipe that connects a (3-1)th inlet-side flow channel to a (2-3)th inlet-side flow channel; a third pipe that connects a (3-2)th inlet-side flow channel to a (1-2)th inlet-side flow channel; a fourth pipe that connects a (3-3)th inlet-side flow channel to the first pipe; and a controller that controls the first valve, the first three-way valve, the second three-way valve, and the third three-way valve. The controller opens the first valve, connects the (1-2)th inlet to the (1-3)th inlet, connects the (2-1)th inlet to the (2-2)th inlet, and connects the (3-2)th inlet to the (3-3)th inlet such that the liquid product is collected in the second trap.

Advantageous Effects of Invention

According to the present invention, the controller connects the (2-2)th inlet to the (2-3)th inlet and connects the (3-1)th inlet to the (3-2)th inlet such that a pressure in the second trap is equal to a pressure in the first reaction unit before the first valve is re-opened, and thereby it is possible to provide an automated liquid sampling device and an automated liquid sampling system including the same which are configured to maintain a pressure of a reactor constant even when the valve of the trap is opened and sampling of a liquid reactant is performed.

In addition, the controller closes the first valve and connects the (1-1)th inlet to the (1-2)th inlet such that a pressure reduction in the first reaction unit is prevented when the liquid product is drained in the second trap, and thereby it is possible to provide an automated liquid sampling device configured to enable a fixed amount of a liquid reactant to be periodically collected even when a manager adjusts a sampling time point of the liquid reactant, and an automated liquid sampling system including the automated liquid sampling device.

Furthermore, in a case where a gas discharged from the second catalytic reactor flows in the second exhaust pipe and the third pipe, the controller opens the first valve, closes the third valve, connects the (1-2)th inlet to the (1-3)th inlet, connects the (2-1)th inlet to the (2-2)th inlet, and connects the (5-1)th inlet to the (5-3)th inlet, and thereby it is possible to provide an automated liquid sampling device configured to enable components and flow rates of gaseous products generated in a plurality of catalytic reactors to be measured without additional wet gas meters and gas chromatography equipment, and an automated liquid sampling system including the automated liquid sampling device.

BRIEF DESCRIPTION OF DRAWINGS

In FIG. 25, (b) is a graph illustrating an internal pressure of a first reactor during the one cycle of the automated liquid sampling system of FIG. 1.

In FIG. 25, (c) is a graph illustrating an amount of liquid product collected by a first catalytic reactor during the one cycle of the automated liquid sampling system of FIG. 1.

DESCRIPTION OF EMBODIMENTS

Hereinafter, with reference to the accompanying drawings, preferred embodiments of the present invention will be described in detail as follows. However, in the following description of the present invention, descriptions of already known functions or configurations will be omitted to make the gist of the present invention clear.

An automated liquid sampling device and an automated liquid sampling system including the same of the present invention are configured to maintain a pressure of a reactor constant even when a valve of a trap is opened and sampling of a liquid reactant is performed.

In addition, the automated liquid sampling device and the automated liquid sampling system including the same of the present invention are configured to enable a fixed amount of the liquid reactant to be periodically collected even if a manager adjusts a sampling time point of the liquid reactant.

Furthermore, the automated liquid sampling device and the automated liquid sampling system including the same of the present invention are configured to enable components and flow rates of gaseous products generated in a plurality of catalytic reactors to be measured without additional wet gas meters and gas chromatography equipment.

EMBODIMENTS

First Embodiment

Figure 1:
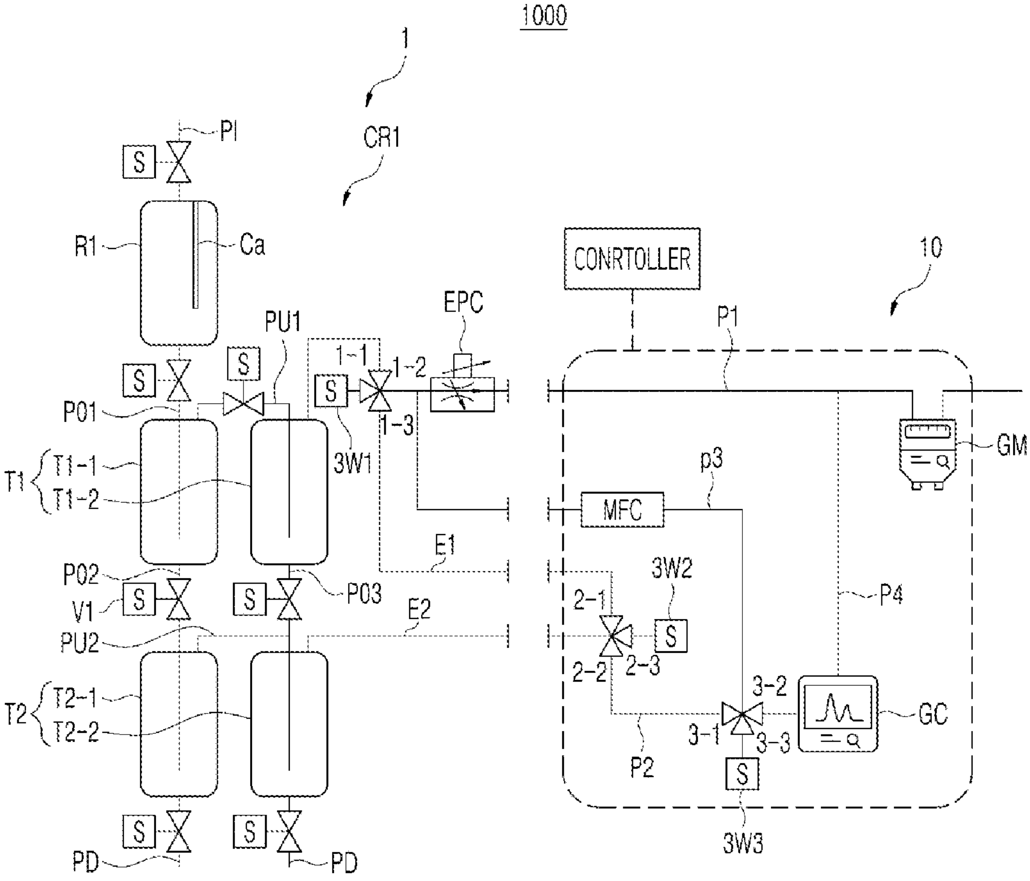
FIG. 1 is a diagram illustrating an automated liquid sampling system according to a first embodiment of the present invention.
Figure 2:
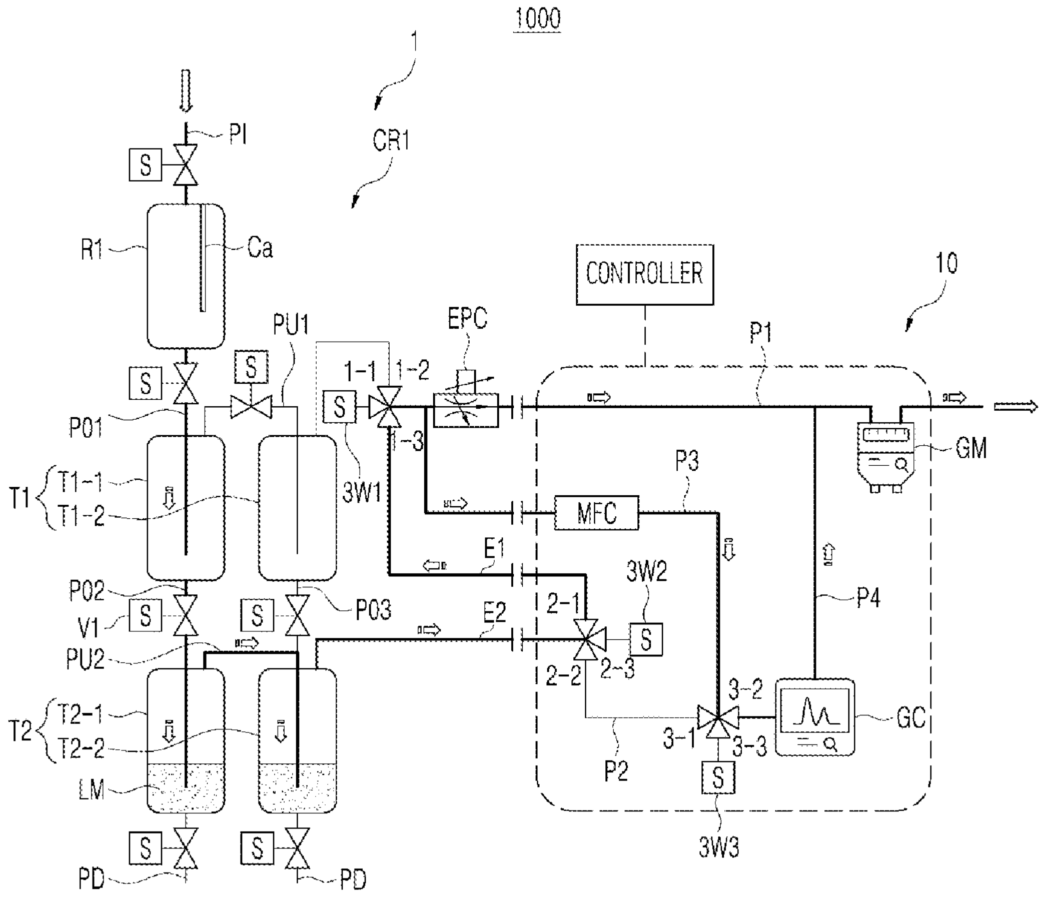
FIG. 2 is a diagram illustrating a normal state section of the automated liquid sampling system of FIG. 1.

FIG. 1 is a diagram illustrating an automated liquid sampling system 1000 according to a first embodiment of the present invention and is a diagram illustrating a state in which an automated liquid sampling device 10 and a first catalytic reactor CR1 are separated from each other. FIG. 2 is a diagram illustrating a normal state section of the automated liquid sampling system 1000 of FIG. 1. That is, FIG. 2 is a diagram illustrating a state in which the automated liquid sampling device 10 and the first catalytic reactor CR1 are connected to each other.

As illustrated in FIGS. 1 and 2, the automated liquid sampling system 1000 according to the first embodiment of the present invention is configured to automate sampling of a liquid product LM of products of a catalytic reactor 1 and include the automated liquid sampling device 10 and the catalytic reactor 1.

As illustrated in FIGS. 1 and 2, the catalytic reactor 1 includes the first catalytic reactor CR1. The first catalytic reactor CR1 includes a first reaction unit R1, a first trap T1, a second trap T2, a first valve V1, and a first three-way valve 3W1.

As illustrated in FIGS. 1 and 2, the first reaction unit R1 is configured to generate a product through a catalytic reaction. The first reaction unit R1 forms a space in which the catalytic reaction occurs. An inlet pipe PI and a first discharge pipe PO1 are connected to the first reaction unit R1. A reactant flows into the first reaction unit R1 through the inlet pipe PI. The product generated through the catalytic reaction is discharged through the first discharge pipe PO1. An electromagnetic valve (a magnetic valve or a solenoid valve) may be installed at each of the inlet pipe PI and the first discharge pipe PO1. A controller to be described below can control the electromagnetic valve.

FIGS. 1 and 2 illustrate a catalytic reaction using a reactant in a gaseous form and a catalyst in a solid form, that is, a heterogeneous catalytic process. However, the catalytic reaction occurring in the first reaction unit R1 may be homogenous catalysis.

Hereinafter, for easier understanding of the present invention, the catalytic reaction occurring in the first reaction unit R1 will be described as the heterogeneous catalytic process using a gaseous reactant and a catalyst in a solid form.

Although not illustrated, the inlet pipe PI may be connected to a gas feeding device. The gas feeding device may include a gas-specific flow supply device MFC for supplying a fixed amount of a gaseous reactant. In addition, the gas feeding device may include a gas mixer and a pressure gauge at a rear end of the mixer. A heater may be attached to an outer surface of the first reaction unit R1 to increase a catalytic reaction rate.

The controller to be described below may monitor a temperature and a pressure of a gaseous reactant flowing into the first reaction unit R1 from the gas feeding device. In addition, the controller may monitor a temperature and a pressure of a gas (a reactant and a product) supplied from the first reaction unit R1 to the first trap T1.

A product generated by the catalytic reaction in the first reaction unit R1 may include a gaseous product, a liquid product LM, and a solid product. A ratio of the gaseous product, the liquid product LM, and the solid product may vary depending on internal temperature and pressure of the first reaction unit R1. A pressure sensor may be provided in the first reaction unit R1. The internal pressure of the first reaction unit R1 may be higher than the atmospheric pressure. As an example, the internal pressure of the first reaction unit R1 may be 15 bar.

As illustrated in FIGS. 1 and 2, the first trap T1 is connected to the first reaction unit R1 through the first discharge pipe PO1. The product generated by the catalytic reaction in the first reaction unit R1 flows into the first trap T1 through the first discharge pipe PO1. The first trap T1 is formed to have an internal pressure equal to the internal pressure of the first reaction unit R1. A pressure sensor may be provided in the first trap T1. As an example, in a case where the internal pressure of the first reaction unit R1 is 15 bar, the internal pressure of the first trap T1 may be 15 bar.

The first trap T1 collects the liquid product LM. An internal temperature of the first trap T1 may be lower than a boiling point of the product. A heater or a cooler may be attached to an outer surface of the first trap T1 to control the internal temperature of the first trap T1 to a specific temperature. As an example, in the case where the cooler is attached thereto, the internal temperature of the first trap T1 may be maintained at 0° C.

As illustrated in FIGS. 1 and 2, the second trap T2 is connected to the first trap T1 through a second discharge pipe PO2. The liquid product LM collected in the first trap T1 flows into the second trap T2 together with the gaseous product and the reactant. A pressure sensor may be provided in the second trap T2. A heater or a cooler may be attached to an outer surface of the second trap T2 to control an internal temperature of the second trap T2 to be equal to the internal temperature of the first trap T1.

The first valve V1 is provided at the second discharge pipe PO2. The first valve V1 may be provided as an electromagnetic valve (a magnetic valve or a solenoid valve). The controller may control the first valve V1. The second trap T2 may selectively collect the liquid product LM by opening and closing the first valve V1. In a state where the first valve V1 is opened, the inside of the second trap T2 has the same temperature and pressure as the inside of the first trap T1.

A drainage pipe PD is connected to a lower side of the second trap T2. The liquid product LM collected in the second trap T2 may be discharged through the drainage pipe PD. An electromagnetic valve (a magnetic valve or a solenoid valve) may be installed at the drainage pipe PD. A controller to be described below can control the electromagnetic valve.

As illustrated in FIGS. 1 and 2, in a case where the product is a mixture, the first trap T1 and the second trap T2 may be provided in plurality. As an example, in a case where the product includes a first product and a second product, the first trap T1 may include a (1-1)th trap T1-1 and a (1-2)th trap T1-2. Further, the second trap T2 may include a (2-1)th trap T2-1 and a (2-2)th trap T2-2.

The (1-1)th trap T1-1 and the (2-1)th trap T2-1 are controlled to have the same temperature. An internal temperature of each of the (1-1)th trap T1-1 and the (2-1)th trap T2-1 may be lower than a boiling point of the first product and higher than a boiling point of the second product. As an example, in a case where a heater is attached to an outer surface of each of the (1-1)th trap T1-1 and the (2-1)th trap T2-1, the internal temperatures of each of the (1-1)th trap T1-1 and the (2-1)th trap T2-1 may be maintained at 200° C.

The (1-2)th trap T1-2 and the (2-2)th trap T2-2 are controlled to have the same temperature. An internal temperature of each of the (1-2)th trap T1-2 and the (2-2)th trap T2-2 may be lower than the boiling point of the second product. As an example, in a case where a cooler is attached to each of the (1-2)th trap T1-2 and the (2-2)th trap T2-2, the internal temperature of each of the (1-2)th trap T1-2 and the (2-2)th trap T2-2 may be maintained at 0° C.

The (1-1)th trap T1-1 and the (1-2)th trap T1-2 are connected by a first connection pipe PU1. A first connection valve is provided at the first connection pipe PU1. The first connection valve may be provided as an electromagnetic valve (a magnetic valve or a solenoid valve. In a case where the first connection valve is opened, a gas flowing into the (1-1)th trap T1-1 flows into the (1-2)th trap T1-2 through the first connection pipe PU1.

The (2-1)th trap T2-1 and the (2-2)th trap T2-2 are connected by a second connection pipe PU2. The gas flowing into the (2-1)th trap T2-1 flows into the (2-2)th trap T2-2 through the second connection pipe PU2.

The (2-1)th trap T2-1 is connected to the (1-1)th trap T1-1 through the second discharge pipe PO2. The (2-2)th trap T2-2 is connected to the (1-2)th trap T1-2 through a third discharge pipe PO3. A second connection valve is provided at the third discharge pipe PO3. The second connection valve may be provided as an electromagnetic valve (a magnetic valve or a solenoid valve). The controller may control the second connection valve. The (2-2)th trap T2-2 may selectively collect the liquid product LM collected in the (1-2)th trap T1-2 by opening and closing the second connection valve. A drainage pipe PD is connected to a lower side of each of the (2-1)th trap T2-1 and the (2-2)th trap T2-2.

As illustrated in FIGS. 1 and 2, the first three-way valve 3W1 is configured to connect the first trap T1 to the automated liquid sampling device 10 and has inlets in three directions. That is, the first three-way valve 3W1 has a (1-1)th inlet 1-1, a (1-2)th inlet 1-2, and a (1-3)th inlet 1-3. The first three-way valve 3W1 may be provided as a three-way solenoid valve 3W1. The controller to be described below controls the first three-way valve 3W1.

The first three-way valve 3W1 connects a flow channel on the (1-1)th inlet 1-1 side to the first trap T1. The above-mentioned 'flow channel on an inlet side' may mean a flow channel of the inlet itself or may mean a flow channel (a pipe, a tube) connected to the inlet.

As illustrated in FIGS. 1 and 2, the automated liquid sampling device 10 according to the first embodiment of the present invention includes a first pipe P1, a second pipe P2, a third pipe P3, and a fourth pipe P4, a second three-way valve 3W2, a third three-way valve 3W3, a controller, and a case. The case is marked with a dotted line.

As illustrated in FIGS. 1 and 2, the first pipe P1 is provided as a pipe or a tube. One end portion of the first pipe P1 is connected to a flow channel on the (1-2)th inlet 1-2 side of the first three-way valve 3W1 by a pipe fitting. An electronic pressure controller (EPC) may be installed at the first pipe P1 or the flow channel on the (1-2)th inlet 1-2 side.

The controller may control the electronic pressure controller (EPC) by receiving a signal from a pressure sensor provided in the first catalytic reactor CR1. As an example, in a case where the internal pressure of the first reaction unit R1 is set to 15 bar, the controller may control the electronic pressure controller (EPC) to maintain a pressure in the first pipe P1 or the flow channel on the (1-2)th inlet 1-2 side at 15 bar.

The other end of the first pipe P1 forms an opening through which gas flowing through the first pipe P1 is exhausted to the outside. A wet gas meter GM is installed at the first pipe P1. The gas meter GM displays a total amount of gas passing inside the first pipe P1. The controller receives a measured value from the gas meter GM.

As illustrated in FIGS. 1 and 2, the second three-way valve 3W2 has inlets formed in three directions. That is, the second three-way valve 3W2 forms a (2-1)th inlet 2-1, a (2-2)th inlet 2-2, and a (2-3)th inlet 2-3. The second three-way valve 3W2 may be provided as a three-way solenoid valve. The controller controls the second three-way valve 3W2.

The second three-way valve 3W2 connects a flow channel on the (2-1)th inlet 2-1 side to a flow channel on the (1-3)th inlet 1-3 side by a pipe fitting. Hereinafter, for easy understanding of the present invention, the 'flow channel on the (2-1)th inlet 2-1 side and the flow channel on the (1-3)th inlet 1-3 side' will be referred to as a first flow channel E1. The first flow channel E1 forms a flow channel through which a gas flows.

Further, the second three-way valve 3W2 connects a flow channel on the (2-2)th inlet 2-2 side to the second trap T2 by a pipe fitting. Hereinafter, for easy understanding of the present invention, the 'flow channel on the (2-2)th inlet 2-2 side connected to the second trap T2' will be referred to as a second flow channel E2. The second flow channel E2 forms a flow channel through which a gas flows.

As illustrated in FIGS. 1 and 2, the third three-way valve 3W3 has inlets in three directions. That is, the third three-way valve 3W3 has a (3-1)th inlet 3-1, a (3-2)th inlet 3-2, and a (3-3)th inlet 3-3. The third three-way valve 3W3 may be provided as a three-way solenoid valve. The controller controls the third three-way valve 3W3.

As illustrated in FIGS. 1 and 2, the second pipe P2 connects a flow channel on the (3-1)th inlet 3-1 side to a flow channel on the (2-3)th inlet 2-3 side. The second pipe P2 forms a flow channel through which a gas flows. The second pipe P2 is provided as a pipe or a tube.

As illustrated in FIGS. 1 and 2, the third pipe P3 connects a flow channel on the (3-2)th inlet 3-2 side to the flow channel on the (1-2)th inlet 1-2 side. The third pipe P3 forms a flow channel through which a gas flows. The third pipe P3 is provided as a pipe or a tube.

As described above, the one end portion of the first pipe P1 is connected to the flow channel on the (1-2)th inlet 1-2 side of the first three-way valve 3W1. Further, the third pipe P3 connects the flow channel on the (3-2)th inlet 3-2 side to the flow channel on the (1-2)th inlet 1-2 side. That is, the flow channel on the (1-2)th inlet 1-2 side of the first three-way valve 3W1 branches into a flow channel connected to the first pipe P1 and a flow channel connected to the third pipe P3.

A flow controller MFC is installed at the third pipe P3. The controller controls the flow controller MFC. The controller controls the flow controller MFC to control a flow rate of a gas of the first three-way valve 3W1 which is distributed to the first pipe P1 and the third pipe P3.

As illustrated in FIGS. 1 and 2, the fourth pipe P4 connects a flow channel on the (3-3)th inlet 3-3 side to the first pipe P1. The fourth pipe P4 forms a flow channel through which a gas flows. The fourth pipe P4 is provided as a pipe or a tube. A gas analyzer GC is installed at the fourth pipe P4. The gas analyzer GC may separate, as a single component, a trace of a component of a mixed gas consisting of two or more components and analyze the component by gas chromatography. The controller receives a measured value of the gas analyzer GC.

As described above, the controller controls the first valve V1, the first three-way valve 3W1, the second three-way valve 3W2, and the third three-way valve 3W3. In addition, the controller controls the electronic pressure controller EPC and the flow controller MFC. Further, the controller receives and stores the measured value of each of the gas meter GM and the gas analyzer GC.

Figure 3:
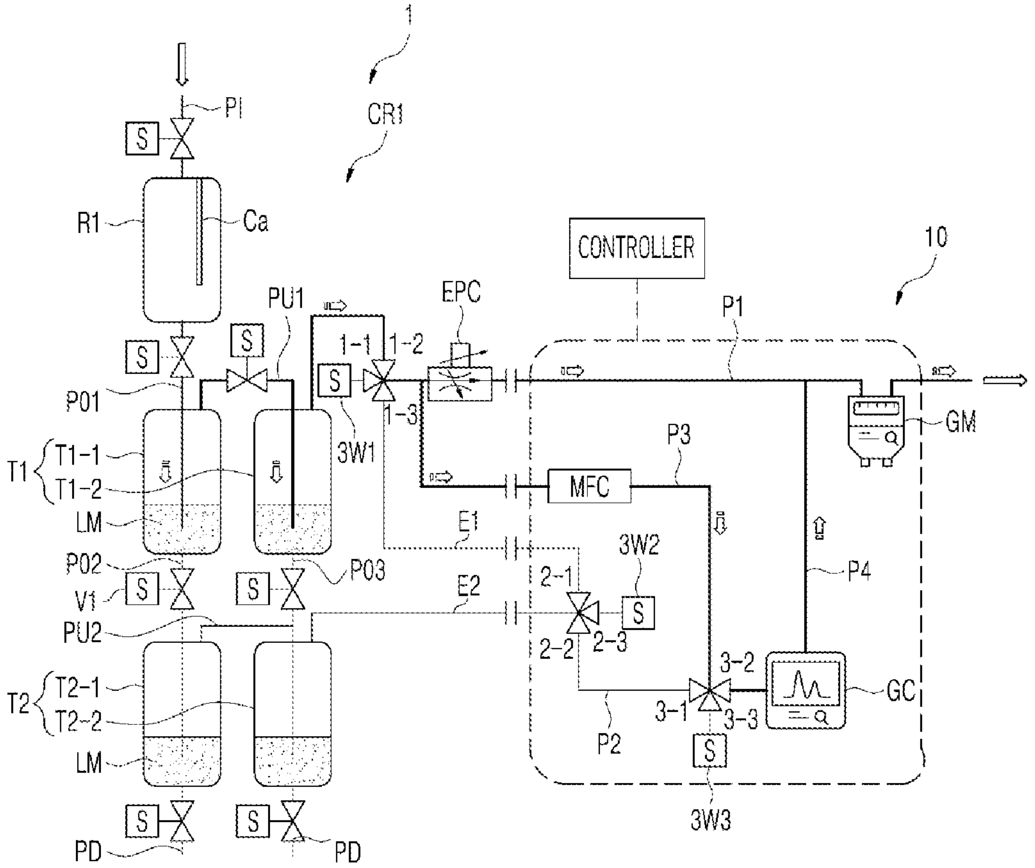
FIG. 3 is a diagram illustrating a primary sampling section of the automated liquid sampling system of FIG. 1.
Figure 4:
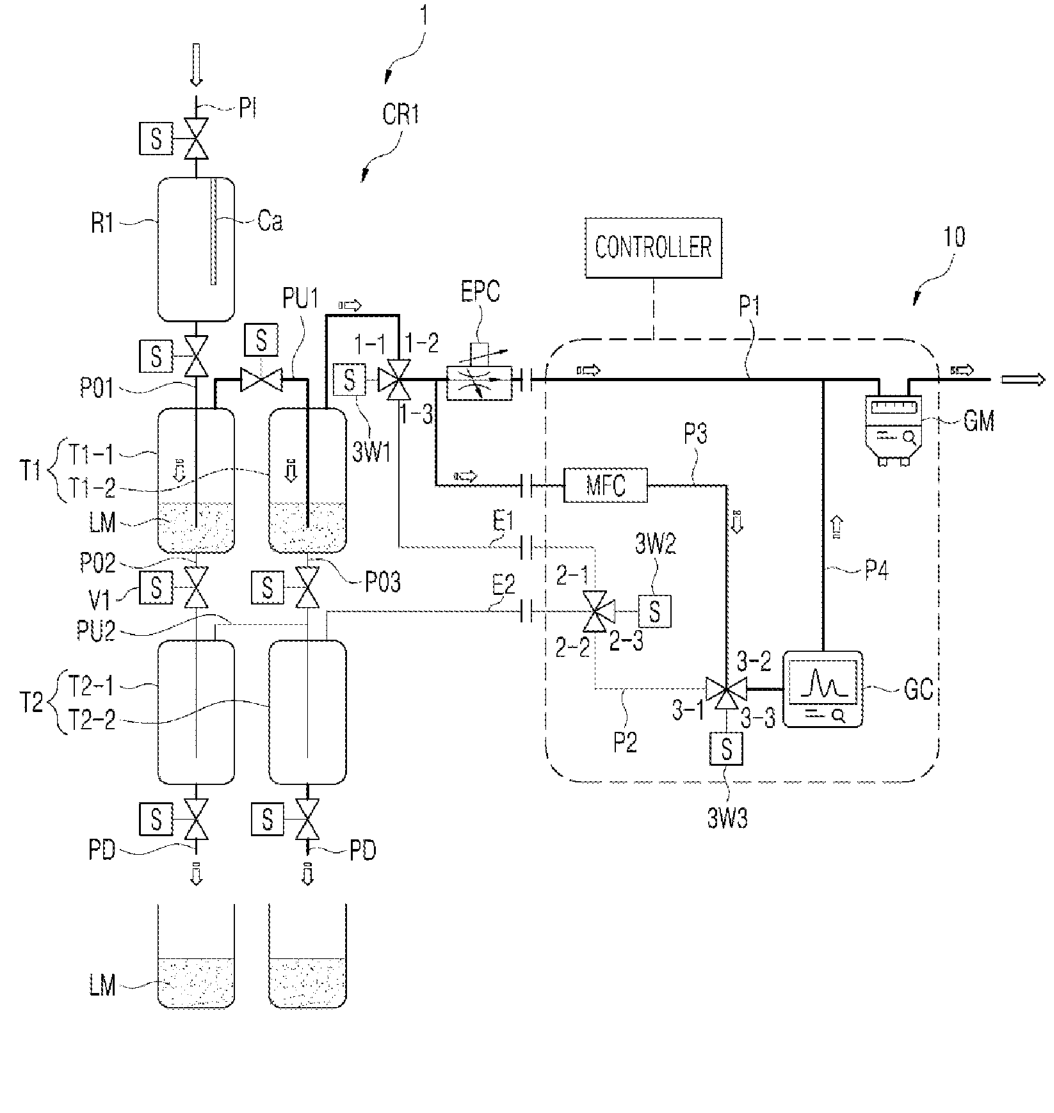
FIG. 4 is a diagram illustrating a drainage section of the automated liquid sampling system of FIG. 1.

FIG. 3 is a diagram illustrating a primary sampling section of the automated liquid sampling system 1000 of FIG. 1. FIG. 4 is a diagram illustrating a drainage section of the automated liquid sampling system 1000 of FIG. 1.

Figure 5:
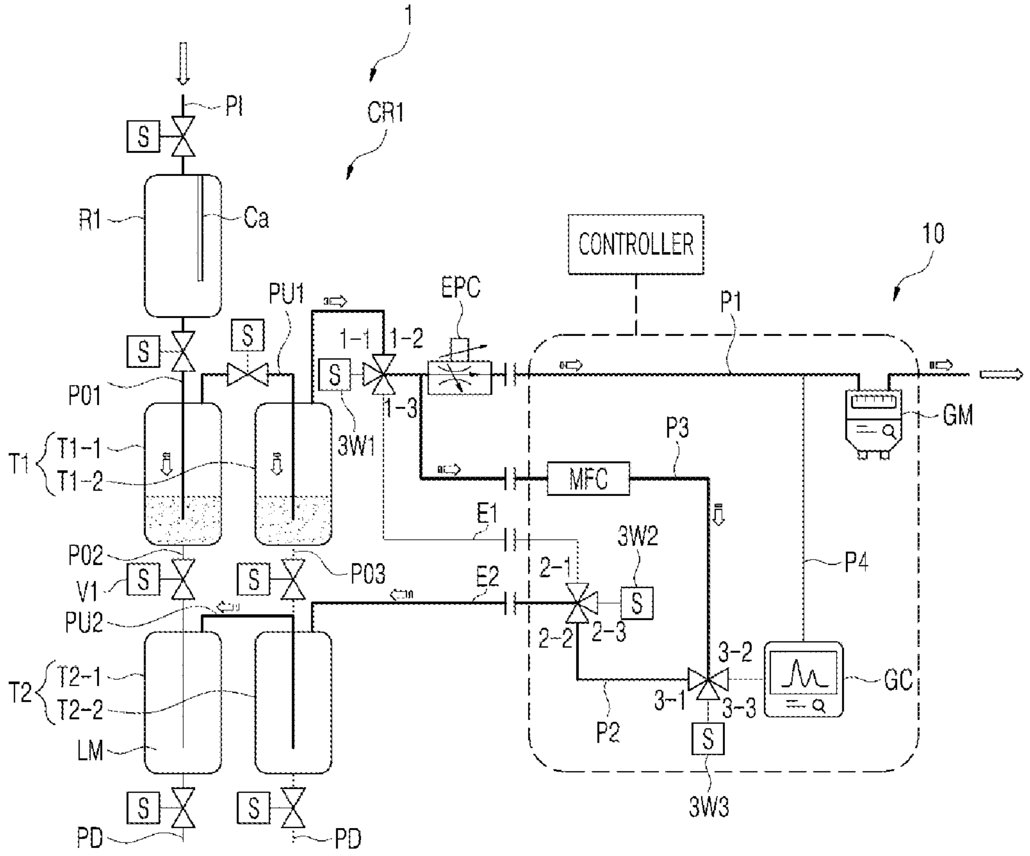
FIG. 5 is a diagram illustrating a pressure maintenance section of the automated liquid sampling system of FIG. 1.
Figure 6:
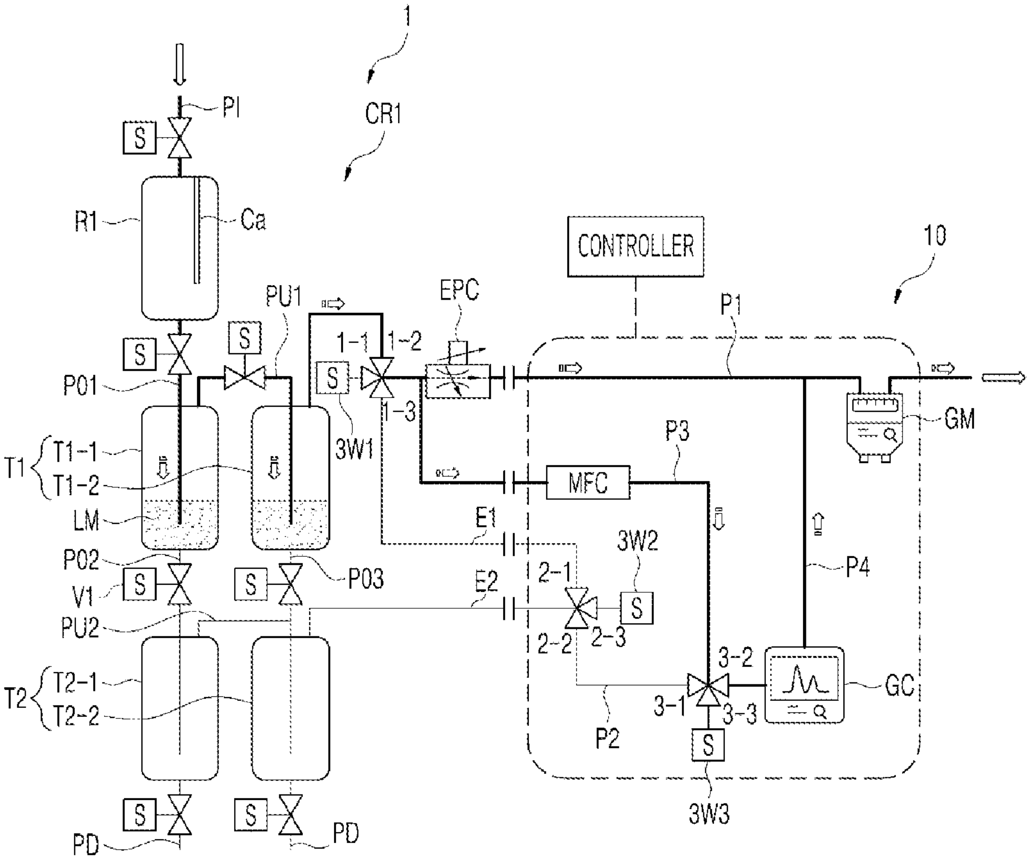
FIG. 6 is a diagram illustrating a secondary sampling section of the automated liquid sampling system of FIG. 1.

FIG. 5 is a diagram illustrating a pressure maintenance section of the automated liquid sampling system 1000 of FIG. 1. FIG. 6 is a diagram illustrating a secondary sampling section of the automated liquid sampling system 1000 of FIG. 1.

Figure 7:
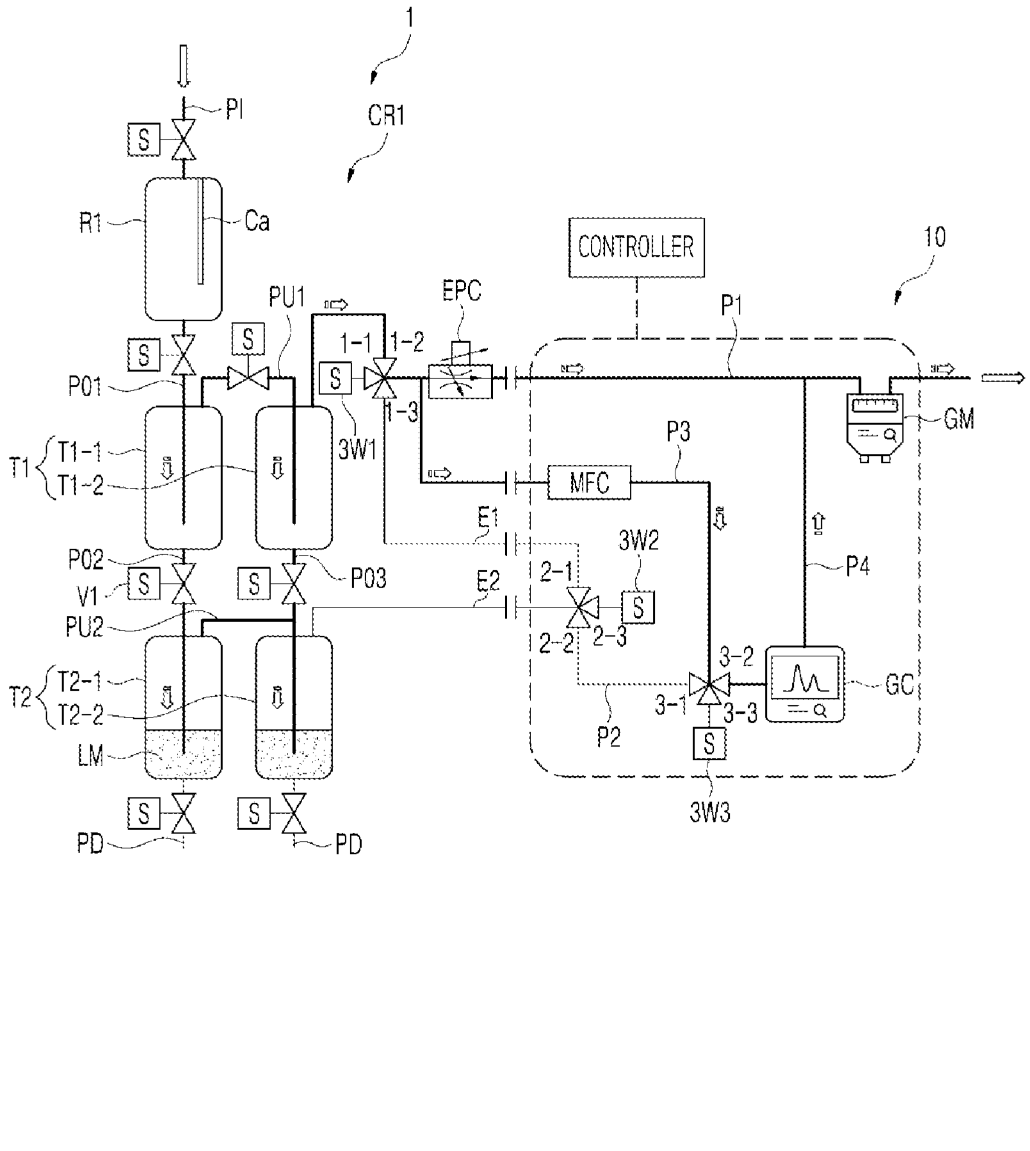
FIG. 7 is a diagram illustrating a liquid movement section of the automated liquid sampling system of FIG. 1.

FIG. 7 is a diagram illustrating a liquid movement section of the automated liquid sampling system 1000 of FIG. 1.

Figure 25:
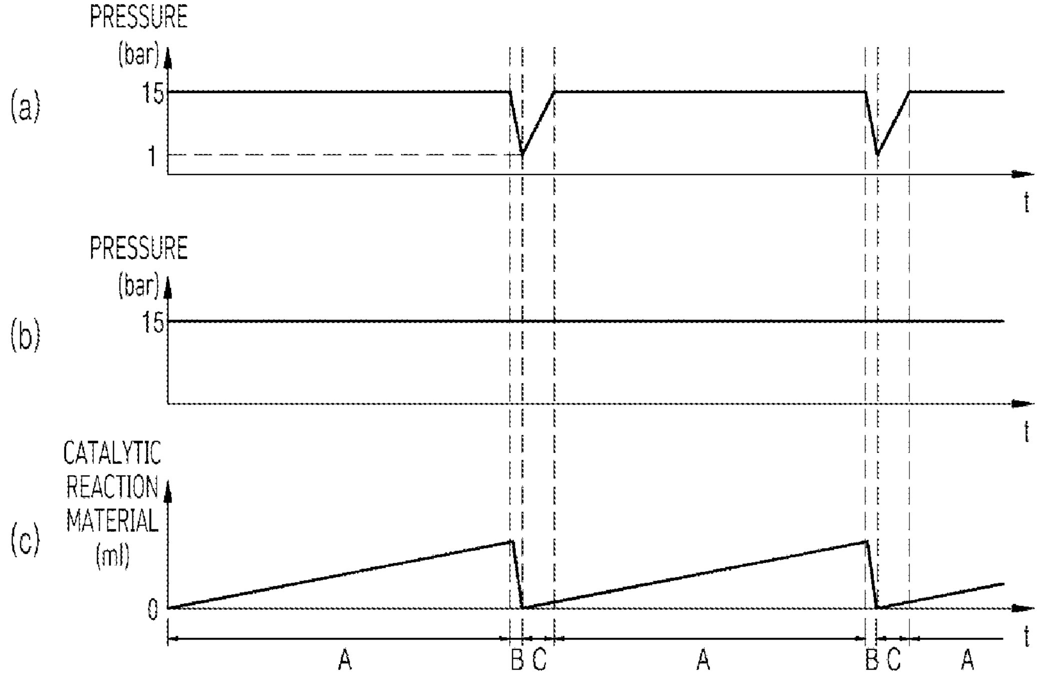
In FIG. 25, (a) is a graph illustrating an internal pressure of a second trap during one cycle of the automated liquid sampling system of FIG. 1.

(a) of FIG. 25 is a graph illustrating an internal pressure of the second trap T2 during one cycle of the automated liquid sampling system 1000 of FIG. 1. (b) of FIG. 25 is a graph illustrating an internal pressure of the first reactor during the one cycle of the automated liquid sampling system 1000 of FIG. 1. (c) of FIG. 25 is a graph illustrating an amount of liquid product LM collected by the first catalytic reactor CR1 during the one cycle of the automated liquid sampling system 1000 of FIG. 1.

In (c) of FIG. 25, B indicates the drainage section. In (c) of FIG. 25, C indicates the pressure maintenance section. In (a) of FIG. 25, A indicates the secondary sampling section, the liquid movement section, the normal state section, and the primary sampling section.

Hereinafter, a method of using the automated liquid sampling system 1000 according to the first embodiment of the present invention will be described. Configurations of the automated liquid sampling system 1000 according to the first embodiment of the present invention may be more specifically understood through the description of the method of using the system.

As illustrated in FIGS. 2 to 7, the one cycle of the automated liquid sampling system 1000 according to the first embodiment of the present invention includes the normal state section, the primary sampling section, the drainage section, the pressure maintenance section, the secondary sampling section, and the liquid movement section.

During the one cycle of the automated liquid sampling system 1000 according to the first embodiment of the present invention, the electromagnetic valve of each of the inlet pipe PI and the first discharge pipe PO1 is maintained in the opened state.

As illustrated in FIG. 2, the controller closes the first connection valve and the second connection valve and opens the first valve V1 in the normal state section. Hence, the product discharged from the first reaction unit R1 to the (1-1)th trap T1-1 flows into the (2-1)th trap T2-1. The gas flowing into the (2-1)th trap T2-1 flows into the (2-2)th trap T2-2 through the second connection pipe PU2.

The controller controls the (1-1)th trap T1-1 and the (2-1)th trap T2-1 to have the same temperature. An internal temperature of each of the (1-1)th trap T1-1 and the (2-1)th trap T2-1 may be lower than a boiling point of the first product and higher than a boiling point of the second product. As an example, in a case where a heater is attached to an outer surface of each of the (1-1)th trap T1-1 and the (2-1)th trap T2-1, the internal temperatures of each of the (1-1)th trap T1-1 and the (2-1)th trap T2-1 may be maintained at 200° C. Hence, a first product having a liquid phase is collected in the (2-1)th trap T2-1. The first product liquefied in the (1-1)th trap T1-1 is collected in the (2-1)th trap T2-1 through the second discharge pipe PO2.

The internal temperature of the (2-2)th trap T2-2 may be lower than the boiling point of the second product. As an example, in a case where a cooler is attached to each of the (1-2)th trap T1-2 and the (2-2)th trap T2-2, the internal temperature of the (2-2)th trap T2-2 may be maintained at 0° C. Hence, a second product having a liquid phase is collected in the (2-2)th trap T2-2.

In the normal state section, the controller connects the (1-2)th inlet 1-2 to the (1-3)th inlet 1-3 of the first three-way valve 3W1. Further, the controller connects the (2-1)th inlet 2-1 to the (2-2)th inlet 2-2 of the second three-way valve 3W2. In addition, the controller connects the (3-2)th inlet 3-2 to the (3-3)th inlet 3-3 of the third three-way valve 3W3.

Hence, the gas discharged from the (2-2)th trap T2-2 sequentially flows through the second flow channel E2, the first flow channel E1, and the first pipe P1 and is discharged into the outside air. In addition, the gas discharged from the (2-2)th trap T2-2 sequentially flows through the second flow channel E2, the first flow channel E1, the third pipe P3, the fourth pipe P4, and the first pipe P1 and is discharged to the outside air.

In the normal state section, the gas meter GM displays a total amount of gas flowing through the first pipe P1. The controller receives a measured value from the gas meter GM. In the normal state section, the gas analyzer GC separates, as a single component, a trace of a component of a mixed gas flowing through the fourth pipe P4 and analyzes the component. The controller receives a measured value of the gas analyzer GC.

In the normal state section, the controller may control the electronic pressure controller EPC to maintain an internal pressure of each of the first reaction unit R1, the first trap T1, and the second trap T2 at 15 bar.

As illustrated in FIG. 3, the controller closes the first valve V1 and the second connection valve and opens the first connection valve in the primary sampling section. Hence, the product discharged from the first reaction unit R1 to the (1-1)th trap T1-1 does not flow into the (2-1)th trap T2-1. The gas flowing into the (1-1)th trap T1-1 flows into the (1-2)th trap T1-2 through the first connection pipe PU1. Hence, a first product having a liquid phase is collected in the (1-1)th trap T1-1. Further, a second product having a liquid phase is collected in the (1-2)th trap T1-2.

In the primary sampling section, the controller connects the (1-1)th inlet 1-1 to the (1-2)th inlet 1-2 of the first three-way valve 3W1. In the primary sampling section, the controller may connect the (2-1)th inlet 2-1 to the (2-3)th inlet 2-3 of the second three-way valve 3W2. Hence, a gas is blocked from moving between the inside of the second trap T2 and the automated liquid sampling device 10 as well as the inside of the first trap T1. Hence, in the drainage section, when the liquid product LM is drained from the second trap T2, the pressure reduction in the first reaction unit R1 is prevented.

In the first sampling section, the gas discharged from the (1-2)th trap T1-2 flows through the first pipe P1 and is discharged to the outside air. In addition, the gas discharged from the (1-2)th trap T1-2 sequentially flows through the third pipe P3, the fourth pipe P4, and the first pipe P1 and is discharged to the outside air.

In the primary sampling section, the gas meter GM displays a total amount of gas flowing through the first pipe P1. The controller receives a measured value from the gas meter GM. In the primary sampling section, the gas analyzer GC separates, as a single component, a trace of a component of a mixed gas flowing through the fourth pipe P4 and analyzes the component. The controller receives a measured value of the gas analyzer GC.

In the primary sampling section, the controller may control the electronic pressure controller EPC to maintain an internal pressure of each of the first reaction unit R1, the first trap T1, and the second trap T2 at 15 bar.

As illustrated in FIG. 4, the controller or a manager opens the electromagnetic valve of the drainage pipe PD in the drainage section. The controller opens the electromagnetic valve of the drainage pipe PD at a preset time. Alternatively, the controller may be set not to automatically open the electromagnetic valve of the drainage pipe PD. That is, the manager himself or herself may open the electromagnetic valve of the drainage pipe PD. Instead of the electromagnetic valve, a manual on-off valve may be installed at the drainage pipe PD.

In the drainage section, the first product having a liquid phase collected in the (2-1)th trap T2-1 is sampled to an external container. Further, the second product having a liquid phase collected in the (2-2)th trap T2-2 is sampled to another external container.

As described above, in the drainage section, when the liquid product LM is drained from the second trap T2, the pressure reduction in the first reaction unit R1 is prevented.

In the drainage section, the gas discharged from the (1-2)th trap T1-2 flows through the first pipe P1 and is discharged to the outside air. In addition, the gas discharged from the (1-2)th trap T1-2 sequentially flows through the third pipe P3, the fourth pipe P4, and the first pipe P1 and is discharged to the outside air.

In the drainage section, the gas meter GM displays a total amount of gas flowing through the first pipe P1. The controller receives a measured value from the gas meter GM. In the drainage section, the gas analyzer GC separates, as a single component, a trace of a component of a mixed gas flowing through the fourth pipe P4 and analyzes the component. The controller receives a measured value of the gas analyzer GC.

In the drainage section, the internal pressure of the second trap T2 is reduced to be lower than 15 bar. However, in the drainage section, the controller may control the electronic pressure controller EPC to maintain an internal pressure of each of the first reaction unit R1 and the first trap T1 at 15 bar.

As illustrated in FIG. 5, in the pressure maintenance section, the controller connects the (2-2)th inlet 2-2 to the (2-3)th inlet 2-3 of the second three-way valve 3W2 and connects the (3-1)th inlet 3-1 to the (3-2)th inlet 3-2 of the third three-way valve 3W3.

In the pressure maintenance section, the gas discharged from the (1-2)th trap T1-2 flows through the first pipe P1 and is discharged to the outside air. In addition, the gas discharged from the (1-2)th trap T1-2 sequentially flows through the third pipe P3, the second pipe P2, and the second flow channel E2 and flows into the (2-2)th trap T2-2. The gas flowing into the (2-2)th trap T2-2 flows into the (2-1)th trap T2-1 through the second connection pipe PU2.

In the pressure maintenance section, the controller controls the electronic pressure controller EPC to maintain the internal pressure of each of the first reaction unit R1 and the first trap T1 at 15 bar. In the pressure maintenance section, the internal pressure of the second trap T2 gradually rises to 15 bar. The controller continuously receives measured values of the pressure sensor provided in the second trap T2. When the internal pressure of the second trap T2 reaches 15 bar, the controller initiates the secondary sampling section.

In the pressure maintenance section, the gas meter GM displays a total amount of gas flowing through the first pipe P1. The controller receives a measured value from the gas meter GM. In the pressure maintenance section, the inflow of a gas into the fourth pipe P4 is stopped. Hence, the operation of the gas analyzer (GC) is stopped in the pressure maintenance section.

As illustrated in FIG. 6, the controller connects the (3-2)th inlet 3-2 to the (3-3)th inlet 3-3 of the third three-way valve 3W3 in the secondary sampling section. In the primary sampling section, the controller may connect the (2-1)th inlet 2-1 to the (2-3)th inlet 2-3 of the second three-way valve 3W2.

In the secondary sampling section, the first product having a liquid phase is collected in the (1-1)th trap T1-1. Further, a second product having a liquid phase is collected in the (1-2)th trap T1-2.

In the secondary sampling section, the gas discharged from the (1-2)th trap T1-2 flows through the first pipe P1 and is discharged to the outside air. In addition, the gas discharged from the (1-2)th trap T1-2 sequentially flows through the third pipe P3, the fourth pipe P4, and the first pipe P1 and is discharged to the outside air.

In the secondary sampling section, the gas meter GM displays a total amount of gas flowing through the first pipe P1. The controller receives a measured value from the gas meter GM. In the secondary sampling section, the gas analyzer GC separates, as a single component, a trace of a component of the mixed gas flowing through the fourth pipe P4 and analyzes the component. The controller receives a measured value of the gas analyzer GC.

In the secondary sampling section, the controller may control the electronic pressure controller EPC to maintain an internal pressure of each of the first reaction unit R1, the first trap T1, and the second trap T2 at 15 bar.

As illustrated in FIG. 7, the controller opens the first valve V1 and the second connection valve in the liquid movement section. Hence, the first product having a liquid phase collected in the (1-1)th trap T1-1 is collected in the (2-1)th trap T2-1. Further, the first product having a liquid phase collected in the (1-2)th trap T1-2 is collected in the (2-2)th trap T2-2.

As described above, in the pressure maintenance section, the second trap T2 has the same pressure as the first reaction unit R1. Hence, in the liquid movement section, even when the first valve V1 is re-opened, the pressure reduction in the first reaction unit R1 is prevented.

As illustrated in FIG. 2, when the movement of the liquid product LM from the first trap T1 to the second trap T2 is completed, the controller connects the (1-2)th inlet 1-2 to the (1-3)th inlet 1-3 of the first three-way valve 3W1 and connects the (2-1)th inlet 2-1 to the (2-2)th inlet 2-2 of the second three-way valve 3W2. In addition, the controller closes the first connection valve and the second connection valve.

Hence, the gas discharged from the (2-2)th trap T2-2 sequentially flows through the second flow channel E2, the first flow channel E1, and the first pipe P1 and is discharged into the outside air. In addition, the gas discharged from the (2-2)th trap T2-2 sequentially flows through the second flow channel E2, the first flow channel E1, the third pipe P3, the fourth pipe P4, and the first pipe P1 and is discharged to the outside air. That is, the normal state section is re-started.

Second Embodiment

Figure 8A:
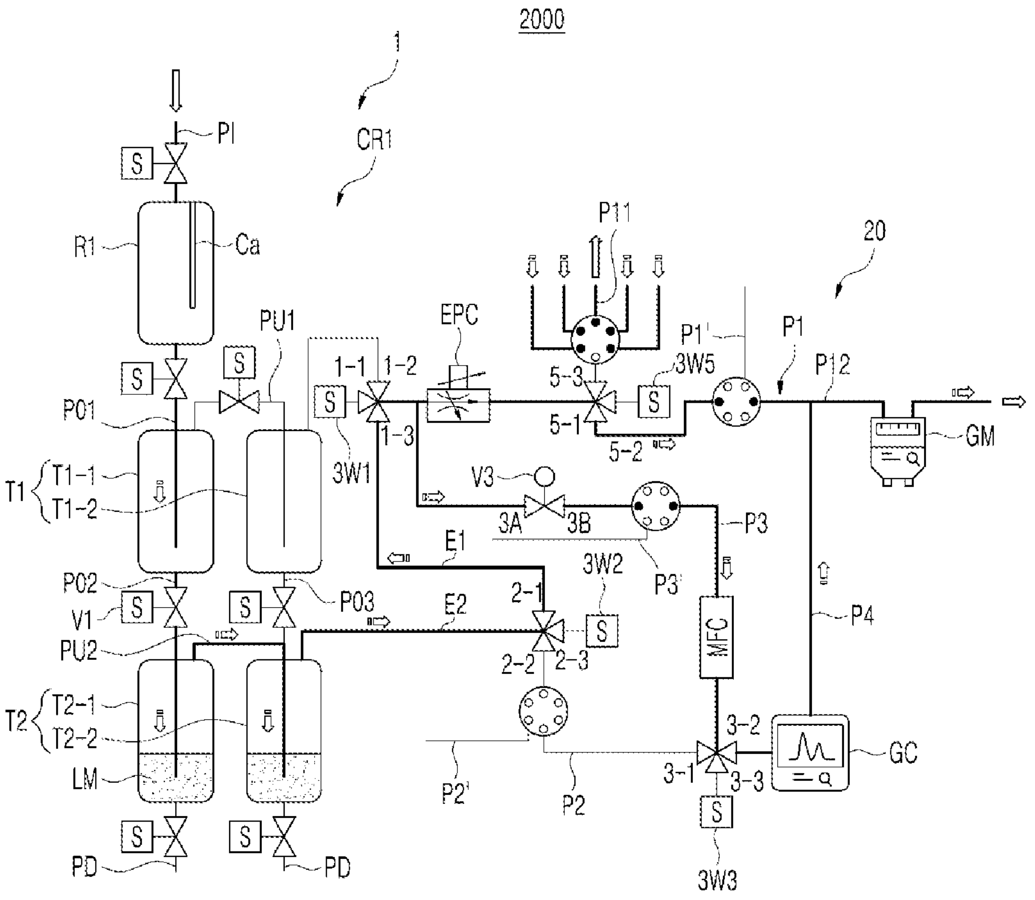
FIGS. 8A and 8B are diagrams illustrating a normal state section of an automated liquid sampling system according to a second embodiment of the present invention.
Figure 8B:
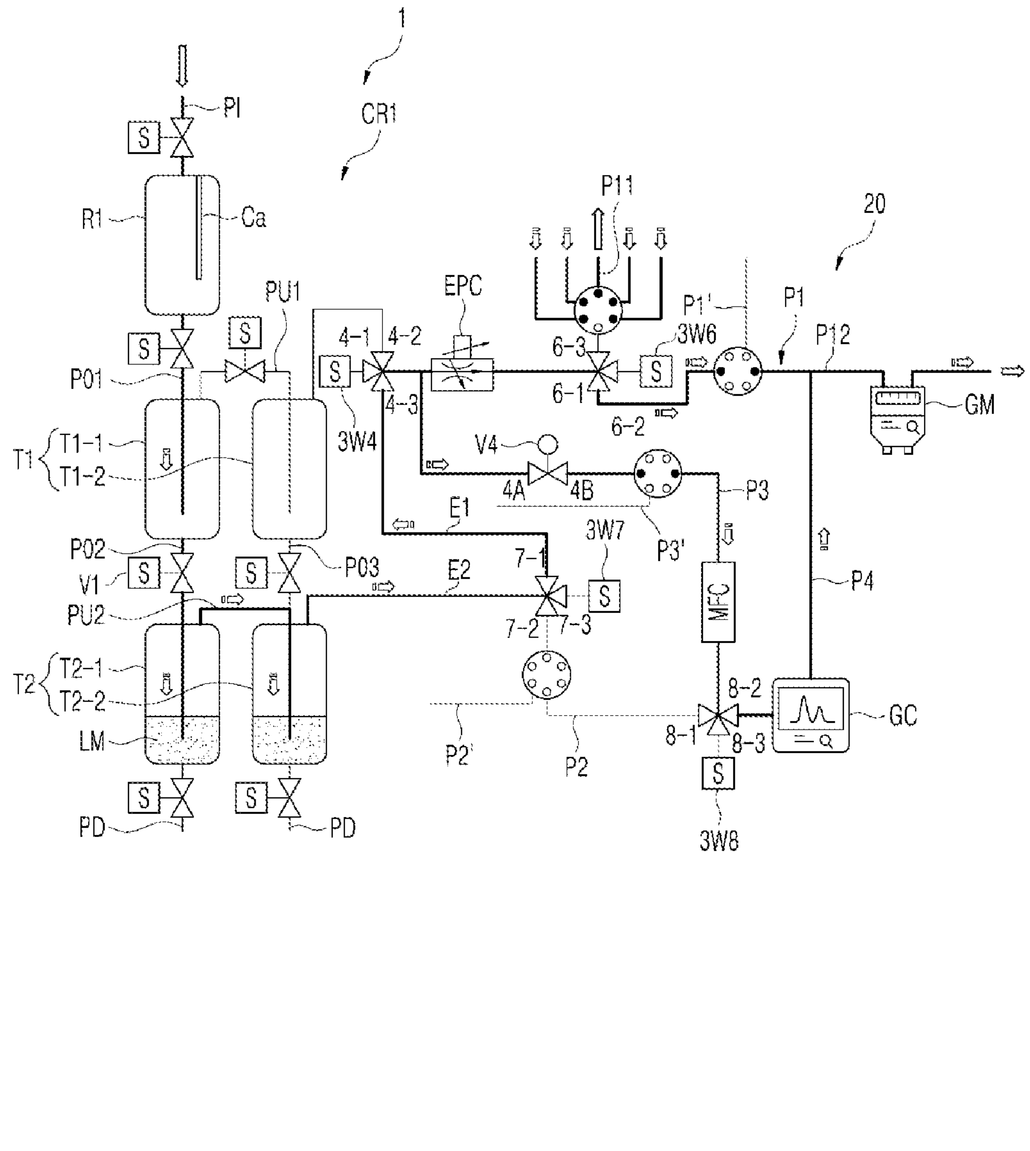

FIGS. 8A and 8B are diagrams illustrating a normal state section of an automated liquid sampling system 2000 according to a second embodiment of the present invention.

As illustrated in FIGS. 8A and 8Bb, the automated liquid sampling system 2000 according to the second embodiment of the present invention is configured to automate sampling of a liquid product LM of products of a catalytic reactor 1 and include an automated liquid sampling device 10 and a catalytic reactor 1.

As illustrated in FIGS. 8A and 8B, the catalytic reactor 1 includes a first catalytic reactor CR1 and a second catalytic reactor. The first catalytic reactor CR1 of the second embodiment of the present invention is substantially the same as the first catalytic reactor CR1 of the first embodiment. Hence, the description of the first catalytic reactor CR1 will be omitted.

As illustrated in FIG. 8B, a second catalytic reactor CR2 includes a second reaction unit R2, a third trap T3, a fourth trap T4, a second valve V2, and a fourth three-way valve.

The second catalytic reactor CR2 may have the same structure as the first catalytic reactor CR1. That is, the second reaction unit R2 may have the same structure as the first reaction unit R1. Further, the third trap T3 may have the same structure as the first trap T1. Further, the fourth trap T4 may have the same structure as the second trap T2. Further, the fourth three-way valve may have the same structure as the first three-way valve 3W1.

As illustrated in FIG. 8B, the second reaction unit R2 is configured to generate a product through a catalytic reaction. The second reaction unit R2 forms a space in which the catalytic reaction occurs. The inlet pipe PI and the first discharge pipe PO1 are connected to the second reaction unit R2. A reactant flows into the second reaction unit R2 through the inlet pipe PI. The product generated through the catalytic reaction is discharged through the first discharge pipe PO1. An electromagnetic valve (a magnetic valve or a solenoid valve) may be installed at each of the inlet pipe PI and the first discharge pipe PO1. A controller to be described below can control the electromagnetic valve.

FIG. 8B illustrates a catalytic reaction using a reactant in a gaseous form and a catalyst in a solid form, that is, a heterogeneous catalytic process. However, the catalytic reaction occurring in the second reaction unit R2 may be homogenous catalysis.

Hereinafter, for easier understanding of the present invention, the catalytic reaction occurring in the second reaction unit R2 will be described as the heterogeneous catalytic process using a gaseous reactant and a catalyst in a solid form.

Although not illustrated, the inlet pipe PI may be connected to a gas feeding device. The gas feeding device may include a gas-specific flow supply device MFC for supplying a fixed amount of a gaseous reactant. In addition, the gas feeding device may include a gas mixer and a pressure gauge at a rear end of the mixer. A heater may be attached to an outer surface of the second reaction unit R2 to increase a catalytic reaction rate.

The controller to be described below may monitor a temperature and a pressure of a gaseous reactant flowing into the second reaction unit R2 from the gas feeding device. In addition, the controller may monitor a temperature and a pressure of a gas (a reactant and a product) supplied from the second reaction unit R2 to the third trap T3.

A product generated by the catalytic reaction in the second reaction unit R2 may include a gaseous product, a liquid product LM, and a solid product. A ratio of the gaseous product, the liquid product LM, and the solid product may vary depending on the internal temperature and pressure of the second reaction unit R2. A pressure sensor may be provided in the second reaction unit R2. The internal pressure of the second reaction unit R2 may be higher than the atmospheric pressure. As an example, the internal pressure of the second reaction unit R2 may be 15 bar.

As illustrated in FIG. 8B, the third trap T3 is connected to the second reaction unit R2 through the first discharge pipe PO1. The product generated by the catalytic reaction in the second reaction unit R2 flows into the third trap T3 through the first discharge pipe PO1. The third trap T3 is formed to have an internal pressure equal to that of the second reaction unit R2. A pressure sensor may be provided in the third trap T3. As an example, in a case where the internal pressure of the second reaction unit R2 is 15 bar, the internal pressure of the third trap T3 may be 15 bar.

The third trap T3 collects the liquid product LM. An internal temperature of the third trap T3 may be lower than a boiling point of the product. A heater or a cooler may be attached to an outer surface of the third trap T3 to control the internal temperature of the third trap T3 to a specific temperature. As an example, in the case where the cooler is attached thereto, the internal temperature of the third trap T3 may be maintained at 0° C.

As illustrated in FIG. 8B, the fourth trap T4 is connected to the third trap T3 through a second discharge pipe PO2. The liquid product LM collected in the third trap T3 flows into the fourth trap T4 together with the gaseous product and the reactant. A pressure sensor may be provided in the fourth trap T4. A heater or a cooler may be attached to an outer surface of the fourth trap T4 to control an internal temperature of the fourth trap T4 to be equal to the internal temperature of the third trap T3.

The second valve V2 is provided at the second discharge pipe PO2. The second valve V2 may be provided as an electromagnetic valve (a magnetic valve or a solenoid valve). The controller may control the second valve V2. The fourth trap T4 may selectively collect the liquid product LM by opening and closing the second valve V2. In a state where the second valve V2 is opened, the inside of the fourth trap T4 has the same temperature and pressure as the inside of the first trap T1.

A drainage pipe PD is connected to a lower side of the fourth trap T4. The liquid product LM collected in the fourth trap T4 may be discharged through the drainage pipe PD. An electromagnetic valve (a magnetic valve or a solenoid valve) may be installed at the drainage pipe PD. A controller to be described below can control the electromagnetic valve.

As illustrated in FIG. 8B, in a case where the product is a mixture, the third trap T3 and the fourth trap T4 may be provided in plurality. As an example, in a case where the product includes a first product and a second product, the third trap T3 may include a (3-1)th trap T3-1 and a (3-2)th trap T3-2. Further, the fourth trap T4 may include a (4-1)th trap T4-1 and a (4-2)th trap T4-2.

The (3-1)th trap T3-1 and the (4-1)th trap T4-1 may be controlled to have the same temperature. Internal temperatures of the (3-1)th trap T3-1 and the (3-1)th trap T3-1 may be lower than a boiling point of the first product and higher than a boiling point of the second product. As an example, in the case where a heater is attached to an outer surface of each of the (3-1)th trap T3-1 and the (4-1)th trap T4-1, the internal temperature of each of the (3-1)th trap T3-1 and the (4-1)th trap T4-1 may be maintained at 200° C.

The (3-2)th trap T3-2 and the (4-2)th trap T4-2 may be controlled to have the same temperature. Internal temperatures of the (3-2)th trap T3-2 and the (4-2)th trap T4-2 may be lower than the boiling point of the second product. As an example, in a case where a cooler is attached to each of the (3-2)th trap T3-2 and the (4-2)th trap T4-2, the internal temperature of each of the (3-2)th trap T3-2 and the (4-2)th trap T4-2 may be maintained at 0° C.

The (3-1)th trap T3-1 and the (3-2)th trap T3-2 are connected by a first connection pipe PU1. A first connection valve is provided at the first connection pipe PU1. The first connection valve may be provided as an electromagnetic valve (a magnetic valve or a solenoid valve. In a case where the first connection valve is opened, a gas flowing into the (3-1)th trap T3-1 flows into the (3-2)th trap T3-2 through the first connection pipe PU1.

The (4-1)th trap T4-1 and the (4-2)th trap T4-2 are connected by a second connection pipe PU2. A gas flowing into the (4-1)th trap T4-1 flows into the (4-2)th trap T4-2 through the second connection pipe PU2.

The (4-1)th trap T4-1 is connected to the (3-1)th trap T3-1 by a second discharge pipe PO2. The (4-2)th trap T4-2 is connected to the (3-2)th trap T3-2 by a third discharge pipe PO3. A second connection valve is provided at the third discharge pipe PO3. The second connection valve may be provided as an electromagnetic valve (a magnetic valve or a solenoid valve). The controller may control the second connection valve. The (4-2)th trap T4-2 may selectively collect the liquid product LM collected in the (3-2)th trap T3-2 by opening and closing the second connection valve. A drainage pipe PD is connected to a lower side of each of the (4-1)th trap T4-1 and the (4-2)th trap T4-2.

As illustrated in FIG. 8B, the fourth three-way valve is configured to connect the third trap T3 to the automated liquid sampling device 10 and has inlets in three directions. That is, the fourth three-way valve has a (4-1)th inlet 4-1, a (4-2)th inlet 4-2, and a (4-3)th inlet 4-3. The fourth three-way valve may be provided as a three-way solenoid valve. The controller to be described below controls the fourth three-way valve.

The fourth three-way valve connects a flow channel on the (4-1)th inlet 4-1 side to the third trap T3. The above-mentioned ‘flow channel on an inlet side’ may mean a flow channel of the inlet itself or may mean a flow channel (a pipe, a tube) connected to the inlet.

As illustrated in FIGS. 8A and 8B, an automated liquid sampling device 20 according to the second embodiment of the present invention includes a first pipe P1, a second pipe P2, a third pipe P3, and a fourth pipe P4, a second three-way valve 3W2, a third three-way valve 3W3, a seventh three-way valve 3W7, a controller, and a case. The controller and the case are omitted in the drawings.

As illustrated in FIGS. 8A and 8B, the first pipe P1 includes a fifth three-way valve 3W5, a sixth three-way valve 3W6, a first exhaust pipe P11, and a second exhaust pipe P12.

As illustrated in FIG. 8A, the fifth three-way valve 3W5 has a (5-1)th inlet 5-1, a (5-2)th inlet 5-2, and a (5-3)th inlet 5-3. A flow channel on the (5-1)th inlet 5-1 side of the fifth three-way valve 3W5 is connected to the flow channel on the (1-2)th inlet 1-2 side. An electronic pressure controller EPC may be installed at the flow channel on the (5-1)th inlet 5-1 side or the flow channel on the (1-2)th inlet 1-2 side.

As illustrated in FIG. 8B, the sixth three-way valve 3W6 has a (6-1)th inlet 6-1, a (6-2)th inlet 6-2, and a (6-3)th inlet 6-3. A flow channel on the (6-1)th inlet 6-1 side of the sixth three-way valve 3W6 is connected to a flow channel on the (4-2)th inlet 4-2 side. A flow channel on the (6-1)th inlet 6-1 side of the sixth three-way valve 3W6 is connected to the flow channel on the (4-2)th inlet 4-2 side of the fourth three-way valve. An electronic pressure controller EPC may be installed at the flow channel on the (6-1)th inlet 6-1 side or the flow channel on the (4-2)th inlet 4-2 side.

The controller may control the electronic pressure controller EPC by receiving a signal from a pressure sensor provided in each of the first catalytic reactor CR1 and the second catalytic reactor CR2. As an example, in a case where the internal pressure of the second reaction unit R2 is set to 15 bar, the controller may control the electronic pressure controller EPC to maintain a pressure in the first pipe P1 or the flow channel on the (4-2)th inlet 4-2 side at 15 bar.

A wet gas meter GM is installed at the second exhaust pipe P12. The gas meter GM displays a total amount of gas passing inside the second pipe P12. The controller receives a measured value from the gas meter GM.

As illustrated in FIG. 8A, the second three-way valve 3W2 has inlets formed in three directions. That is, the second three-way valve 3W2 forms a (2-1)th inlet 2-1, a (2-2)th inlet 2-2, and a (2-3)th inlet 2-3. The second three-way valve 3W2 may be provided as a three-way solenoid valve. The controller controls the second three-way valve 3W2.

The second three-way valve 3W2 connects a flow channel on the (2-1)th inlet 2-1 side to a flow channel on the (1-3)th inlet 1-3 side by a pipe fitting. The flow channel on the (2-1)th inlet 2-1 side and the flow channel on the (1-3)th inlet 1-3 side form a first flow channel E1 through which a gas flows.

Further, the second three-way valve 3W2 connects a flow channel on the (2-2)th inlet 2-2 side to the second trap T2 by a pipe fitting. The flow channel on the (2-2)th inlet 2-2 side connected to the second trap T2 forms a second flow channel E2 through which a gas flows.

As illustrated in FIG. 8B, the seventh three-way valve 3W7 has inlets formed in three directions. That is, the seventh three-way valve 3W7 has a (7-1)th inlet 7-1, a (7-2)th inlet 7-2, and a (7-3)th inlet 7-3. The seventh three-way valve 3W7 may be provided as a three-way solenoid valve. The controller controls the seventh three-way valve 3W7.

The seventh three-way valve 3W7 connects a flow channel on the (7-1)th inlet 7-1 side to a flow channel on the (4-3)th inlet 4-3 side by a pipe fitting. The flow channel on the (7-1)th inlet 7-1 side and the flow channel on the (4-3)th inlet 4-3 side form a first flow channel E1 through which a gas flows.

Further, the seventh three-way valve 3W7 connects a flow channel on the (7-2)th inlet 7-2 side to the fourth trap T4 by a pipe fitting. The flow channel on the (7-2)th inlet 7-2 side connected to the fourth trap T4 forms a second flow channel E2 through which a gas flows.

A flow channel on the (7-3)th inlet 7-3 side is connected to the second pipe P2.

As illustrated in FIGS. 8A and 8B, the third three-way valve 3W3 has inlets in three directions. That is, the third three-way valve 3W3 has a (3-1)th inlet 3-1, a (3-2)th inlet 3-2, and a (3-3)th inlet 3-3. The third three-way valve 3W3 may be provided as a three-way solenoid valve. The controller controls the third three-way valve 3W3.

As illustrated in FIG. 8A, the second pipe P2 connects a flow channel on the (3-1)th inlet 3-1 side to a flow channel on the (2-3)th inlet 2-3 side. In addition, as illustrated in FIG. 8B, the second pipe P2 connects the flow channel on the (3-1)th inlet 3-1 side to the flow channel on the (7-3)th inlet 7-3 side.

That is, each of the flow channel on the (2-3)th inlet 2-3 side and the flow channel on the (7-3)th inlet 7-3 side forms a branch from the second pipe P2. The second pipe P2 forms a flow channel through which a gas flows. The second pipe P2 is provided as a pipe or a tube. The flow channel on the (2-3)th inlet 2-3 side, the flow channel on the (7-3)th inlet 7-3 side, and the second pipe P2 are connected by a pipe fitting.

As illustrated in FIGS. 8A and 8B, the third pipe P3 includes a third valve V3 and a fourth valve V4.

As illustrated in FIG. 8A, the third valve V3 has a 3A-th inlet 3A and a 3B-th inlet 3B. A flow channel on the 3A-th inlet 3A side is connected to the flow channel on the (1-2)th inlet 1-2 side. Further, a flow channel on the 3B-th inlet 3B side is connected to a flow channel on the (3-2)th inlet 3-2 side.

As illustrated in FIG. 8B, the fourth valve V4 has a 4A-th inlet 4A and a 4B-th inlet 4B. A flow channel on the 4A-th inlet 4A side is connected to the flow channel on the (4-2)th inlet 4-2 side of the fourth three-way valve. Further, the flow channel on the 4B-th inlet 4B side is connected to the flow channel on the (3-2)th inlet 3-2 side.

That is, the third pipe P3 forms a branch from the flow channel on the (3-2)th inlet 3-2 side. The third pipe P3 forms a flow channel through which a gas flows. The third pipe P3 is provided as a pipe or a tube. The flow channel on the (3-2)th inlet 3-2 side and the third pipe P3 are connected by a pipe fitting.

A flow controller MFC is installed at the third pipe P3. The controller controls the flow controller MFC. The controller controls the flow controller MFC to control a flow rate of a gas of the first three-way valve 3W1 which is distributed to the first pipe P1 and the third pipe P3. In addition, the controller may control the flow controller MFC to control a flow rate of a gas of the fourth three-way valve which is distributed to the first pipe P1 and the third pipe P3.

As illustrated in FIGS. 8A and 8B, the fourth pipe P4 connects a flow channel on the (3-3)th inlet 3-3 side to the first pipe P1. The fourth pipe P4 forms a flow channel through which a gas flows. The fourth pipe P4 is provided as a pipe or a tube. A gas analyzer GC is installed at the fourth pipe P4. The gas analyzer GC may separate, as a single component, a trace of a component of a mixed gas consisting of two or more components and analyze the component by gas chromatography. The controller receives a measured value of the gas analyzer GC.

As described above, the controller controls the first valve V1, the second valve V2, the third valve V3, the fourth valve V4, the first three-way valve 3W1, the second three-way valve 3W2, the third three-way valve 3W3, the fourth three-way valve, the fifth three-way valve 3W5, the sixth three-way valve 3W6, and the seventh three-way valve 3W7. In addition, the controller controls the electronic pressure controller EPC and the flow controller MFC. Further, the controller receives and stores the measured value of each of the gas meter GM and the gas analyzer GC.

Figure 9:
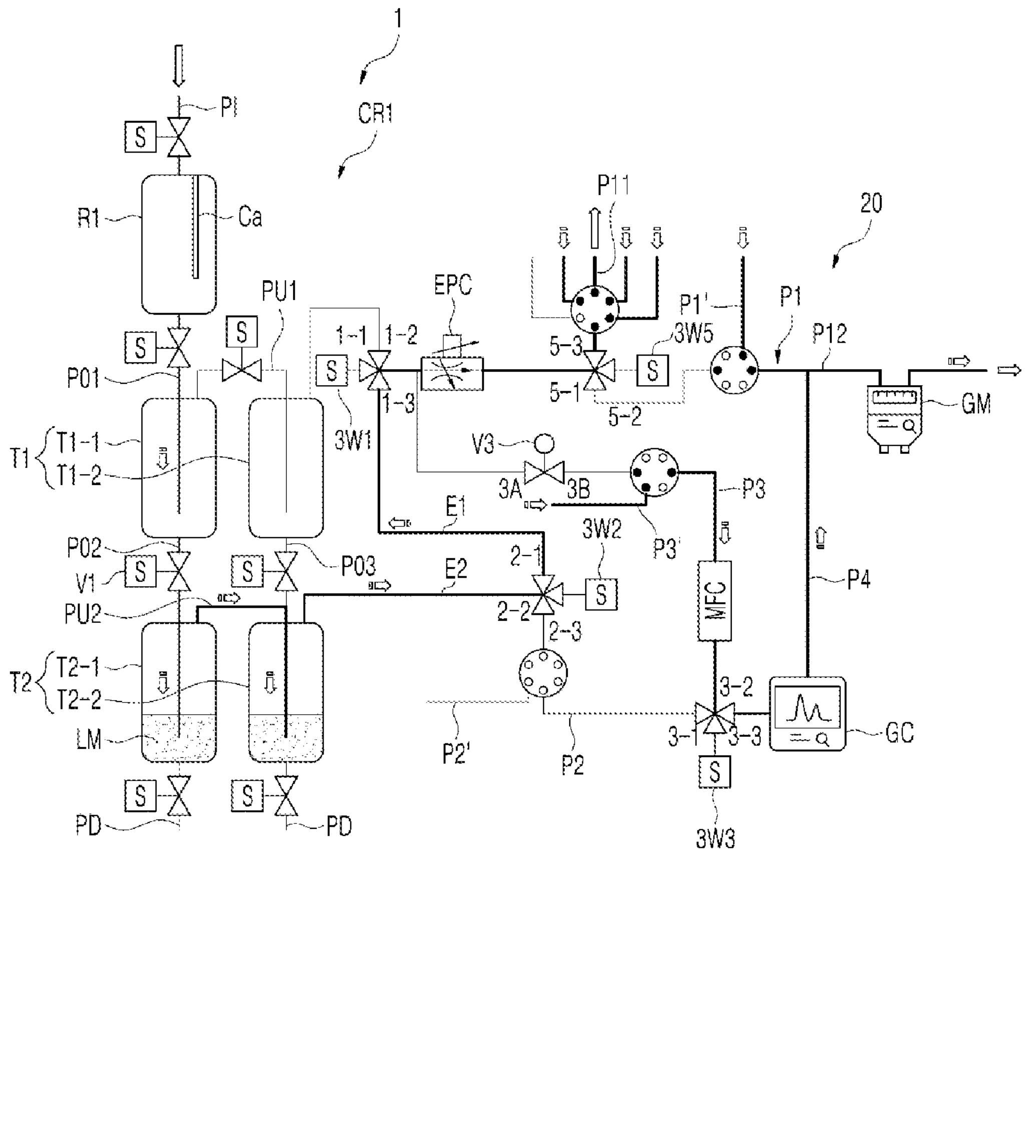
FIG. 9 is a diagram illustrating a normal state (vent mode) section of the automated liquid sampling system of FIG. 8A.
Figure 10:
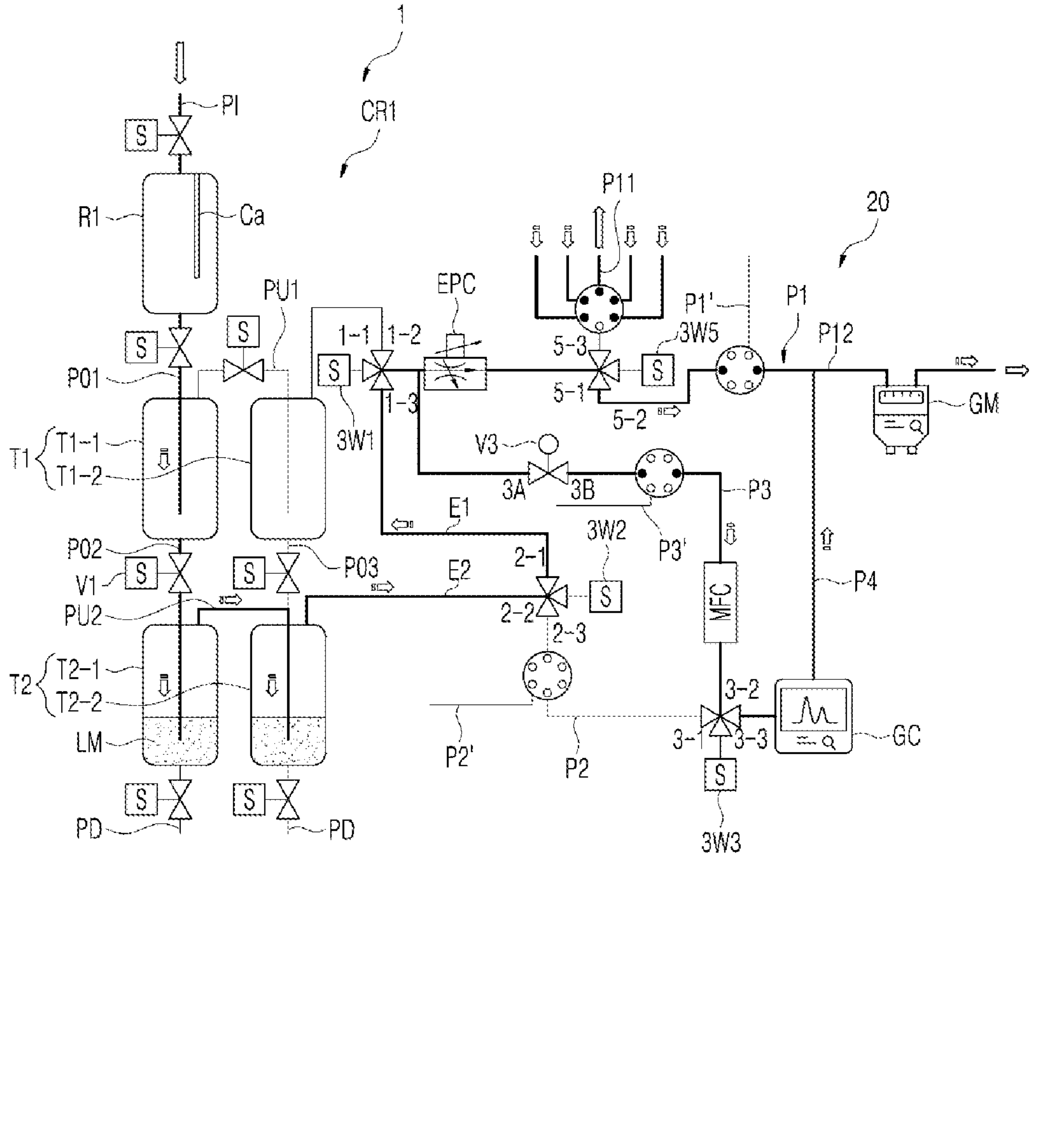
FIG. 10 is a diagram illustrating a normal state (analysis mode) section of the automated liquid sampling system of FIG. 8B.

FIG. 9 is a diagram illustrating a normal state (vent mode) section of the automated liquid sampling system 2000 of FIG. 8A. FIG. 10 is a diagram illustrating a normal state (analysis mode) section of the automated liquid sampling system 2000 of FIG. 8A.

Figure 11:
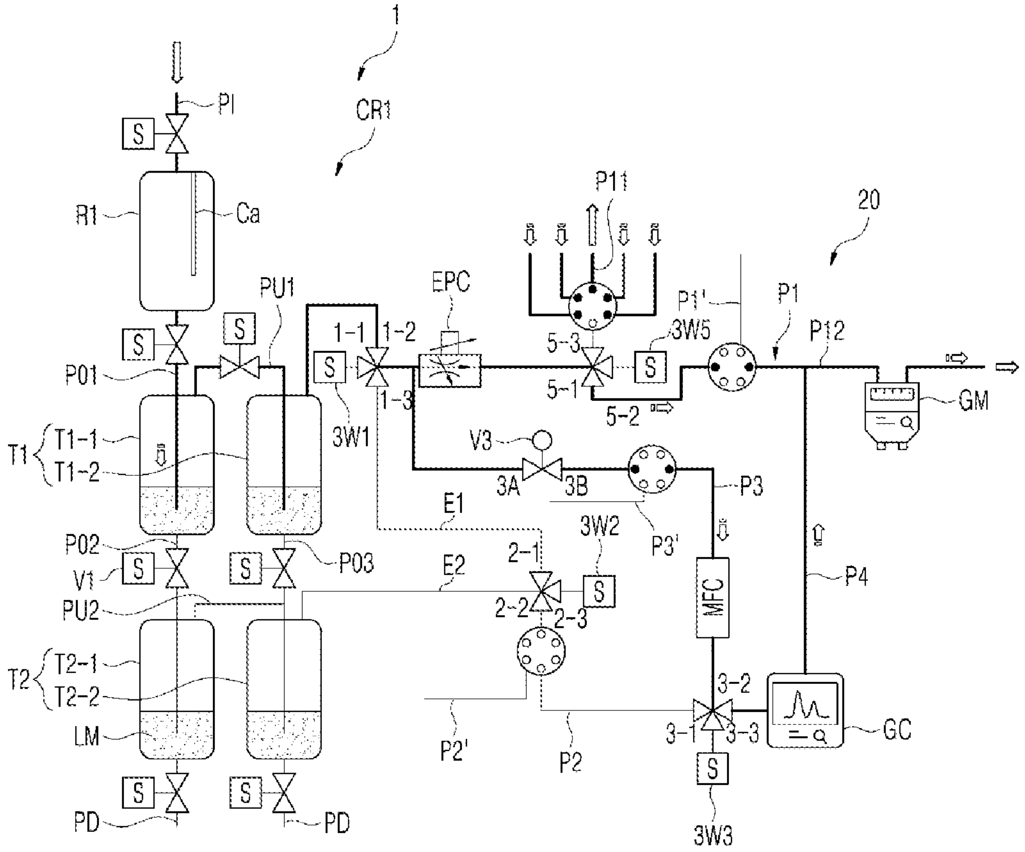
FIG. 11 is a diagram illustrating a sampling (analysis mode) section of the automated liquid sampling system of FIG. 8A.
Figure 12:
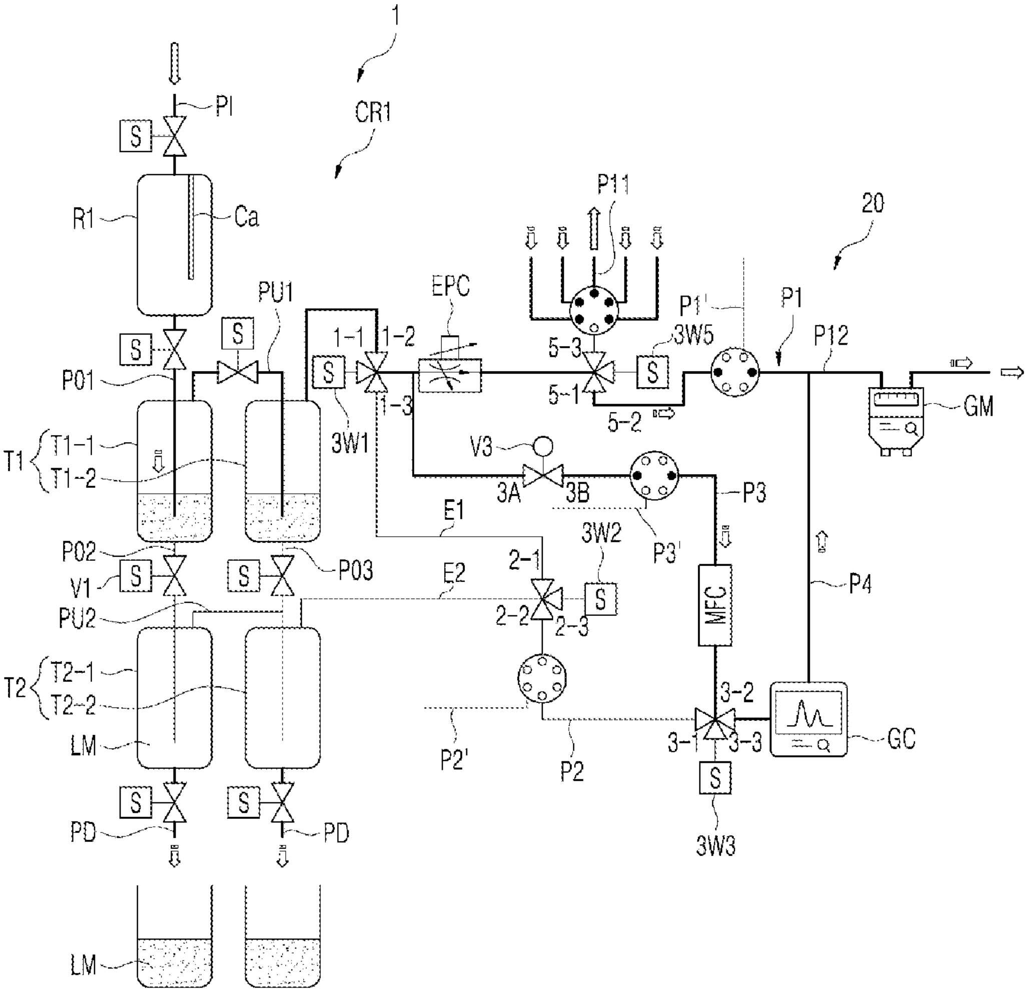
FIG. 12 is a diagram illustrating a drainage (analysis mode) section of the automated liquid sampling system of FIG. 8A.

FIG. 11 is a diagram illustrating a sampling (analysis mode) section of the automated liquid sampling system 2000 of FIG. 8A. FIG. 12 is a diagram illustrating a drainage (analysis mode) section of the automated liquid sampling system 2000 of FIG. 8A.

Figure 13:
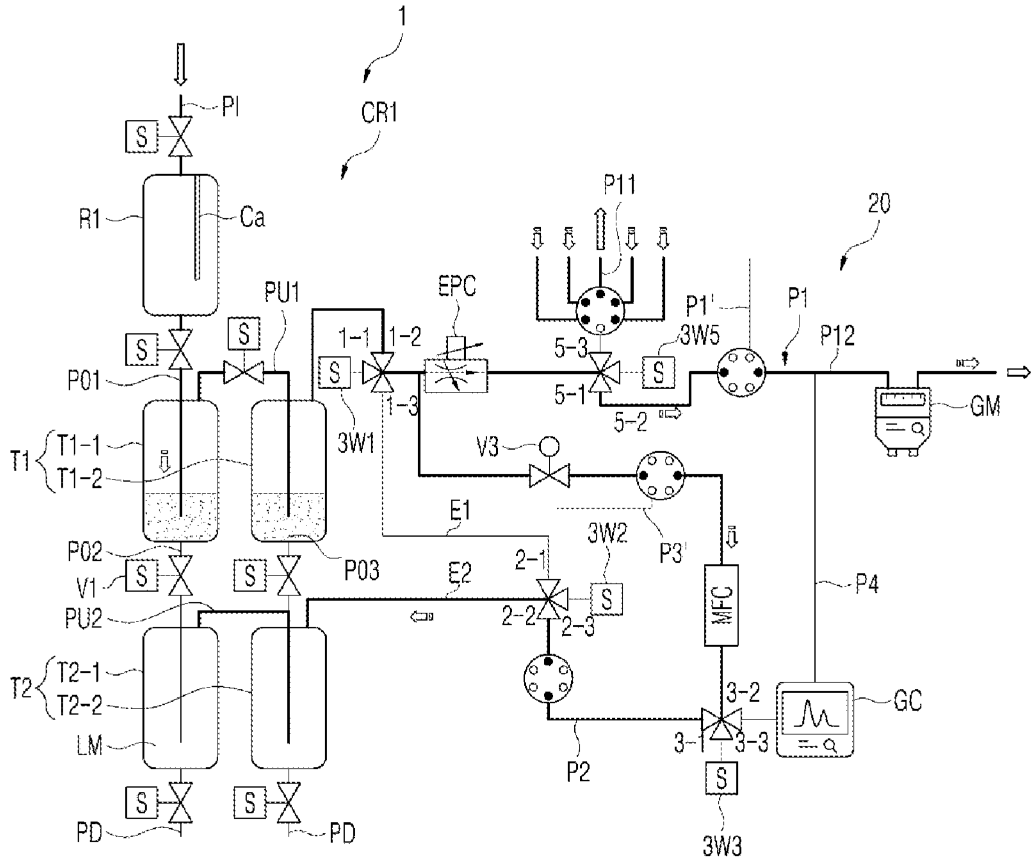
FIG. 13 is a diagram illustrating a pressure maintenance (analysis mode) section of the automated liquid sampling system of FIG. 8A.
Figure 14:
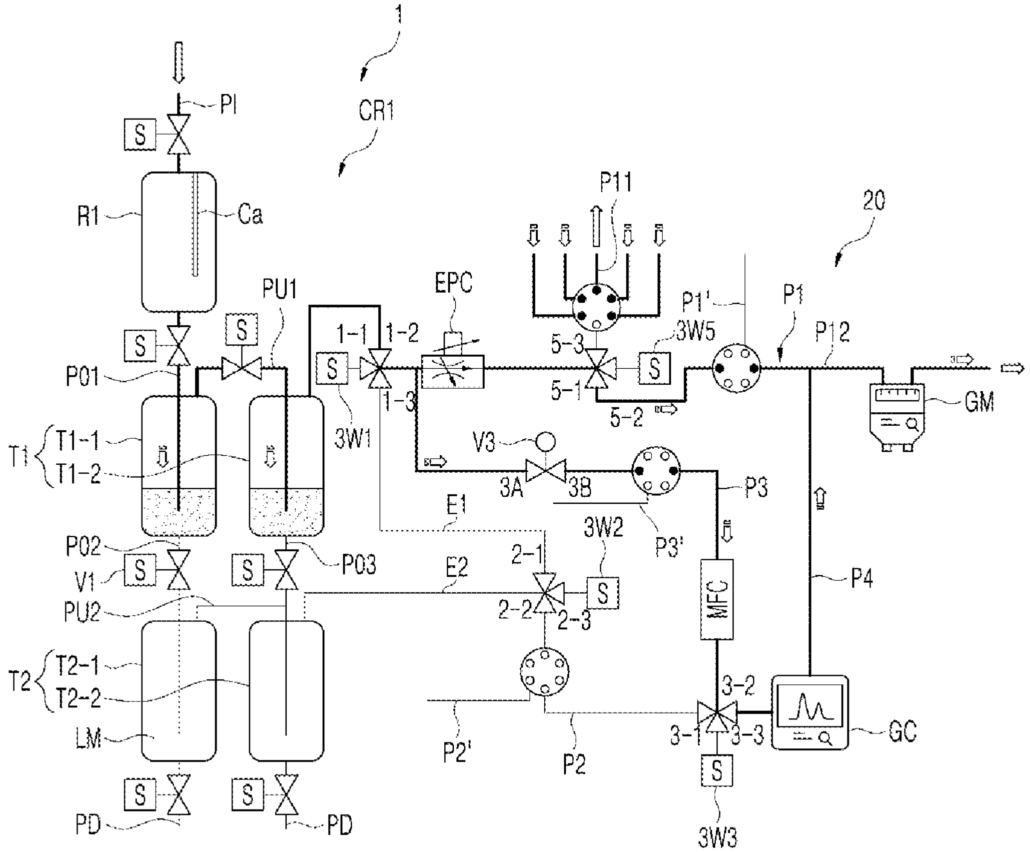
FIG. 14 is a diagram illustrating a sampling (analysis mode) section of the automated liquid sampling system of FIG. 8A.

FIG. 13 is a diagram illustrating a pressure maintenance (analysis mode) section of the automated liquid sampling system 2000 of FIG. 8A. FIG. 14 is a diagram illustrating a sampling (analysis mode) section of the automated liquid sampling system 2000 of FIG. 8A.

Figure 15:
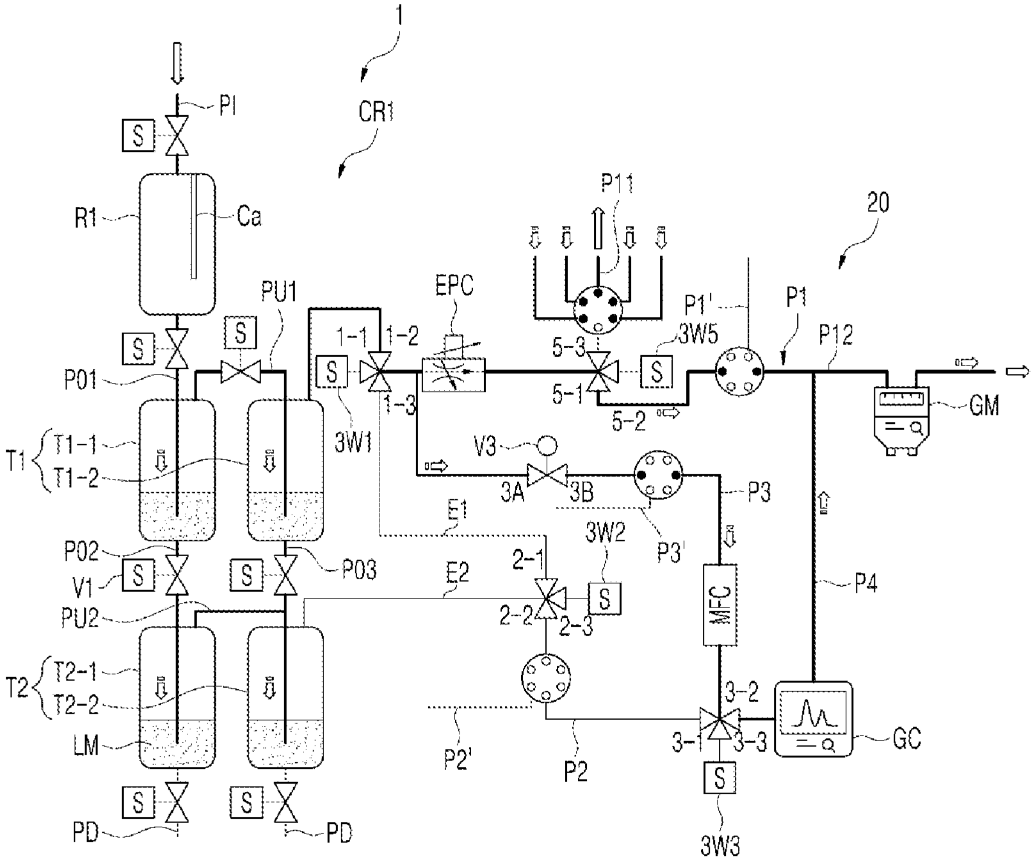
FIG. 15 is a diagram illustrating a liquid movement (analysis mode) section of the automated liquid sampling system of FIG. 8A.

FIG. 15 is a diagram illustrating a liquid movement (analysis mode) section of the automated liquid sampling system 2000 of FIG. 8A.

Figure 26:
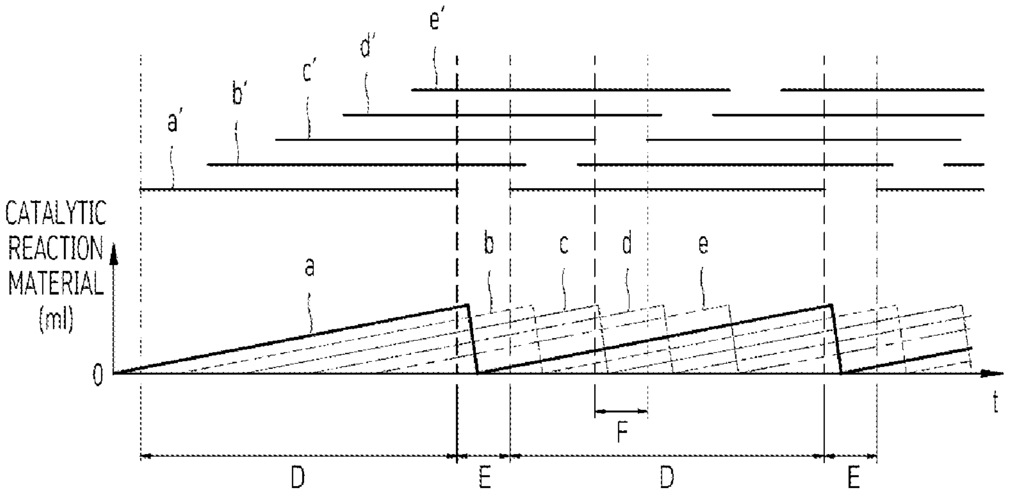
FIG. 26 is a graph illustrating amounts of liquid products collected by a plurality of catalytic reactors and a gas meter use section during the one cycle of the automated liquid sampling system of FIG. 8A.

FIG. 26 is a graph illustrating amounts of liquid products LM collected by a plurality of catalytic reactors 1 and a gas meter GM use section during the one cycle of the automated liquid sampling system 2000 of FIG. 8A.

In FIG. 26, a denotes an amount of a liquid product LM collected by the first catalytic reactor CR1, b denotes an amount of a liquid product LM collected by the second catalytic reactor CR2, c denotes an amount of a liquid product LM collected by a third catalytic reactor, d denotes an amount of a liquid product LM collected by a fourth catalytic reactor, and e denotes an amount of a liquid product LM collected by a fifth catalytic reactor.

The third catalytic reactor, the fourth catalytic reactor, and the fifth catalytic reactor can be understood to have substantially the same structure as the first catalytic reactor CR1 or the second catalytic reactor CR2.

In FIG. 26, D denotes the normal state (vent mode) section based on the first catalytic reactor CR1, and E denotes a section other than the normal state (vent mode) section based on the first catalytic reactor CR1. Further, F denotes a section other than the normal state (vent mode) section based on the third catalytic reactor.

In FIG. 26, a' denotes the normal state (vent mode) section based on the first catalytic reactor CR1, b' denotes the normal state (vent mode) section based on the second catalytic reactor CR2, c' denotes the normal state (vent mode) section based on the third catalytic reactor, d' denotes the normal state (vent mode) section based on the fourth catalytic reactor, and e' denotes the normal state (vent mode) section based on the fifth catalytic reactor.

Hereinafter, a method of using the automated liquid sampling system 2000 according to the second embodiment of the present invention will be described. Configurations of the automated liquid sampling system 2000 according to the second embodiment of the present invention may be more specifically understood through the description of the method of using the system.

As illustrated in FIGS. 8A to 15, the one cycle of the automated liquid sampling system 2000 according to the second embodiment of the present invention includes the normal state section, the normal state (vent mode) section, the normal state (analysis mode) section, the sampling (analysis mode) section, the drainage (analysis mode) section, the pressure maintenance (analysis mode) section, the sampling (analysis mode) section, and the liquid movement (analysis mode) section.

During the one cycle of the automated liquid sampling system 2000 according to the second embodiment of the present invention, the electromagnetic valve of each of the inlet pipe PI and the first discharge pipe PO1 is maintained in the opened state. Hereinafter, first, the one cycle of the automated liquid sampling system will be described based on the first catalytic reactor CR1.

As illustrated in FIG. 8A, the controller closes the first connection valve and the second connection valve of the first catalytic reactor CR1 and opens the first valve V1 in the normal state section. Hence, the product discharged from the first reaction unit R1 to the (1-1)th trap T1-1 flows into the (2-1)th trap T2-1. The gas flowing into the (2-1)th trap T2-1 flows into the (2-2)th trap T2-2 through the second connection pipe PU2.

The controller controls the (1-1)th trap T1-1 and the (2-1)th trap T2-1 to have the same temperature. An internal temperature of each of the (1-1)th trap T1-1 and the (2-1)th trap T2-1 may be lower than a boiling point of the first product and higher than a boiling point of the second product. As an example, in a case where a heater is attached to an outer surface of each of the (1-1)th trap T1-1 and the (2-1)th trap T2-1, the internal temperatures of each of the (1-1)th trap T1-1 and the (2-1)th trap T2-1 may be maintained at 200° C. Hence, a first product having a liquid phase is collected in the (2-1)th trap T2-1. The first product liquefied in the (1-1)th trap T1-1 is collected in the (2-1)th trap T2-1 through the second discharge pipe PO2.

The internal temperature of the (2-2)th trap T2-2 may be lower than the boiling point of the second product. As an example, in a case where a cooler is attached to each of the (1-2)th trap T1-2 and the (2-2)th trap T2-2, the internal temperature of the (2-2)th trap T2-2 may be maintained at 0° C. Hence, a second product having a liquid phase is collected in the (2-2)th trap T2-2.

In the normal state section, the controller connects the (1-2)th inlet 1-2 to the (1-3)th inlet 1-3 of the first three-way valve 3W1. Further, the controller connects the (2-1)th inlet 2-1 to the (2-2)th inlet 2-2 of the second three-way valve 3W2. In addition, the controller connects the (3-2)th inlet 3-2 to the (3-3)th inlet 3-3 of the third three-way valve 3W3.

Hence, the gas discharged from the (2-2)th trap T2-2 sequentially flows through the second flow channel E2, the first flow channel E1, and the first pipe P1 and is discharged into the outside air. In addition, the gas discharged from the (2-2)th trap T2-2 sequentially flows through the second flow channel E2, the first flow channel E1, the third pipe P3, the fourth pipe P4, and the first pipe P1 and is discharged to the outside air.

In the normal state section, the gas meter GM displays a total amount of gas flowing through the first pipe P1. The controller receives a measured value from the gas meter GM. In the normal state section, the gas analyzer GC separates, as a single component, a trace of a component of a mixed gas flowing through the fourth pipe P4 and analyzes the component. The controller receives a measured value of the gas analyzer GC.

In the normal state section, the controller may control the electronic pressure controller EPC to maintain an internal pressure of each of the first reaction unit R1, the first trap T1, and the second trap T2 at 15 bar.

As illustrated in FIG. 9, in the normal state (vent mode) section, the controller maintains the first valve in an opened state, closes the third valve V3, connects the (1-2)th inlet 1-2 to the (1-3)th inlet 1-3 of the first three-way valve 3W1, connects the (2-1)th inlet 2-1 to the (2-2)th inlet 2-2 of the second three-way valve 3W2, connects the (5-1)th inlet 5-1 to the (5-3)th inlet 5-3 of the fifth three-way valve 3W5.

Hence, a gas in the first catalytic reactor CR1 sequentially flows through the second flow channel E2, the first flow channel E1, the flow channel on the (1-2)th inlet 1-2 side of the first three-way valve 3W1, a flow channel on the (5-3)th inlet 5-3 side of the fifth three-way valve 3W5, and the first exhaust pipe P11 and is discharged to the outside air. That is, in the normal state (vent mode) section based on the first catalytic reactor CR1, the gas in the first catalytic reactor CR1 does not flow toward the gas meter GM and the gas analyzer GC.

Hence, in the normal state (vent mode) section based on the first catalytic reactor CR1, a gas discharged from the second catalytic reactor CR2 may flow into the second exhaust pipe P12 and the third pipe P3 to flow toward the gas meter GM and the gas analyzer GC.

As illustrated in FIG. 26, in the normal state (vent mode) section based on the first catalytic reactor CR1, a normal state (vent mode) section, a sampling (analysis mode) section, a drainage (analysis mode) section, a pressure maintenance (analysis mode) section, a sampling (analysis mode) section, a liquid movement (analysis mode) section, and a normal state section based on the second catalytic reactor CR2 are performed.

Similarly, in the normal state (vent mode) section based on the second catalytic reactor CR2, the normal state (analysis mode) section based on the first catalytic reactor CR1, the sampling (analysis mode) section, the drainage (analysis mode) section, the pressure maintenance (analysis mode) section, the sampling (analysis mode) section, the liquid movement (analysis mode) section, and the normal state section are performed.

The same applies to the case where the catalytic reactor further includes the third catalytic reactor, the fourth catalytic reactor, and the fifth catalytic reactor. In FIG. 26, F denotes a section other than the normal state (vent mode) section based on the third catalytic reactor. That is, sections other than the normal state (vent mode) section do not overlap based on the first catalytic reactor CR1, the second catalytic reactor CR2, the third catalytic reactor, the fourth catalytic reactor, and the fifth catalytic reactor.

As illustrated in FIG. 10, in the normal state (analysis mode) section, the controller opens the third valve V3 and connects the (5-1)th inlet 5-1 to the (5-2)th inlet 5-2 of the fifth three-way valve 3W5. Hence, the gas discharged from the (2-2)th trap T2-2 sequentially flows through the second flow channel E2, the first flow channel E1, and the first pipe P1 and is discharged into the outside air. In addition, the gas discharged from the (2-2)th trap T2-2 sequentially flows through the second flow channel E2, the first flow channel E1, the third pipe P3, the fourth pipe P4, and the first pipe P1 and is discharged to the outside air.

In the normal state (analysis mode) section, the gas meter GM displays a total amount of gas flowing through the first pipe P1. The controller receives a measured value from the gas meter GM. In the normal state (analysis mode) section, the gas analyzer (GC) separates, as a single component, a trace of a component of the mixed gas flowing through the fourth pipe P4 and analyzes the component. The controller receives a measured value of the gas analyzer GC.

In the normal state (analysis mode) section, the controller may control the electronic pressure controller EPC to maintain the internal pressure of each of the first reaction unit R1, the first trap T1, and the second trap T2 at 15 bar.

As illustrated in FIG. 11, the controller closes the first valve V1 and the second connection valve and opens the first connection valve in the sampling (analysis mode) section. Hence, the product discharged from the first reaction unit R1 to the (1-1)th trap T1-1 does not flow into the (2-1)th trap T2-1. The gas flowing into the (1-1)th trap T1-1 flows into the (1-2)th trap T1-2 through the first connection pipe PU1. Hence, a first product having a liquid phase is collected in the (1-1)th trap T1-1. Further, a second product having a liquid phase is collected in the (1-2)th trap T1-2.

In the sampling (analysis mode) section, the controller connects the (1-1)th inlet 1-1 to the (1-2)th inlet 1-2 of the first three-way valve 3W1. In the sampling (analysis mode) section, the controller may connect the (2-1)th inlet 2-1 to the (2-3)th inlet 2-3 of the second three-way valve 3W2. Hence, a gas is blocked from moving between the inside of the second trap T2 and the automated liquid sampling device 20 as well as the inside of the first trap T1. Hence, in the drainage (analysis mode) section, when the liquid product LM is drained from the second trap T2, the pressure reduction in the first reaction unit R1 is prevented.

In the sampling (analysis mode) section, the gas discharged from the (1-2)th trap T1-2 flows through the first pipe P1 and is discharged to the outside air. In addition, the gas discharged from the (1-2)th trap T1-2 sequentially flows through the third pipe P3, the fourth pipe P4, and the first pipe P1 and is discharged to the outside air.

In the sampling (analysis mode) section, the gas meter GM displays a total amount of gas flowing through the first pipe P1. The controller receives a measured value from the gas meter GM. In the sampling (analysis mode) section, the gas analyzer GC separates, as a single component, a trace of a component of the mixed gas flowing through the fourth pipe P4 and analyzes the component. The controller receives a measured value of the gas analyzer GC.

In the sampling (analysis mode) section, the controller may control the electronic pressure controller EPC to maintain an internal pressure of each of the first reaction unit R1, the first trap T1, and the second trap T2 at 15 bar.

As illustrated in FIG. 12, the controller or a manager opens the electromagnetic valve of the drainage pipe PD in the drainage (analysis mode) section. The controller opens the electromagnetic valve of the drainage pipe PD at a preset time. Alternatively, the controller may be set not to automatically open the electromagnetic valve of the drainage pipe PD. That is, the manager himself or herself may open the electromagnetic valve of the drainage pipe PD. Instead of the electromagnetic valve, a manual on-off valve may be installed at the drainage pipe PD.

In the drainage (analysis mode) section, the first product having a liquid phase collected in the (2-1)th trap T2-1 is sampled to an external container. Further, the second product having a liquid phase collected in the (2-2)th trap T2-2 is sampled to another external container.

As described above, in the drainage (analysis mode) section, when the liquid product LM is drained from the second trap T2, the pressure reduction in the first reaction unit R1 is prevented.

In the drainage (analysis mode) section, the gas discharged from the (1-2)th trap T1-2 flows through the first pipe P1 and is discharged into the outside air. In addition, the gas discharged from the (1-2)th trap T1-2 sequentially flows through the third pipe P3, the fourth pipe P4, and the first pipe P1 and is discharged to the outside air.

In the drainage (analysis mode) section, the gas meter GM displays a total amount of gas flowing through the first pipe P1. The controller receives a measured value from the gas meter GM. In the drainage (analysis mode) section, the gas analyzer GC separates, as a single component, a trace of a component of the mixed gas flowing through the fourth pipe P4 and analyzes the component. The controller receives a measured value of the gas analyzer GC.

In the drainage (analysis mode) section, the internal pressure of the second trap T2 is reduced to be lower than 15 bar. However, in the drainage section, the controller may control the electronic pressure controller EPC to maintain an internal pressure of each of the first reaction unit R1 and the first trap T1 at 15 bar.

As illustrated in FIG. 13, in the pressure maintenance (analysis mode) section, the controller connects the (2-2)th inlet 2-2 to the (2-3)th inlet 2-3 of the second three-way valve 3W2 and connects the (3-1)th inlet 3-1 to the (3-2)th inlet 3-2 of the third three-way valve 3W3.

In the pressure maintenance (analysis mode) section, the gas discharged from the (1-2)th trap T1-2 flows through the first pipe P1 and is discharged to the outside air. In addition, the gas discharged from the (1-2)th trap T1-2 sequentially flows through the third pipe P3, the second pipe P2, and the second flow channel E2 and flows into the (2-2)th trap T2-2. The gas flowing into the (2-2)th trap T2-2 flows into the (2-1)th trap T2-1 through the second connection pipe PU2.

In the pressure maintenance (analysis mode) section, the controller controls the electronic pressure controller EPC to maintain the internal pressure of each of the first reaction unit R1 and the first trap T1 at 15 bar. Hence, in the pressure maintenance (analysis mode) section, the internal pressure of the second trap T2 gradually rises to 15 bar. The controller continuously receives measured values of the pressure sensor provided in the second trap T2. When the internal pressure of the second trap T2 reaches 15 bar, the controller initiates the secondary sampling section.

In the pressure maintenance (analysis mode) section, the gas meter GM displays a total amount of gas flowing through the first pipe P1. The controller receives a measured value from the gas meter GM. In the pressure maintenance section, the inflow of a gas into the fourth pipe P4 is stopped. Hence, the operation of the gas analyzer (GC) is stopped in the pressure maintenance section.

As illustrated in FIG. 14, the controller connects the (3-2)th inlet 3-2 to the (3-3)th inlet 3-3 of the third three-way valve 3W3 in the sampling (analysis mode) section. The controller may connect the (2-1)th inlet 2-1 to the (2-3)th inlet 2-3 of the second three-way valve 3W2.

Hence, in the sampling (analysis mode) section, the first product having a liquid phase is collected in the (1-1)th trap T1-1. Further, a second product having a liquid phase is collected in the (1-2)th trap T1-2.

In the sampling (analysis mode) section, the gas discharged from the (1-2)th trap T1-2 flows through the first pipe P1 and is discharged to the outside air. In addition, the gas discharged from the (1-2)th trap T1-2 sequentially flows through the third pipe P3, the fourth pipe P4, and the first pipe P1 and is discharged to the outside air.

In the sampling (analysis mode) section, the gas meter GM displays a total amount of gas flowing through the first pipe P1. The controller receives a measured value from the gas meter GM. In the sampling (analysis mode) section, the gas analyzer GC separates, as a single component, a trace of a component of the mixed gas flowing through the fourth pipe P4 and analyzes the component. The controller receives a measured value of the gas analyzer GC.

In the sampling (analysis mode) section, the controller may control the electronic pressure controller EPC to maintain an internal pressure of each of the first reaction unit R1, the first trap T1, and the second trap T2 at 15 bar.

As illustrated in FIG. 15, the controller opens the first valve V1 and the second connection valve in the liquid movement (analysis mode) section. Hence, the first product having a liquid phase collected in the (1-1)th trap T1-1 is collected in the (2-1)th trap T2-1. Further, the first product having a liquid phase collected in the (1-2)th trap T1-2 is collected in the (2-2)th trap T2-2.

As described above, in the pressure maintenance (analysis mode) section, the second trap T2 has the same pressure as the first reaction unit R1. Hence, in the liquid movement (analysis mode) section, even when the first valve V1 is re-opened, the pressure reduction in the first reaction unit R1 is prevented.

As illustrated in FIG. 8A, when the movement of the liquid product LM from the first trap T1 to the second trap T2 is completed, the controller connects the (1-2)th inlet 1-2 to the (1-3)th inlet 1-3 of the first three-way valve 3W1 and connects the (2-1)th inlet 2-1 to the (2-2)th inlet 2-2 of the second three-way valve 3W2. In addition, the controller closes the first connection valve and the second connection valve.

Hence, the gas discharged from the (2-2)th trap T2-2 sequentially flows through the second flow channel E2, the first flow channel E1, and the first pipe P1 and is discharged into the outside air. In addition, the gas discharged from the (2-2)th trap T2-2 sequentially flows through the second flow channel E2, the first flow channel E1, the third pipe P3, the fourth pipe P4, and the first pipe P1 and is discharged to the outside air. That is, the normal state section is re-started.

Third Embodiment

Figure 16A:
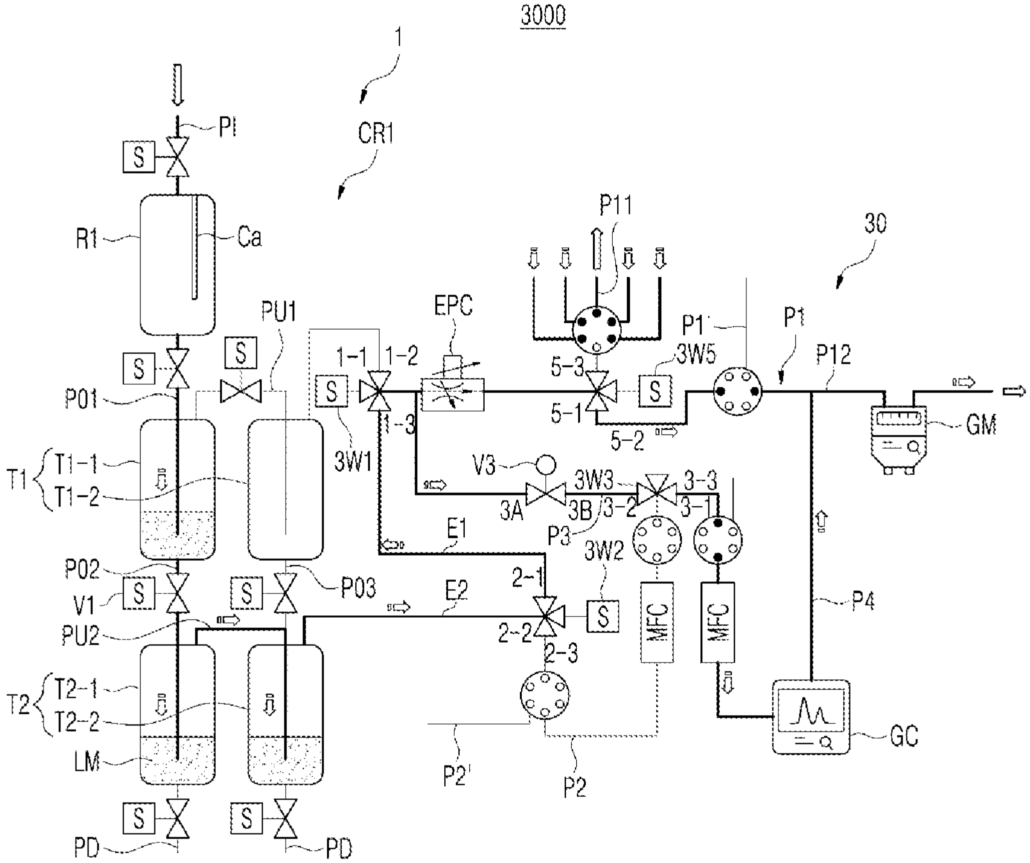
FIGS. 16A and 16B are diagrams illustrating a normal state (analysis mode) section of an automated liquid sampling system according to a third embodiment of the present invention.
Figure 16B:
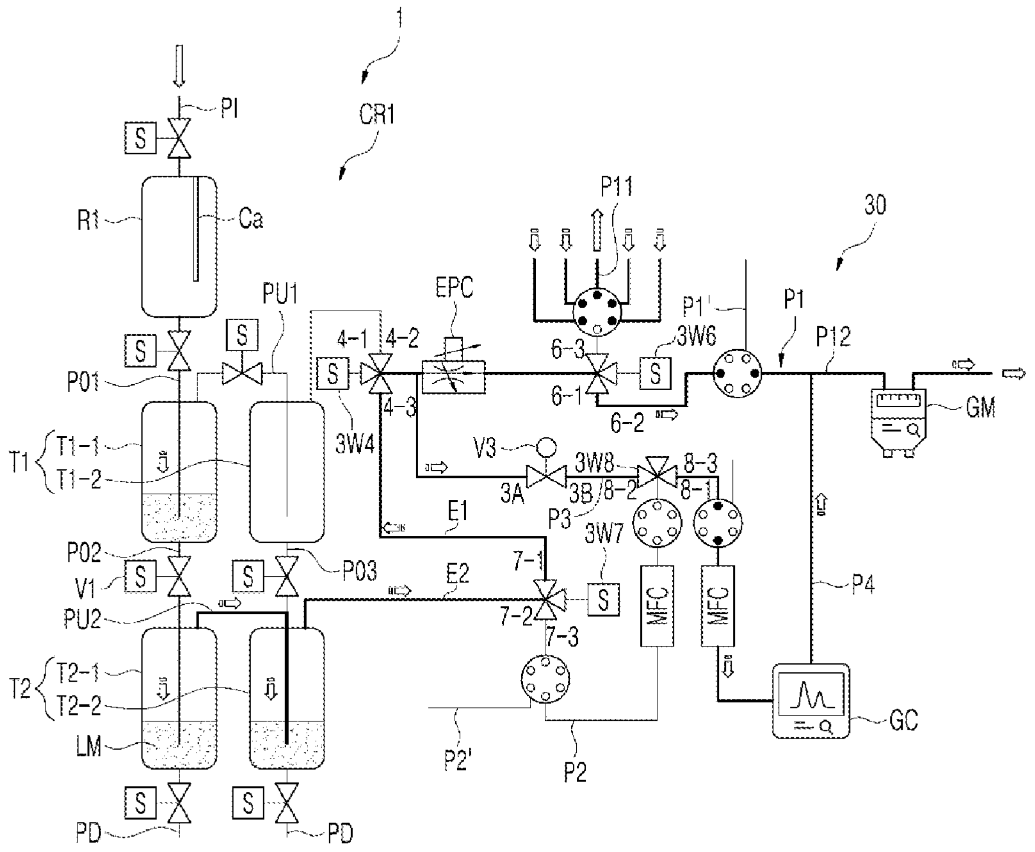

FIGS. 16A and 16B are diagrams illustrating a normal state section of an automated liquid sampling system 3000 according to a third embodiment of the present invention.

As illustrated in FIGS. 16A and 16B, the automated liquid sampling system 3000 according to the third embodiment of the present invention is configured to automate sampling of a liquid product LM of products of a catalytic reactor 1 and include an automated liquid sampling device 30 and a catalytic reactor 1.

As illustrated in FIGS. 16A and 16B, the catalytic reactor 1 includes a first catalytic reactor CR1 and a second catalytic reactor. The first catalytic reactor CR1 of the third embodiment of the present invention is substantially the same as the first catalytic reactor CR1 of the first embodiment. Further, a second catalytic reactor CR2 of the third embodiment of the present invention is substantially the same as the second catalytic reactor CR2 of the second embodiment. Hence, the descriptions of the first catalytic reactor CR1 and the second catalytic reactor CR2 will be omitted.

As illustrated in FIGS. 16A and 16B, the automated liquid sampling device 30 according to the third embodiment of the present invention includes a first pipe P1, a second pipe P2, a third pipe P3, and a fourth pipe P4, a second three-way valve 3W2, a third three-way valve 3W3, a seventh three-way valve 3W7, an eighth three-way valve 3W8, a fourth valve V4, a controller, and a case. The controller and the case are omitted in the drawings.

As illustrated in FIGS. 16A and 16B, the first pipe P1 includes a fifth three-way valve 3W5, a sixth three-way valve 3W6, a first exhaust pipe P11, and a second exhaust pipe P12.

As illustrated in FIG. 16A, the fifth three-way valve 3W5 has a (5-1)th inlet 5-1, a (5-2)th inlet 5-2, and a (5-3)th inlet 5-3. A flow channel on the (5-1)th inlet 5-1 side of the fifth three-way valve 3W5 is connected to the flow channel on the (1-2)th inlet 1-2 side. An electronic pressure controller EPC may be installed at the flow channel on the (5-1)th inlet 5-1 side or the flow channel on the (1-2)th inlet 1-2 side.

As illustrated in FIG. 16A, the sixth three-way valve 3W6 has a (6-1)th inlet 6-1, a (6-2)th inlet 6-2, and a (6-3)th inlet 6-3. A flow channel on the (6-1)th inlet 6-1 side of the sixth three-way valve 3W6 is connected to a flow channel on the (4-2)th inlet 4-2 side. A flow channel on the (6-1)th inlet 6-1 side of the sixth three-way valve 3W6 is connected to the flow channel on the (4-2)th inlet 4-2 side of the fourth three-way valve. An electronic pressure controller EPC may be installed at the flow channel on the (6-1)th inlet 6-1 side or the flow channel on the (4-2)th inlet 4-2 side.

The controller may control the electronic pressure controller EPC by receiving a signal from a pressure sensor provided in each of the first catalytic reactor CR1 and the second catalytic reactor CR2. As an example, in a case where the internal pressure of the second reaction unit R2 is set to 15 bar, the controller may control the electronic pressure controller EPC to maintain a pressure in the first pipe P1 or the flow channel on the (4-2)th inlet 4-2 side at 15 bar.

A wet gas meter GM is installed at the second exhaust pipe P12. The gas meter GM displays a total amount of gas passing inside the second pipe P12. The controller receives a measured value from the gas meter GM.

As illustrated in FIG. 16A, the second three-way valve 3W2 has inlets formed in three directions. That is, the second three-way valve 3W2 forms a (2-1)th inlet 2-1, a (2-2)th inlet 2-2, and a (2-3)th inlet 2-3. The second three-way valve 3W2 may be provided as a three-way solenoid valve. The controller controls the second three-way valve 3W2.

The second three-way valve 3W2 connects a flow channel on the (2-1)th inlet 2-1 side to a flow channel on the (1-3)th inlet 1-3 side by a pipe fitting. The flow channel on the (2-1)th inlet 2-1 side and the flow channel on the (1-3)th inlet 1-3 side form a first flow channel E1 through which a gas flows.

Further, the second three-way valve 3W2 connects a flow channel on the (2-2)th inlet 2-2 side to the second trap T2 by a pipe fitting. The flow channel on the (2-2)th inlet 2-2 side connected to the second trap T2 forms a second flow channel E2 through which a gas flows.

As illustrated in FIG. 16B, the seventh three-way valve 3W7 has inlets formed in three directions. That is, the seventh three-way valve 3W7 has a (7-1)th inlet 7-1, a (7-2)th inlet 7-2, and a (7-3)th inlet 7-3. The seventh three-way valve 3W7 may be provided as a three-way solenoid valve. The controller controls the seventh three-way valve 3W7.

The seventh three-way valve 3W7 connects a flow channel on the (7-1)th inlet 7-1 side to a flow channel on the (4-3)th inlet 4-3 side by a pipe fitting. The flow channel on the (7-1)th inlet 7-1 side and the flow channel on the (4-3)th inlet 4-3 side form a first flow channel E1 through which a gas flows.

Further, the seventh three-way valve 3W7 connects a flow channel on the (7-2)th inlet 7-2 side to the fourth trap T4 by a pipe fitting. The flow channel on the (7-2)th inlet 7-2 side connected to the fourth trap T4 forms a second flow channel E2 through which a gas flows.

A flow channel on the (7-3)th inlet 7-3 side is connected to the second pipe P2.

As illustrated in FIGS. 16A and 16B, the third three-way valve 3W3 has inlets in three directions. That is, the third three-way valve 3W3 has a (3-1)th inlet 3-1, a (3-2)th inlet 3-2, and a (3-3)th inlet 3-3. The third three-way valve 3W3 may be provided as a three-way solenoid valve. The controller controls the third three-way valve 3W3.

As illustrated in FIG. 16A, the second pipe P2 connects a flow channel on the (3-1)th inlet 3-1 side to a flow channel on the (2-3)th inlet 2-3 side. In addition, as illustrated in FIG. 16B, the second pipe P2 connects the flow channel on the (3-1)th inlet 3-1 side to the flow channel on the (7-3)th inlet 7-3 side.

That is, each of the flow channel on the (2-3)th inlet 2-3 side and the flow channel on the (7-3)th inlet 7-3 side forms a branch from the second pipe P2. The second pipe P2 forms a flow channel through which a gas flows. The second pipe P2 is provided as a pipe or a tube. The flow channel on the (2-3)th inlet 2-3 side, the flow channel on the (7-3)th inlet 7-3 side, and the second pipe P2 are connected by a pipe fitting.

A flow controller MFC is installed at the second pipe P2. The controller controls the flow controller MFC. In addition, the controller may control the flow controller MFC to control a flow rate of a gas which flows to the second trap T2 in the pressure maintenance (vent mode) section.

As illustrated in FIGS. 16A and 16B, one end portion of the third pipe P3 is connected to a flow channel on the (3-2)th inlet 3-2 side. A third valve V3 is provided at the other end portion of the third pipe P3. The third valve V3 has a 3A-th inlet 3A and a 3B-th inlet 3B. A flow channel on the 3A-th inlet 3A side is connected to the flow channel on the (1-2)th inlet 1-2 side. Further, a flow channel on the 3B-th inlet 3B side is connected to the other end portion of the third pipe P3.

As illustrated in FIGS. 16A and 16B, the fourth valve V4 has a 4A-th inlet 4A and a 4B-th inlet 4B. The 4A-th inlet 4A is connected to the flow channel on the (4-2)th inlet 4-2 side. The fourth valve may be provided as a solenoid valve. The controller controls the fourth valve V4.

As illustrated in FIGS. 16A and 16B, the eighth three-way valve 3W8 has inlets in three directions. That is, the eighth three-way valve has an (8-1)th inlet 8-1, an (8-2)th inlet 8-2, and an (8-3)th inlet 8-3. The eighth three-way valve 3W8 may be provided as a three-way solenoid valve. The controller controls the eighth three-way valve 3W8.

A flow channel on the (8-1)th inlet 8-1 side is connected to the second pipe P2. A flow channel on the (8-3)th inlet 8-3 side is connected to the fourth pipe P4. The 4A-th inlet 4A of the fourth valve V4 is connected to a flow channel on the (8-2)th inlet 8-2 side.

As illustrated in FIGS. 16A and 16B, the fourth pipe P4 connects a flow channel on the (3-3)th inlet 3-3 side to the first pipe P1. The fourth pipe P4 forms a flow channel through which a gas flows. The fourth pipe P4 is provided as a pipe or a tube.

A flow controller MFC is installed at the fourth pipe P4. The controller controls the flow controller MFC. The controller controls the flow controller MFC to control a flow rate of a gas of the first three-way valve 3W1 which is distributed to the first pipe P1 and the third pipe P3.

A gas analyzer GC is installed at the fourth pipe P4. The gas analyzer GC may separate, as a single component, a trace of a component of a mixed gas consisting of two or more components and analyze the component by gas chromatography. The controller receives a measured value of the gas analyzer GC.

As described above, the controller controls the first valve V1, the second valve V2, the third valve V3, the fourth valve V4, the first three-way valve 3W1, the second three-way valve 3W2, the third three-way valve 3W3, the fourth three-way valve, the fifth three-way valve 3W5, the sixth three-way valve 3W6, the seventh three-way valve 3W7, and the eighth three-way valve 3W8. In addition, the controller controls the electronic pressure controller EPC and the flow controller MFC. Further, the controller receives and stores the measured value of each of the gas meter GM and the gas analyzer GC.

Figure 17:
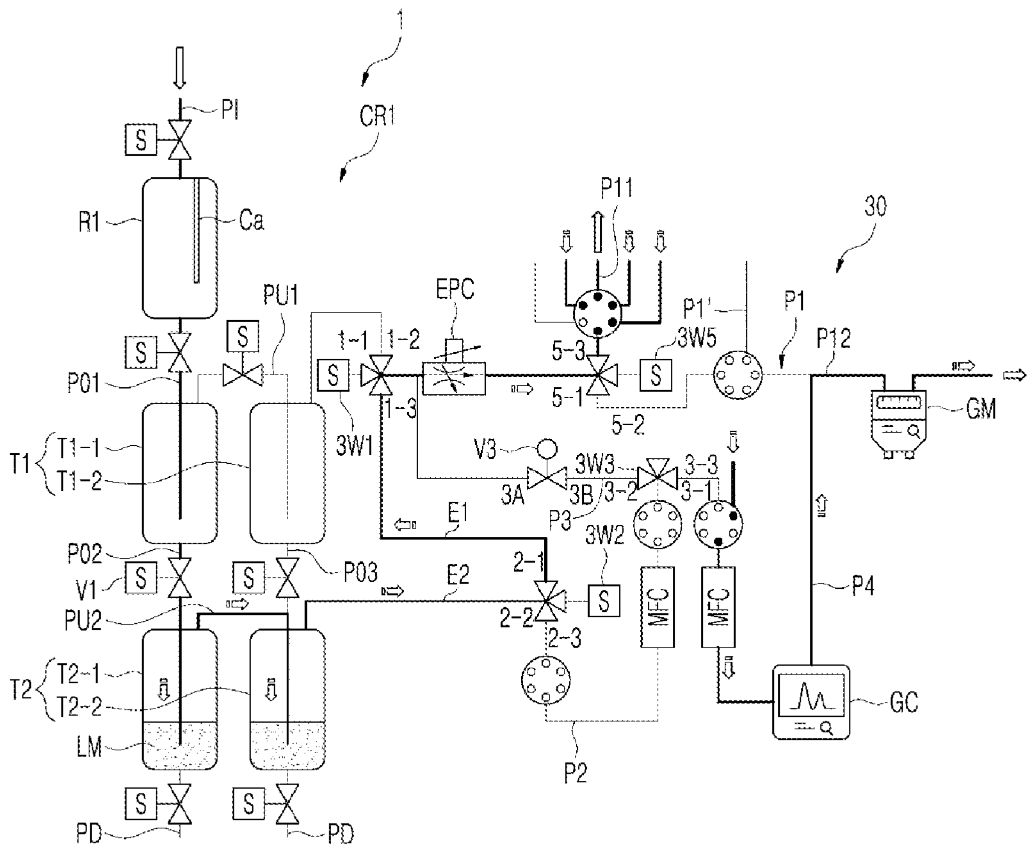
FIG. 17 is a diagram illustrating a normal state (vent mode) section of the automated liquid sampling system of FIG. 16A.
Figure 18:
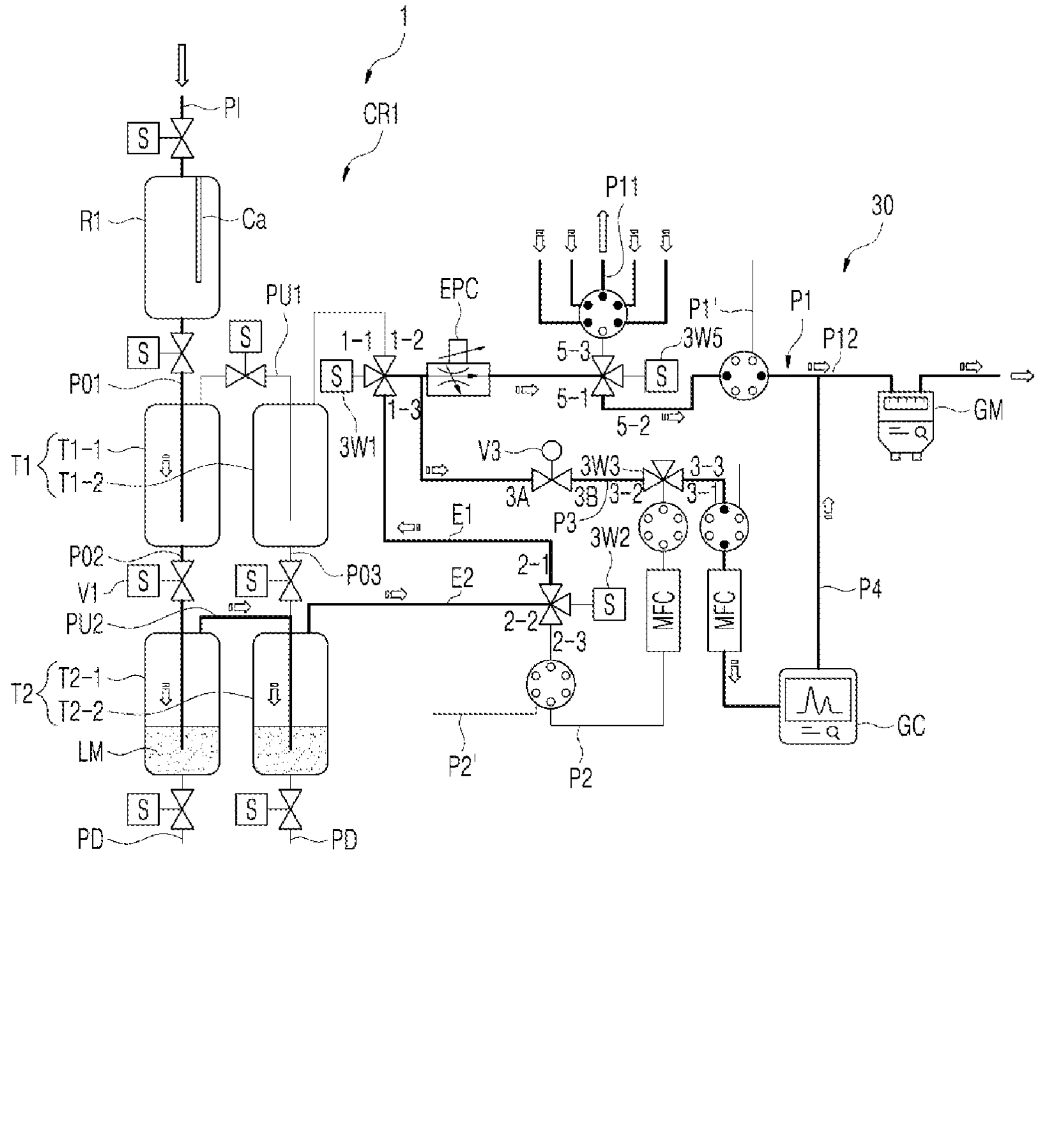
FIG. 18 is a diagram illustrating a normal state (analysis mode) section of the automated liquid sampling system of FIG. 16A.

FIG. 17 is a diagram illustrating a normal state (vent mode) section of the automated liquid sampling system of FIG. 16A. FIG. 18 is a diagram illustrating a normal state (analysis mode) section of the automated liquid sampling system of FIG. 16A.

Figure 19:
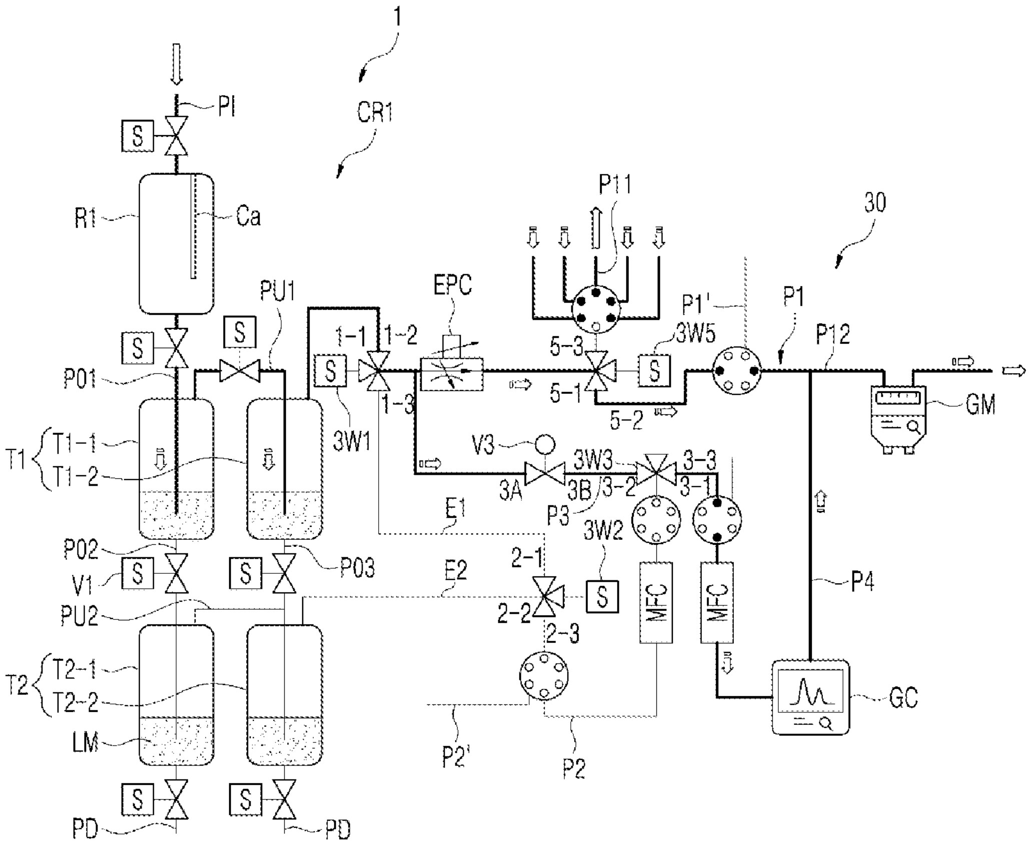
FIG. 19 is a diagram illustrating a sampling (analysis mode) section of the automated liquid sampling system of FIG. 16A.
Figure 20:
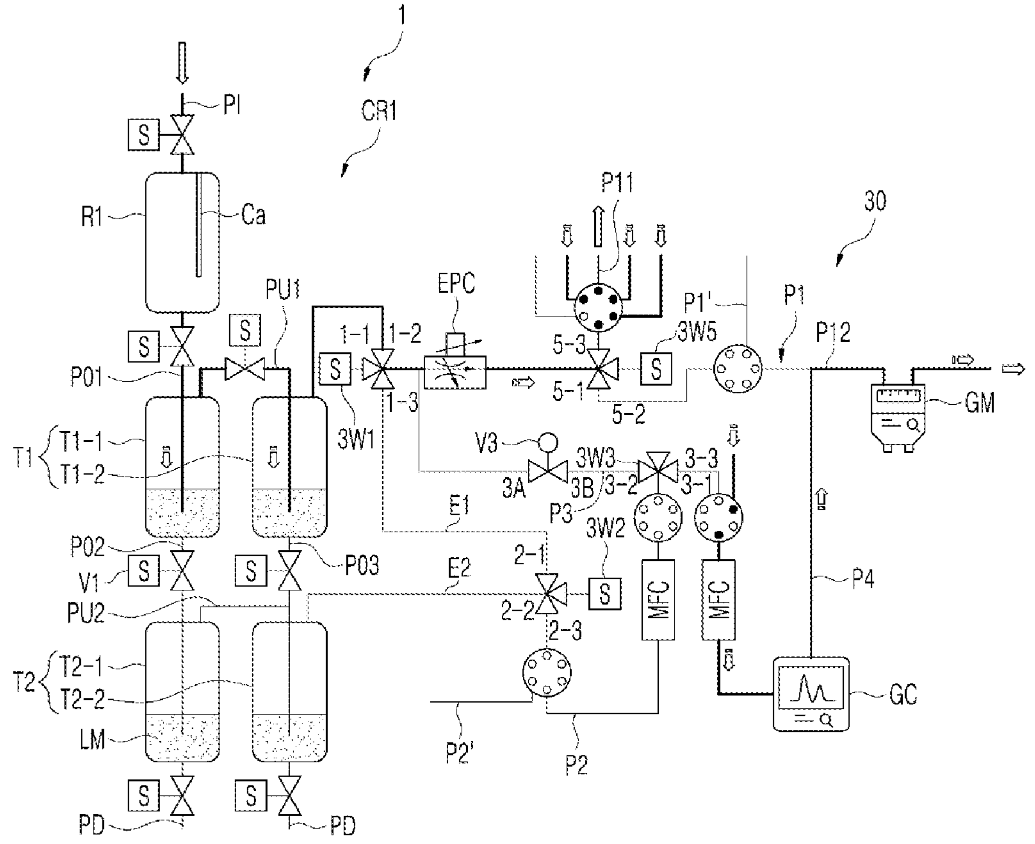
FIG. 20 is a diagram illustrating a sampling (vent mode) section of the automated liquid sampling system of FIG. 16A.

FIG. 19 is a diagram illustrating a sampling (analysis mode) section of the automated liquid sampling system of FIG. 16A. FIG. 20 is a diagram illustrating a sampling (vent mode) section of the automated liquid sampling system of FIG. 16A.

Figure 21:
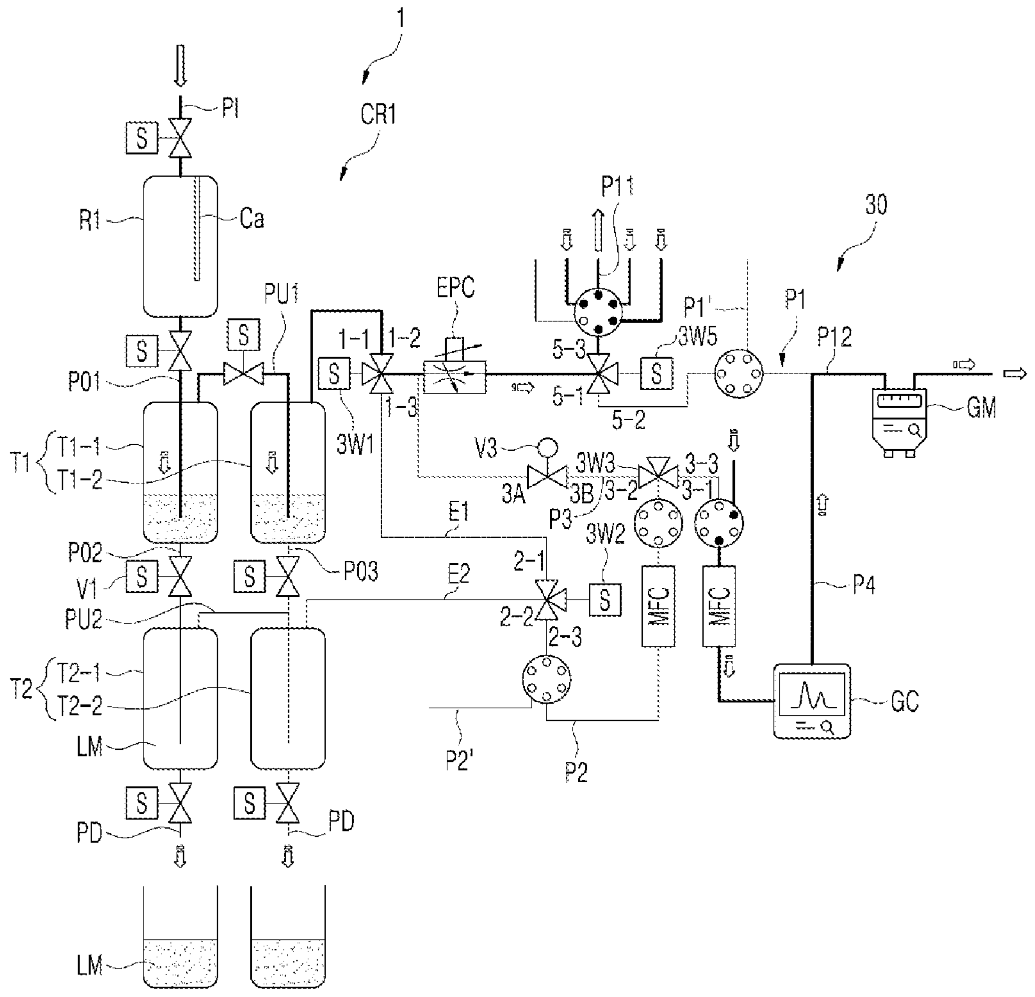
FIG. 21 is a diagram illustrating a drainage state (vent mode) section of the automated liquid sampling system of FIG. 16A.
Figure 22:
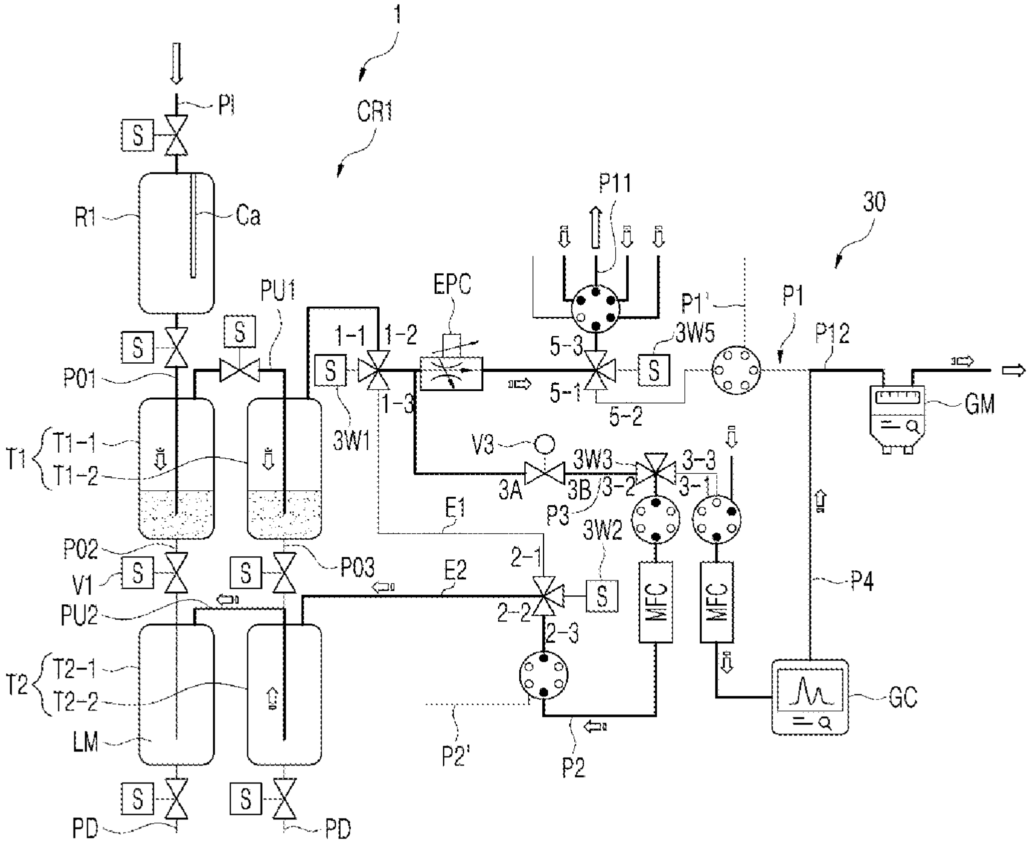
FIG. 22 is a diagram illustrating a pressure maintenance (vent mode) section of the automated liquid sampling system of FIG. 16A.

FIG. 21 is a diagram illustrating a drainage state (vent mode) section of the automated liquid sampling system of FIG. 16A. FIG. 22 is a diagram illustrating a pressure maintenance (vent mode) section of the automated liquid sampling system of FIG. 16A.

Figure 23:
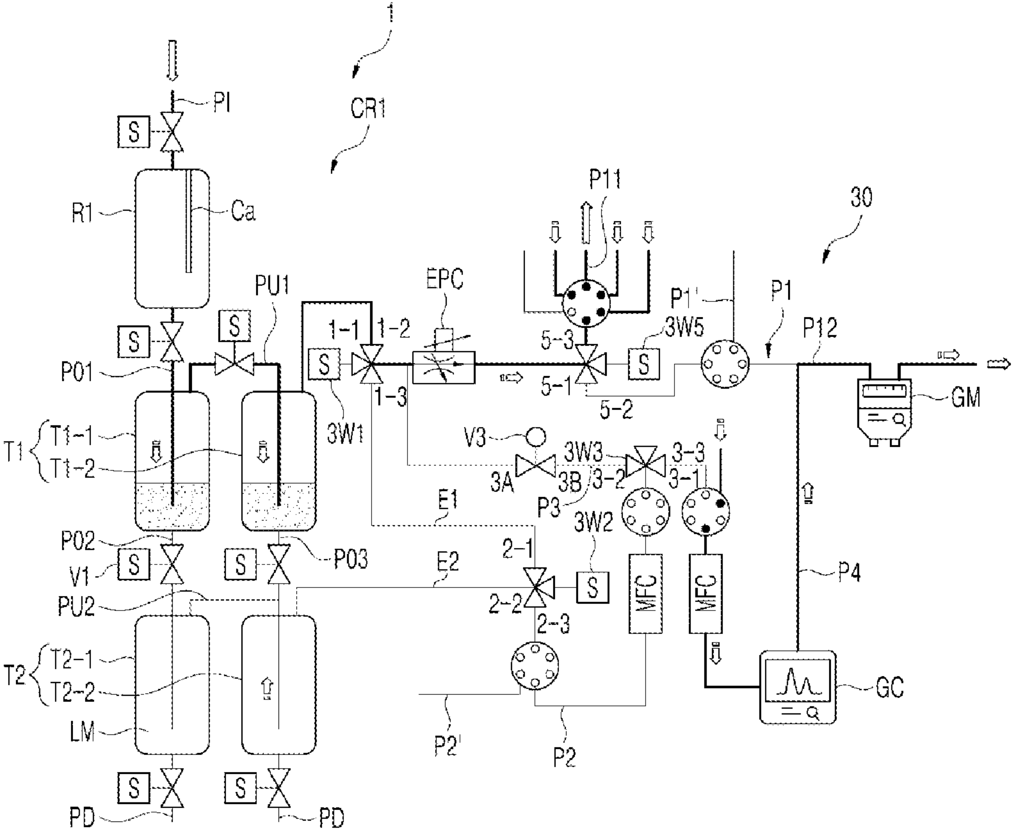
FIG. 23 is a diagram illustrating a sampling (vent mode) section of the automated liquid sampling system of FIG. 16A.
Figure 24:
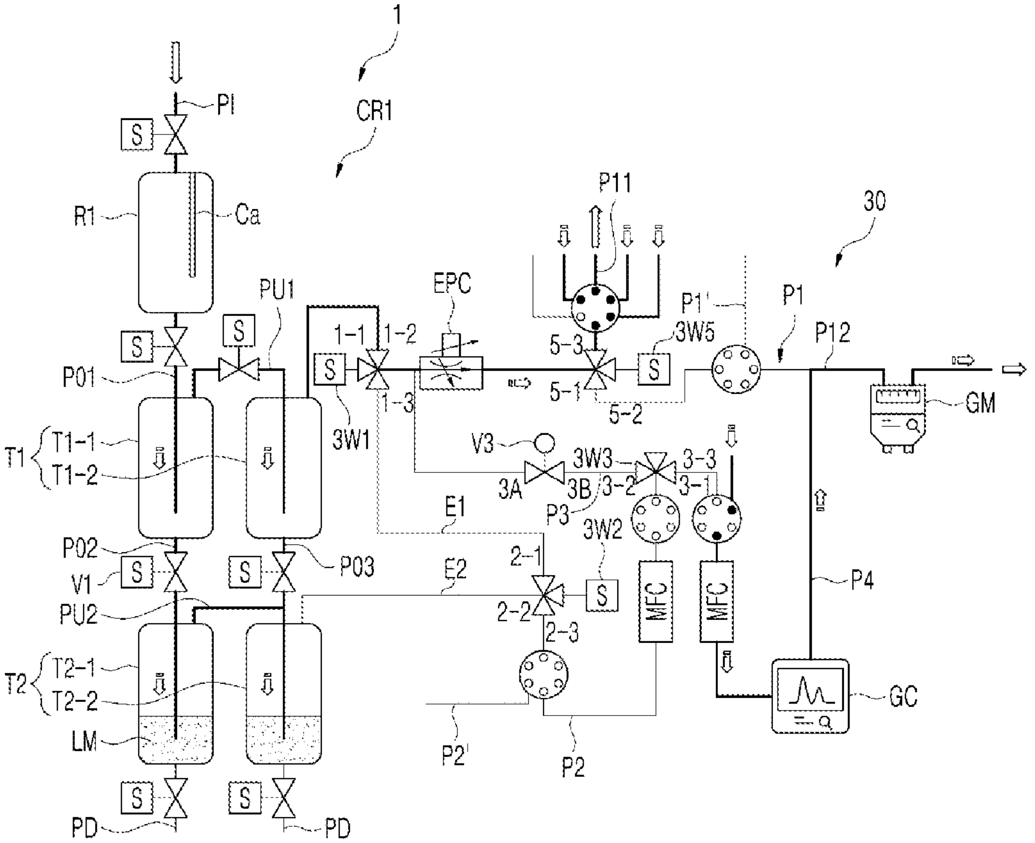
FIG. 24 is a diagram illustrating a liquid movement (vent mode) section of the automated liquid sampling system of FIG. 16A.

FIG. 23 is a diagram illustrating a sampling (vent mode) section of the automated liquid sampling system of FIG. 16A. FIG. 24 is a diagram illustrating a liquid movement (vent mode) section of the automated liquid sampling system of FIG. 16A.

Figure 27:
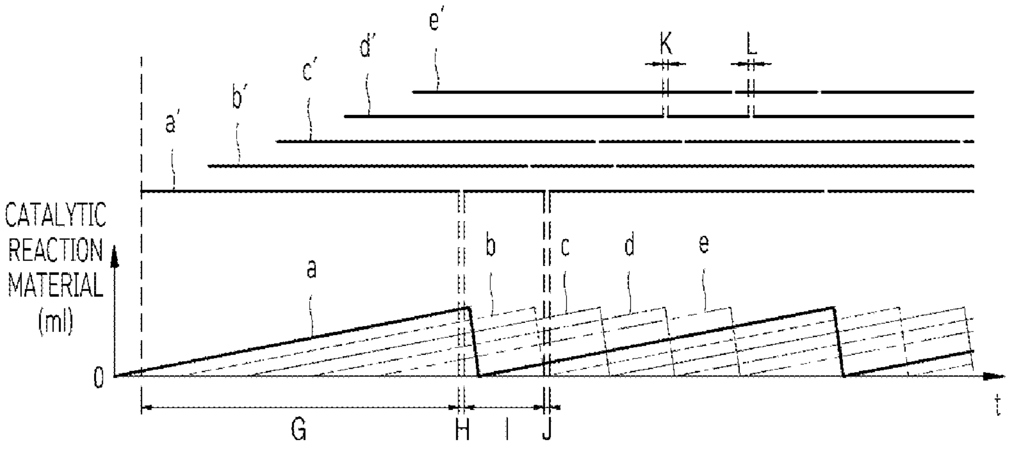
FIG. 27 is a graph illustrating amounts of liquid products collected by a plurality of catalytic reactors and a gas meter use section during the one cycle of the automated liquid sampling system of FIG. 16A.

FIG. 27 is a graph illustrating amounts of liquid products LM collected by a plurality of catalytic reactors 1 and a gas meter use section during one cycle of the automated liquid sampling system of FIG. 16A.

In FIG. 27, a denotes an amount of a liquid product LM collected by the first catalytic reactor CR1, b denotes an amount of a liquid product LM collected by the second catalytic reactor CR2, c denotes an amount of a liquid product LM collected by a third catalytic reactor, d denotes an amount of a liquid product LM collected by a fourth catalytic reactor, and e denotes an amount of a liquid product LM collected by a fifth catalytic reactor.

The third catalytic reactor, the fourth catalytic reactor, and the fifth catalytic reactor can be understood to have substantially the same structure as the first catalytic reactor CR1 and the second catalytic reactor CR2.

In FIG. 27, G denotes the normal state (vent mode) section based on the first catalytic reactor CR1, and H denotes the normal state (analysis mode) section and the sampling (analysis mode) section based on the first catalytic reactor CR1. In addition, I denotes the sampling (vent mode) section, the drainage (vent mode) section, the pressure maintenance (vent mode) section, the sampling (vent mode) section, and the liquid movement (vent mode) section based on the first catalytic reactor CR1. In addition, J denotes the normal state (analysis mode) section based on the first catalytic reactor CR1. Further, K denotes the normal state (analysis mode) section based on the fourth catalytic reactor. Furthermore, L denotes the normal state (analysis mode) section based on the fourth catalytic reactor.

In FIG. 27, a' denotes sections except for H and J based on the first catalytic reactor CR1, b' denotes sections except for H and J based on the second catalytic reactor CR2, c' denotes sections except for H and J based on the third catalytic reactor, d' denotes sections except for H and J based on the fourth catalytic reactor, and e' denotes sections except for H and J based on the fifth catalytic reactor.

Hereinafter, a method of using the automated liquid sampling system 3000 according to the third embodiment of the present invention will be described. Configurations of the automated liquid sampling system 3000 according to the third embodiment of the present invention may be more specifically understood through the description of the method of using the system.

As illustrated in FIGS. 16A to 24, the one cycle of the automated liquid sampling system 3000 according to the third embodiment of the present invention includes the normal state (analysis mode) section, the normal state (vent mode) section, the normal state (analysis mode) section, the sampling (analysis mode) section, the sampling (vent mode) section, the drainage (vent mode) section, the pressure maintenance (vent mode) section, the sampling (vent mode) section, and the liquid movement (vent mode) section.

During the one cycle of the automated liquid sampling system 3000 according to the third embodiment of the present invention, the electromagnetic valve of each of the inlet pipe PI and the first discharge pipe PO1 is maintained in the opened state. Hereinafter, first, the one cycle of the automated liquid sampling system will be described based on the first catalytic reactor CR1.

As illustrated in FIG. 16A, the controller closes the first connection valve and the second connection valve of the first catalytic reactor CR1 and opens the first valve V1 in the normal state (analysis mode) section. Hence, the product discharged from the first reaction unit R1 to the (1-1)th trap T1-1 flows into the (2-1)th trap T2-1. The gas flowing into the (2-1)th trap T2-1 flows into the (2-2)th trap T2-2 through the second connection pipe PU2.

The controller controls the (1-1)th trap T1-1 and the (2-1)th trap T2-1 to have the same temperature. An internal temperature of each of the (1-1)th trap T1-1 and the (2-1)th trap T2-1 may be lower than a boiling point of the first product and higher than a boiling point of the second product. As an example, in a case where a heater is attached to an outer surface of each of the (1-1)th trap T1-1 and the (2-1)th trap T2-1, the internal temperatures of each of the (1-1)th trap T1-1 and the (2-1)th trap T2-1 may be maintained at 200° C. Hence, a first product having a liquid phase is collected in the (2-1)th trap T2-1. The first product liquefied in the (1-1)th trap T1-1 is collected in the (2-1)th trap T2-1 through the second discharge pipe PO2.

The internal temperature of the (2-2)th trap T2-2 may be lower than the boiling point of the second product. As an example, in a case where a cooler is attached to each of the (1-2)th trap T1-2 and the (2-2)th trap T2-2, the internal temperature of the (2-2)th trap T2-2 may be maintained at 0° C. Hence, a second product having a liquid phase is collected in the (2-2)th trap T2-2.

In the normal state (analysis mode) section, the controller connects the (1-2)th inlet 1-2 to the (1-3)th inlet 1-3 of the first three-way valve 3W1. Further, the controller connects the (2-1)th inlet 2-1 to the (2-2)th inlet 2-2 of the second three-way valve 3W2. In addition, the controller connects the (3-2)th inlet 3-2 to the (3-3)th inlet 3-3 of the third three-way valve 3W3.

Hence, the gas discharged from the (2-2)th trap T2-2 sequentially flows through the second flow channel E2, the first flow channel E1, and the first pipe P1 and is discharged into the outside air. In addition, the gas discharged from the (2-2)th trap T2-2 sequentially flows through the second flow channel E2, the first flow channel E1, the third pipe P3, the fourth pipe P4, and the first pipe P1 and is discharged to the outside air.

In the normal state (analysis mode) section, the gas meter GM displays a total amount of gas flowing through the first pipe P1. The controller receives a measured value from the gas meter GM. In the normal state (analysis mode) section, the gas analyzer (GC) separates, as a single component, a trace of a component of the mixed gas flowing through the fourth pipe P4 and analyzes the component. The controller receives a measured value of the gas analyzer GC.

In the normal state (analysis mode) section, the controller may control the electronic pressure controller EPC to maintain the internal pressure of each of the first reaction unit R1, the first trap T1, and the second trap T2 at 15 bar.

As illustrated in FIG. 17, in the normal state (vent mode) section, the controller maintains the first valve in an opened state, closes the third valve V3, connects the (1-2)th inlet 1-2 to the (1-3)th inlet 1-3 of the first three-way valve 3W1, connects the (2-1)th inlet 2-1 to the (2-2)th inlet 2-2 of the second three-way valve 3W2, connects the (5-1)th inlet 5-1 to the (5-3)th inlet 5-3 of the fifth three-way valve 3W5.

Hence, a gas in the first catalytic reactor CR1 sequentially flows through the second flow channel E2, the first flow channel E1, the flow channel on the (1-2)th inlet 1-2 side of the first three-way valve 3W1, a flow channel on the (5-3)th inlet 5-3 side of the fifth three-way valve 3W5, and the first exhaust pipe P11 and is discharged to the outside air. That is, in the normal state (vent mode) section based on the first catalytic reactor CR1, the gas in the first catalytic reactor CR1 does not flow toward the gas meter GM and the gas analyzer GC.

Hence, in the normal state (vent mode) section based on the first catalytic reactor CR1, a gas discharged from the second catalytic reactor CR2 may flow into the second exhaust pipe P12 and the third pipe P3 to flow toward the gas meter GM and the gas analyzer GC.

As illustrated in FIG. 27, in the normal state (vent mode) section based on the first catalytic reactor CR1, a normal state (analysis mode) section and a sampling (analysis mode) section based on the second catalytic reactor CR2 may be performed.

Similarly, in a normal state (vent mode) section based on the second catalytic reactor CR2, the normal state (analysis mode) section and the sampling (analysis mode) section based on the first catalytic reactor CR1 may be performed.

The same applies to the case where the catalytic reactor further includes the third catalytic reactor, the fourth catalytic reactor, and the fifth catalytic reactor. In FIG. 27, H and J denote the normal state (analysis mode) section and the sampling (analysis mode) section based on the first catalytic reactor CR1. That is, the normal state (analysis mode) section and the sampling (analysis mode) section do not overlap based on the first catalytic reactor CR1, the second catalytic reactor CR2, the third catalytic reactor, the fourth catalytic reactor, and the fifth catalytic reactor.

As illustrated in FIGS. 26 and 27, in the automated liquid sampling system 3000 according to the third embodiment of the present invention, a period of time during which the gas meter GM and the gas analyzer GC are used in one cycle is more significantly shortened than in the automated liquid sampling system 2000 according to the second embodiment.

Hence, the automated liquid sampling system 3000 according to the third embodiment of the present invention may perform a catalytic reaction experiment by connecting multiple catalytic reactors 1 to the automated liquid sampling device 30 (compared to the automated liquid sampling system 2000 according to the second embodiment).

In addition, even in a catalytic reaction experiment with relatively long drainage section, pressure maintenance section, and liquid movement section, the automated liquid sampling system 3000 according to the third embodiment of the present invention may perform the catalytic reaction experiment by connecting multiple catalytic reactors 1 to the automated liquid sampling device 30.

As illustrated in FIG. 18, in the normal state (analysis mode) section, the controller opens the third valve V3 and connects the (5-1)th inlet 5-1 to the (5-2)th inlet 5-2 of the fifth three-way valve 3W5. Hence, the gas discharged from the (2-2)th trap T2-2 sequentially flows through the second flow channel E2, the first flow channel E1, and the first pipe P1 and is discharged into the outside air. In addition, the gas discharged from the (2-2)th trap T2-2 sequentially flows through the second flow channel E2, the first flow channel E1, the third pipe P3, the fourth pipe P4, and the first pipe P1 and is discharged to the outside air.

In the normal state (analysis mode) section, the gas meter GM displays a total amount of gas flowing through the first pipe P1. The controller receives a measured value from the gas meter GM. In the normal state (analysis mode) section, the gas analyzer (GC) separates, as a single component, a trace of a component of the mixed gas flowing through the fourth pipe P4 and analyzes the component. The controller receives a measured value of the gas analyzer GC.

In the normal state (analysis mode) section, the controller may control the electronic pressure controller EPC to maintain the internal pressure of each of the first reaction unit R1, the first trap T1, and the second trap T2 at 15 bar.

As illustrated in FIG. 19, the controller closes the first valve V1 and the second connection valve and opens the first connection valve in the sampling (analysis mode) section. Hence, the product discharged from the first reaction unit R1 to the (1-1)th trap T1-1 does not flow into the (2-1)th trap T2-1. The gas flowing into the (1-1)th trap T1-1 flows into the (1-2)th trap T1-2 through the first connection pipe PU1. Hence, a first product having a liquid phase is collected in the (1-1)th trap T1-1. Further, a second product having a liquid phase is collected in the (1-2)th trap T1-2.

In the sampling (analysis mode) section, the controller connects the (1-1)th inlet 1-1 to the (1-2)th inlet 1-2 of the first three-way valve 3W1. In the sampling (analysis mode) section, the controller may connect the (2-1)th inlet 2-1 to the (2-3)th inlet 2-3 of the second three-way valve 3W2. Hence, a gas is blocked from moving between the inside of the second trap T2 and the automated liquid sampling device 30 as well as the inside of the first trap T1. Hence, in the drainage (analysis mode) section, when the liquid product LM is drained from the second trap T2, the pressure reduction in the first reaction unit R1 is prevented.

In the sampling (analysis mode) section, the gas discharged from the (1-2)th trap T1-2 flows through the first pipe P1 and is discharged to the outside air. In addition, the gas discharged from the (1-2)th trap T1-2 sequentially flows through the third pipe P3, the fourth pipe P4, and the first pipe P1 and is discharged to the outside air.

In the sampling (analysis mode) section, the gas meter GM displays a total amount of gas flowing through the first pipe P1. The controller receives a measured value from the gas meter GM. In the sampling (analysis mode) section, the gas analyzer GC separates, as a single component, a trace of a component of the mixed gas flowing through the fourth pipe P4 and analyzes the component. The controller receives a measured value of the gas analyzer GC.

In the sampling (analysis mode) section, the controller may control the electronic pressure controller EPC to maintain an internal pressure of each of the first reaction unit R1, the first trap T1, and the second trap T2 at 15 bar.

As illustrated in FIG. 20, in the sampling (vent mode) section, the controller closes the third valve V3 and connects the (5-1)th inlet 5-1 to the (5-3)th inlet 5-3 of the fifth three-way valve 3W5.

Hence, a gas in the first catalytic reactor CR1 sequentially flows through the second flow channel E2, the first flow channel E1, the flow channel on the (1-2)th inlet 1-2 side of the first three-way valve 3W1, a flow channel on the (5-3)th inlet 5-3 side of the fifth three-way valve 3W5, and the first exhaust pipe P11 and is discharged to the outside air. That is, in the sampling (vent mode) section based on the first catalytic reactor CR1, the gas in the first catalytic reactor CR1 does not flow toward the gas meter GM and the gas analyzer GC.

Hence, in the sampling (vent mode) section based on the first catalytic reactor CR1, the gas discharged from the second catalytic reactor CR2 may flow into the second exhaust pipe P12 and the third pipe P3 to flow toward the gas meter GM and the gas analyzer GC.

As illustrated in FIG. 27, in the sampling (vent mode) section based on the first catalytic reactor CR1, the normal state (analysis mode) section and the sampling (analysis mode) section based on the second catalytic reactor CR2 may be performed.

Similarly, in the sampling (vent mode) section based on the second catalytic reactor CR2, the normal state (analysis mode) section and the sampling (analysis mode) section based on the first catalytic reactor CR1 may be performed.

As illustrated in FIG. 21, the controller or a manager opens the electromagnetic valve of the drainage pipe PD in the drainage (vent mode) section. The controller opens the electromagnetic valve of the drainage pipe PD at a preset time. Alternatively, the controller may be set not to automatically open the electromagnetic valve of the drainage pipe PD. That is, the manager himself or herself may open the electromagnetic valve of the drainage pipe PD. Instead of the electromagnetic valve, a manual on-off valve may be installed at the drainage pipe PD.

In the drainage (vent mode) section, the first product having a liquid phase collected in the (2-1)th trap T2-1 is sampled to an external container. Further, the second product having a liquid phase collected in the (2-2)th trap T2-2 is sampled to another external container.

As described above, in the drainage (vent mode) section, when the liquid product LM is drained from the second trap T2, the pressure reduction in the first reaction unit R1 is prevented.

In the drainage (vent mode) section, the gas discharged from the (1-2)th trap T1-2 is discharged to the outside air through the first exhaust pipe P11.

In the drainage (vent mode) section, the internal pressure of the second trap T2 is reduced to be lower than 15 bar. However, in the drainage section, the controller may control the electronic pressure controller EPC to maintain an internal pressure of each of the first reaction unit R1 and the first trap T1 at 15 bar.

Hence, in the drainage (vent mode) section based on the first catalytic reactor CR1, the gas discharged from the second catalytic reactor CR2 may flow into the second exhaust pipe P12 and the third pipe P3 to flow toward the gas meter GM and the gas analyzer GC.

As illustrated in FIG. 27, in the drainage (vent mode) section based on the first catalytic reactor CR1, the normal state (analysis mode) section and the sampling (analysis mode) section based on the second catalytic reactor CR2 may be performed.

As illustrated in FIG. 22, in the pressure maintenance (vent mode) section, the controller opens the third valve V3, connects the (2-2)th inlet 2-2 to the (2-3)th inlet 2-3 of the second three-way valve 3W2, and connects the (3-2)th inlet 3-2 to the (3-3)th inlet 3-3 of the third three-way valve 3W3.

In the pressure maintenance (vent mode) section, the gas discharged from the (1-2)th trap T1-2 is discharged to the outside air through the first exhaust pipe P11. In addition, the gas discharged from the (1-2)th trap T1-2 sequentially flows through the third pipe P3, the second pipe P2, and the second flow channel E2 and flows into the (2-2)th trap T2-2. The gas flowing into the (2-2)th trap T2-2 flows into the (2-1)th trap T2-1 through the second connection pipe PU2.

In the pressure maintenance (vent mode) section, the controller controls the electronic pressure controller EPC to maintain the internal pressure of each of the first reaction unit R1 and the first trap T1 at 15 bar. In the pressure maintenance (vent mode) section, the internal pressure of the second trap T2 gradually rises to 15 bar. The controller continuously receives measured values of the pressure sensor provided in the second trap T2. When the internal pressure of the second trap T2 reaches 15 bar, the controller initiates the secondary sampling section.

A flow controller MFC is installed at the second pipe P2. The controller controls the flow controller MFC. In addition, the controller may control the flow controller MFC to control a flow rate of a gas which flows to the second trap T2 in the pressure maintenance (vent mode) section.

Hence, in the pressure maintenance (vent mode) section based on the first catalytic reactor CR1, the gas discharged from the second catalytic reactor CR2 may flow into the second exhaust pipe P12 and the third pipe P3 to flow toward the gas meter GM and the gas analyzer GC.

As illustrated in FIG. 27, in the pressure maintenance (vent mode) section based on the first catalytic reactor CR1, the normal state (analysis mode) section and the sampling (analysis mode) section based on the second catalytic reactor CR2 may be performed.

As illustrated in FIG. 23, in the sampling (vent mode) section, the controller closes the third valve V3.

In the sampling (vent mode) section, the first product having a liquid phase is collected in the (1-1)th trap T1-1. Further, a second product having a liquid phase is collected in the (1-2)th trap T1-2.

In the sampling (vent mode) section, the gas discharged from the (1-2)th trap T1-2 is discharged to the outside air through the first exhaust pipe P11.

Hence, in the sampling (vent mode) section based on the first catalytic reactor CR1, the gas discharged from the second catalytic reactor CR2 may flow into the second exhaust pipe P12 and the third pipe P3 to flow toward the gas meter GM and the gas analyzer GC.

As illustrated in FIG. 27, in the sampling (vent mode) section based on the first catalytic reactor CR1, the normal state (analysis mode) section and the sampling (analysis mode) section based on the second catalytic reactor CR2 may be performed.

As illustrated in FIG. 24, the controller opens the first valve V1 and the second connection valve in the liquid movement (vent mode) section. Hence, the first product having a liquid phase collected in the (1-1)th trap T1-1 is collected in the (2-1)th trap T2-1. Further, the first product having a liquid phase collected in the (1-2)th trap T1-2 is collected in the (2-2)th trap T2-2.

As described above, in the pressure maintenance (vent mode) section, the second trap T2 has the same pressure as the first reaction unit R1. Hence, in the liquid movement (vent mode) section, even when the first valve V1 is reopened, the pressure reduction in the first reaction unit R1 is prevented.

As illustrated in FIG. 16A, when the movement of the liquid product LM from the first trap T1 to the second trap T2 is completed, the controller connects the (1-2)th inlet 1-2 to the (1-3)th inlet 1-3 of the first three-way valve 3W1, connects the (2-1)th inlet 2-1 to the (2-2)th inlet 2-2 of the second three-way valve 3W2, and the (5-1)th inlet 5-1 to the (5-2)th inlet 5-2 of the fifth three-way valve 3W5. In addition, the controller opens the third valve V3 and connects the (3-2)th inlet 3-2 to the (3-3)th inlet 3-3 of the third three-way valve 3W3. In addition, the controller closes the first connection valve and the second connection valve.

Hence, the gas discharged from the (2-2)th trap T2-2 sequentially flows through the second flow channel E2, the first flow channel E1, and the first pipe P1 and is discharged into the outside air. In addition, the gas discharged from the (2-2)th trap T2-2 sequentially flows through the second flow channel E2, the first flow channel E1, the third pipe P3, the fourth pipe P4, and the first pipe P1 and is discharged to the outside air. That is, the normal state section is re-started.

In the above description, specific embodiments of the present invention have been described and illustrated, but the present invention is not limited to the embodiments, and it is obvious for a person with ordinary skill in this field of technology that the present invention can be variously modified and changed without departing from the idea and scope of the present invention. Hence, such modification examples or variant examples are not to be construed separately from the technical idea or perspective of the present invention, and the modified examples are to be included in the claims of the present invention.

INDUSTRIAL APPLICABILITY

According to the present invention, the automated liquid sampling device and the automated liquid sampling system comprising the same provide a new perspective beyond the limit of the existing technology in that the controller connects the (2-2)th inlet to the (2-3)th inlet and connects the (3-1)th inlet to the (3-2)th inlet such that the pressure in the second trap is equal to the pressure in the first reaction unit before the first valve is re-opened, and thereby the pressure of the reactor is maintained constant even when the valve of the trap is opened and sampling of a liquid reactant is performed. Hence, the present invention is the invention that has industrial applicability because the invention not only has sufficient potential for commercialization or sales of the applied device as well as for use of related technology, but also can be clearly implemented in reality.

REFERENCE SIGNS LIST

000, 2000, 3000: Automated liquid sampling system
10, 20, 30: Automated liquid sampling device
P1: First pipe
3W2: Second three-way valve
P11: First exhaust pipe
3W3: Third three-way valve
P12: Second exhaust pipe
3W5: Fifth three-way valve
P2: Second pipe
3W6: Sixth three-way valve
P3: Third pipe
3W7: Seventh three-way valve
P4: Fourth pipe
3W8: Eighth three-way valve
V3: Third valve
GC: Gas analyzer
V4: Fourth valve
MFC: Flow controller
GM: Gas meter
LM: Liquid product
1: Catalytic reactor
CR1: First catalytic reactor
CR2: Second catalytic reactor
R1: First reaction unit
R2: Second reaction unit
T1: First trap
T3: Third trap
T1-1: (1-1)th trap
V2: Second valve
T1-2: (1-2)th trap
T4: Fourth trap
V1: First valve
3W4: Fourth three-way valve
T2: Second trap
PU1: First connection pipe
T2-1: (2-1)th trap
PU2: Second connection pipe
T2-2: (2-2)th trap
PD: Drainage pipe
3W1: First three-way valve
E1: First flow channel
PI: Inlet pipe
E2: Second flow channel
PO1: First discharge pipe
Ca: Catalyst
PO2: Second discharge pipe
PO3: Third discharge pipe

The invention claimed is:

1. An automated liquid sampling device that automates sampling of a liquid product of products of a catalytic reactor, wherein the catalytic reactor comprises a first catalytic reactor, wherein the first catalytic reactor comprises:

a first reaction unit that is configured to generate the product through a catalytic reaction; a first trap connected to the first reaction unit to collect the liquid product; a second trap that is selectively connected to the first trap by a first valve configured to selectively collect the liquid product; a first three-way valve which forms a (1-1)th inlet, a (1-2)th inlet, and a (1-3)th inlet and connects a (1-1)th inlet-side flow channel to the first trap, wherein the automated liquid sampling device comprises:

a first pipe which is connected to a (1-2)th inlet-side flow channel and through which gas is configured to be exhausted to an outside; a second three-way valve which forms a (2-1)th inlet, a (2-2)th inlet, and a (2-3)th inlet, connects a (2-1)th inlet-side flow channel to a (1-3)th inlet-side flow channel, and connects a (2-2)th inlet-side flow channel to the second trap, a third three-way valve which forms a (3-1)th inlet, a (3-2)th inlet, and a (3-3)th inlet;

a second pipe that connects a (3-1)th inlet-side flow channel to a (2-3)th inlet-side flow channel;

a third pipe that connects a (3-2)th inlet-side flow channel to a (1-2)th inlet-side flow channel; a fourth pipe that connects a (3-3)th inlet-side flow channel to the first pipe; a controller configured to control the first valve, the first three-way valve, the second three-way valve, and the third three-way valve, and wherein the controller is configured to open the first valve, connect the (1-2)th inlet to the (1-3)th inlet, connect the (2-1)th inlet to the (22)th inlet, and connect the (3-2)th inlet to the (3-3)th inlet such that the liquid product is configured to be collected in the second trap.

2. The automated liquid sampling device according to claim 1, wherein the controller closes the first valve and connects the (1-1)th inlet to the (12)th inlet such that a pressure reduction in the first reaction unit is prevented when the liquid product is drained in the second trap.

3. The automated liquid sampling device according to claim 2, wherein the controller connects the (2-2)th inlet to the (2-3)th inlet and connects the (3-1)th inlet to the (3-2)th inlet such that a pressure in the second trap is equal to a pressure in the first reaction unit before the first valve is re-opened.

4. The automated liquid sampling device according to claim 1, wherein a pressure controller is installed at the first pipe or the (1-2)th inlet-side flow channel, and wherein a flow controller is installed at the third pipe.

5. The automated liquid sampling device according to claim 1, wherein a gas meter is installed at the first pipe, and wherein a gas analyzer is installed at the fourth pipe.

6. The automated liquid sampling device according to claim 1, wherein the catalytic reactor comprises a second catalytic reactor, wherein the second catalytic reactor comprises:

a second reaction unit that generates the product through a catalytic reaction;

a third trap connected to the second reaction unit to collect the liquid product;

a fourth trap that is selectively connected to the third trap by a second valve to selectively collect the liquid product; and a fourth three-way valve which forms a (4-1)th inlet, a (4-2)th inlet, and a (4-3)th inlet and connects a (4-1)th inlet-side flow channel to the third trap, wherein the first pipe includes:

a fifth three-way valve which forms a (5-1)th inlet, a (5-2)th inlet, and a (5-3)th inlet and connects a (5-1)th inlet-side flow channel to the (1-2)th inlet-side flow channel;

a sixth three-way valve which forms a (6-1)th inlet, a (6-2)th inlet, and a (6-3)th inlet and connects a (6-1)th inlet-side flow channel to a (4-2)th inlet-side flow channel;

a first exhaust pipe connected to the (5-3)th inlet and the (6-3)th inlet; and a second exhaust pipe which is connected to the (5-2)th inlet and the (6-2)th inlet and to which the fourth pipe is connected, wherein the third pipe includes:

a third valve which forms a 3A-th inlet and a 3B-th inlet, connects the 3A-th inlet to the (1-2)th inlet-side flow channel, and connects the 3B-th inlet to the (3-2)th inlet-side flow channel; and a fourth valve which forms a 4A-th inlet and a 4B-th inlet, connects the 4A-th inlet to the (4-2)th inlet-side flow channel, and connects the 4B-th inlet to the (3-2)th inlet-side flow channel, wherein a gas meter is installed at the second exhaust pipe, wherein a gas analyzer is installed at the fourth pipe, wherein the automated liquid sampling device comprises a seventh three-way valve that has a (7-1)th inlet, a (7-2)th inlet, and a (7-3)th inlet, connects a (7-1)th inlet-side flow channel to a (4-3)th inlet-side flow channel, connects a (7-2)th inlet-side flow channel to the fourth trap, and connects a (7-3)th inlet-side flow channel to the second pipe, and wherein, in a case where a gas discharged from the second catalytic reactor flows in the second exhaust pipe and the third pipe, the controller opens the first valve, closes the third valve, connects the (1-2)th inlet to the (1-3)th inlet, connects the (2-1)th inlet to the (2-2)th inlet, and connects the (5-1)th inlet to the (5-3)th inlet.

7. The automated liquid sampling device according to claim 1, wherein the catalytic reactor comprises a second catalytic reactor, wherein the second catalytic reactor comprises:

a second reaction unit that generates the product through a catalytic reaction;

a third trap connected to the second reaction unit to collect the liquid product;

a fourth trap that is selectively connected to the third trap by a second valve to selectively collect the liquid product; and a fourth three-way valve which forms a (4-1)th inlet, a (4-2)th inlet, and a (4-3)th inlet and connects a (4-1)th inlet-side flow channel to the third trap, wherein the first pipe includes:

a fifth three-way valve which forms a (5-1)th inlet, a (5-2)th inlet, and a (5-3)th inlet and connects a (5-1)th inlet-side flow channel to the (1-2)th inlet-side flow channel;

a sixth three-way valve which forms a (6-1)th inlet, a (6-2)th inlet, and a (6-3)th inlet and connects a (6-1)th inlet-side flow channel to a (4-2)th inlet-side flow channel;

a first exhaust pipe connected to the (5-3)th inlet and the (6-3)th inlet; and a second exhaust pipe which is connected to the (5-2)th inlet and the (6-2)th inlet and to which the fourth pipe is connected, wherein a gas meter is installed at the second exhaust pipe, wherein a gas analyzer is installed at each of the second pipe and the fourth pipe, wherein the automated liquid sampling device comprises:

a seventh three-way valve which forms a (7-1)th inlet, a (7-2)th inlet, and a (7-3)th inlet, connects a (7-1)th inlet-side flow channel to a (4-3)th inlet-side flow channel, connects a (7-2)th inlet-side flow channel to the fourth trap, and connects a (7-3)th inlet-side flow channel to the second pipe;

an eighth three-way valve which forms an (8-1)th inlet, an (8-2)th inlet, and an (8-3)th inlet, connects the (8-1)th inlet to the second pipe, and connects the (8-3)th inlet to the fourth pipe; and a fourth valve which forms a 4A-th inlet and a 4B-th inlet, connects the 4A-th inlet to the (4-2)th inlet-side flow channel, and connects the 4B-th inlet to a (8-2)th inlet-side flow channel, and wherein in a case where a gas discharged from the second catalytic reactor flows in the second exhaust pipe and the fourth pipe, the controller connects the (1-1)th inlet to the (1-2)th inlet, connects the (2-2)th inlet to the (2-3)th inlet, and connects the (3-1)th inlet to the (3-2)th inlet such that a pressure in the second trap is equal to a pressure in the first reaction unit before the first valve is re-opened.

8. The automated liquid sampling device according to claim 7, wherein a flow controller is installed at each of the second pipe and the third pipe.

9. An automated liquid sampling system comprising: a catalytic reactor; and an automated liquid sampling device that automates sampling of a liquid product of products of the catalytic reactor, wherein the catalytic reactor comprises a first catalytic reactor, wherein the first catalytic reactor comprises:

a first reaction unit that is configured to generate the product through a catalytic reaction; a first trap connected to the first reaction unit to collect the liquid product; a second trap that is selectively connected to the first trap by a first valve configured to selectively collect the liquid product; a first three-way valve which forms a (1-1)th inlet, a (1-2)th inlet, and a (1-3)th inlet and connects a (1-1)th inlet-side flow channel to the first trap, wherein the automated liquid sampling device includes: a first pipe which is connected to a (1-2)th inlet-side flow channel and through which gas is exhausted to the outside; a second three-way valve which forms a (2-1)th inlet, a (2-2)th inlet, and a (2-3)th inlet, connects a (2-1)th inlet-side flow channel to a (1-3)th inlet-side flow channel, and connects a (2-2)th inlet-side flow channel to the second trap, a third three-way valve which forms a (3-1)th inlet, a (3-2)th inlet, and a (3-3)th inlet;

a second pipe that connects a (3-1)th inlet-side flow channel to a (2-3)th inletside flow channel; a third pipe that connects a (3-2)th inlet-side flow channel to a (1-2)th inlet-side flow channel; a fourth pipe that connects a (3-3)th inlet-side flow channel to the first pipe; and a controller configured to control the first valve, the first three-way valve, the second three-way valve, and the third three-way valve, and wherein the controller is configured to open the first valve, connect the (1-2)th inlet to the (1-3)th inlet, connect the (2-1)th inlet to the (22)th inlet, and connect the (3-2)th inlet to the (3-3)th inlet such that the liquid product is configured to be collected in the second trap.

* * * * *